United States Patent
Bell et al.

(10) Patent No.: US 10,521,784 B2
(45) Date of Patent: Dec. 31, 2019

(54) ANALYZING LAYOUTS USING SENSOR DATA

(71) Applicant: Square, Inc., San Francisco, CA (US)

(72) Inventors: Bruce Bell, New York, NY (US); Brian Partridge, Brooklyn, NY (US); Ghassan Abu-Ghaida, New York, NY (US); Amar Dhingra, New York City, NY (US); Alfred Bautista, Daly City, CA (US); Kevin Yien, Albertson, NY (US)

(73) Assignee: Square, Inc., San Francisco, CA (US)

(*) Notice: Subject to any disclaimer, the term of this patent is extended or adjusted under 35 U.S.C. 154(b) by 176 days.

(21) Appl. No.: 15/495,293

(22) Filed: Apr. 24, 2017

(65) Prior Publication Data

US 2018/0308082 A1 Oct. 25, 2018

(51) Int. Cl.
*G06Q 20/20* (2012.01)
(52) U.S. Cl.
CPC .................. *G06Q 20/202* (2013.01)
(58) Field of Classification Search
CPC ........ G06Q 10/08; G06Q 30/02; G06Q 20/20; H04W 4/02
USPC .................. 705/7.34, 347, 333, 21
See application file for complete search history.

(56) References Cited

U.S. PATENT DOCUMENTS

| | | | |
|---|---|---|---|
| 5,077,065 A | 12/1991 | Ash et al. | |
| 6,727,925 B1 | 4/2004 | Bourdelais | |
| 6,789,067 B1 | 9/2004 | Liebenow | |
| 8,122,370 B2 | 2/2012 | Hoguet | |
| 9,355,470 B2 | 5/2016 | Merrell et al. | |
| 9,881,288 B1 | 1/2018 | Bell et al. | |
| 10,163,092 B2 * | 12/2018 | Barrett | G06Q 20/28 |

(Continued)

FOREIGN PATENT DOCUMENTS

WO 2018/200193 A1 11/2018

OTHER PUBLICATIONS

Hughes, K.A., "When Imitation Is Annoying, Not Flattering," The New York Times, dated Feb. 19, 2006, Retrieved from the Internet URL: http://www.nytimes.com/2006/02/19/realestate/when-imitation-is-annoying-not-flattering.html, pp. 1-5.

(Continued)

*Primary Examiner* — Oluseye Iwarere
(74) *Attorney, Agent, or Firm* — Lee & Hayes, P.C.

(57) ABSTRACT

This disclosure describes, in part, techniques for analyzing sensor data to identify a bottleneck location within a physical establishment, and then providing a recommendation based on the bottleneck location. For instance, a payment service may analyze a layout of a physical establishment using sensor data representing movements of users within the physical establishment. Based on the analysis, the payment service can identify a location within the physical establishment in which movements of the users correspond to one another. For instance, the payment service can identify that the users are located at a similar location within the physical establishment at a given time period. The payment service can then generate and provide a message that indicates a location for moving an object such that users can utilize new routes through the physical establishment.

20 Claims, 41 Drawing Sheets

(56) References Cited

U.S. PATENT DOCUMENTS

| | | |
|---|---|---|
| 2002/0082924 A1 | 6/2002 | Koether |
| 2004/0068441 A1 | 4/2004 | Werbitt |
| 2004/0158494 A1 | 8/2004 | Suthar |
| 2005/0030162 A1 | 2/2005 | Stambaugh |
| 2007/0173266 A1 | 7/2007 | Barnes, Jr. |
| 2007/0214053 A1 | 9/2007 | Salerno |
| 2012/0173350 A1 | 7/2012 | Robson |
| 2012/0209657 A1* | 8/2012 | Connolly ........... G06Q 20/3224 705/7.29 |
| 2012/0240060 A1 | 9/2012 | Pennington et al. |
| 2013/0007615 A1 | 1/2013 | Goldman |
| 2013/0311310 A1 | 11/2013 | Zell |
| 2013/0325526 A1 | 12/2013 | Tyler |
| 2014/0214547 A1* | 7/2014 | Signorelli .......... G06Q 30/0267 705/14.64 |
| 2014/0370167 A1 | 12/2014 | Garden |
| 2015/0012426 A1* | 1/2015 | Purves ............... G06Q 30/0623 705/41 |
| 2015/0149236 A1* | 5/2015 | Sakamoto .......... G06Q 10/0633 705/7.27 |
| 2015/0149254 A1* | 5/2015 | Sakamoto .......... G06Q 30/0201 705/7.34 |
| 2015/0149307 A1 | 5/2015 | Thukral |
| 2015/0161525 A1 | 6/2015 | Hirose et al. |
| 2015/0193755 A1 | 7/2015 | Sibble |
| 2015/0248436 A1* | 9/2015 | Podemsky .............. G06F 16/29 707/724 |
| 2015/0262265 A1* | 9/2015 | Zamer ................ G06Q 30/0282 705/347 |
| 2015/0269557 A1 | 9/2015 | Artman et al. |
| 2015/0269561 A1* | 9/2015 | Barrett ................... G06Q 20/28 705/17 |
| 2015/0356501 A1* | 12/2015 | Gorjestani ......... G06Q 10/0833 705/333 |
| 2015/0371317 A1 | 12/2015 | Bosko et al. |
| 2016/0003637 A1* | 1/2016 | Andersen ................ G06F 16/29 701/519 |
| 2016/0026958 A1 | 1/2016 | Lee |
| 2016/0189186 A1* | 6/2016 | Fabrikant ................ G06F 16/29 705/7.34 |
| 2016/0366546 A1* | 12/2016 | Yamasaki ............... H04W 4/02 |
| 2017/0200145 A1* | 7/2017 | Nathanel ................ G06Q 20/20 |
| 2017/0212210 A1 | 7/2017 | Chen et al. |
| 2017/0221072 A1 | 8/2017 | Athuluru Tlrumala et al. |
| 2018/0253779 A1 | 9/2018 | Dongre |
| 2018/0308186 A1 | 10/2018 | Bell et al. |
| 2018/0336549 A1* | 11/2018 | Barrett ................ G06Q 20/342 |

OTHER PUBLICATIONS

Notice of Allowance dated Sep. 6, 2017, for U.S. Appl. No. 15/495,160, of Bell, B., et al., filed Apr. 24, 2017.

Non-Final Office Action dated Nov. 14, 2016, for U.S. Appl. No. 14/463,486, of Kumar, A., filed Aug. 19, 2014.

Final Office Action dated May 9, 2017, for U.S. Appl. No. 14/463,486, of Kumar, A., filed Aug. 19, 2014.

Non-Final Office Action dated Nov. 9, 2017, for U.S. Appl. No. 14/463,486, of Kumar, A., filed Aug. 19, 2014.

Final Office Action dated Apr. 6, 2018, for U.S. Appl. No. 14/463,486, of Kumar, A., filed Aug. 19, 2014.

Advisory Action dated Jun. 7, 2018, for U.S. Appl. No. 14/463,486, of Kumar, A., filed Aug. 19, 2014.

Non-Final Office Action dated Jul. 25, 2018, for U.S. Appl. No. 14/463,486, of Kumar, A., filed Aug. 19, 2014.

International Search Report and Written Opinion for International Application No. PCT/US2018/026921, dated Aug. 13, 2018.

Non-Final Office Action dated Feb. 12, 2019, for U.S. Appl. No. 15/495,218, of Bell, B., et. al., filed Apr. 24, 2017.

Final Office Action dated Sep. 17, 2019, for U.S. Appl. No. 15/495,218, of Bell, B., et. al., filed Apr. 24, 2017.

\* cited by examiner

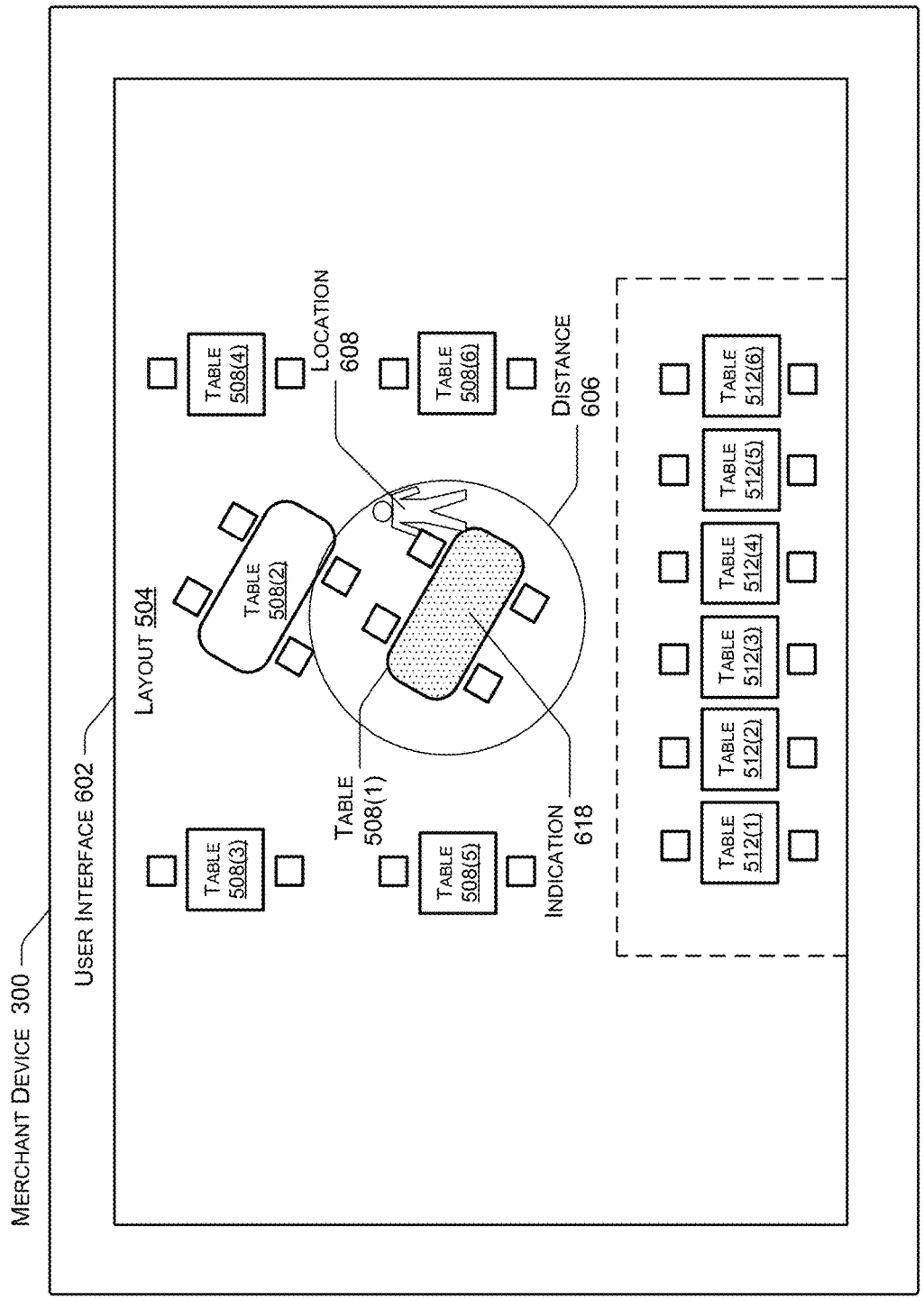

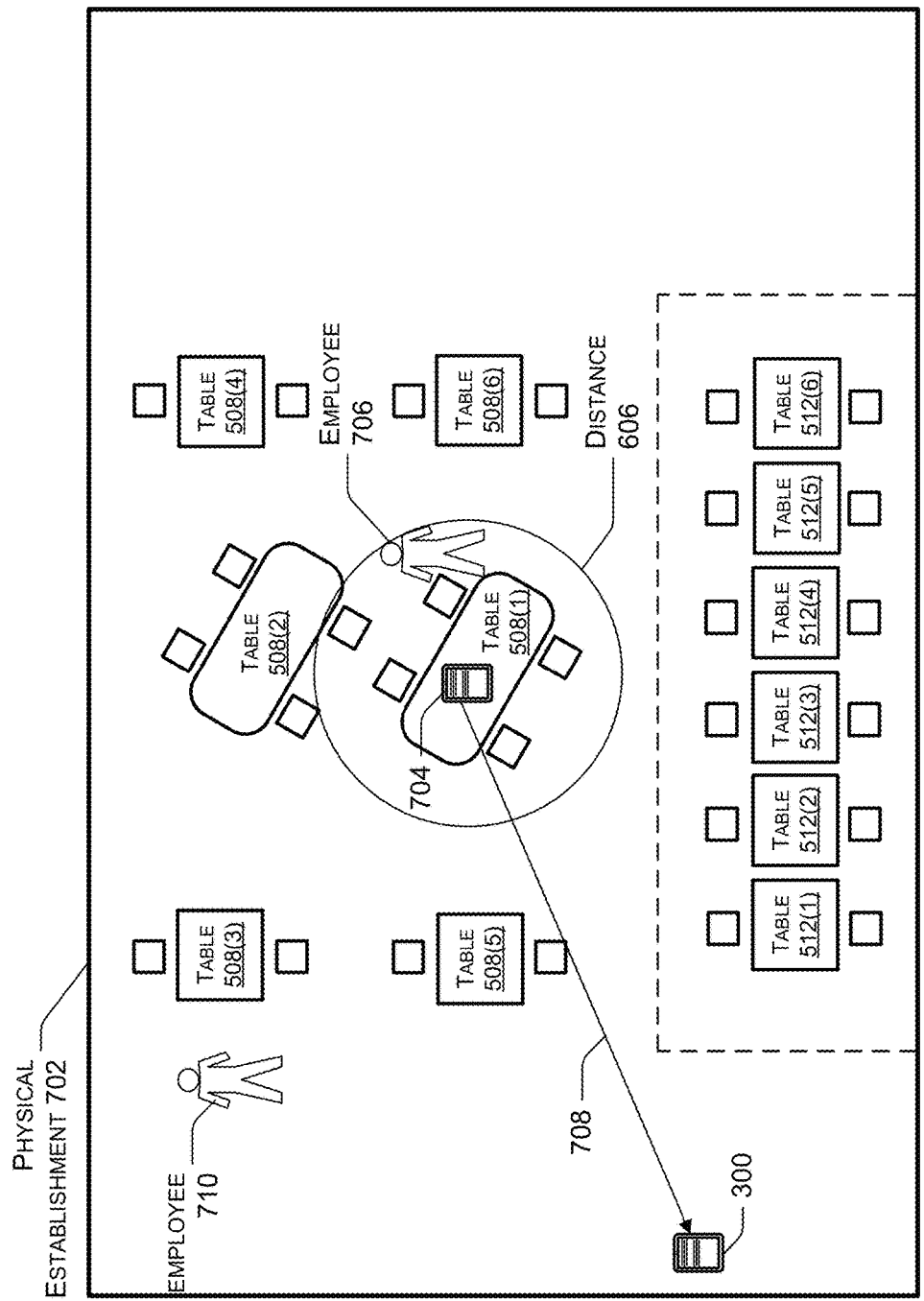

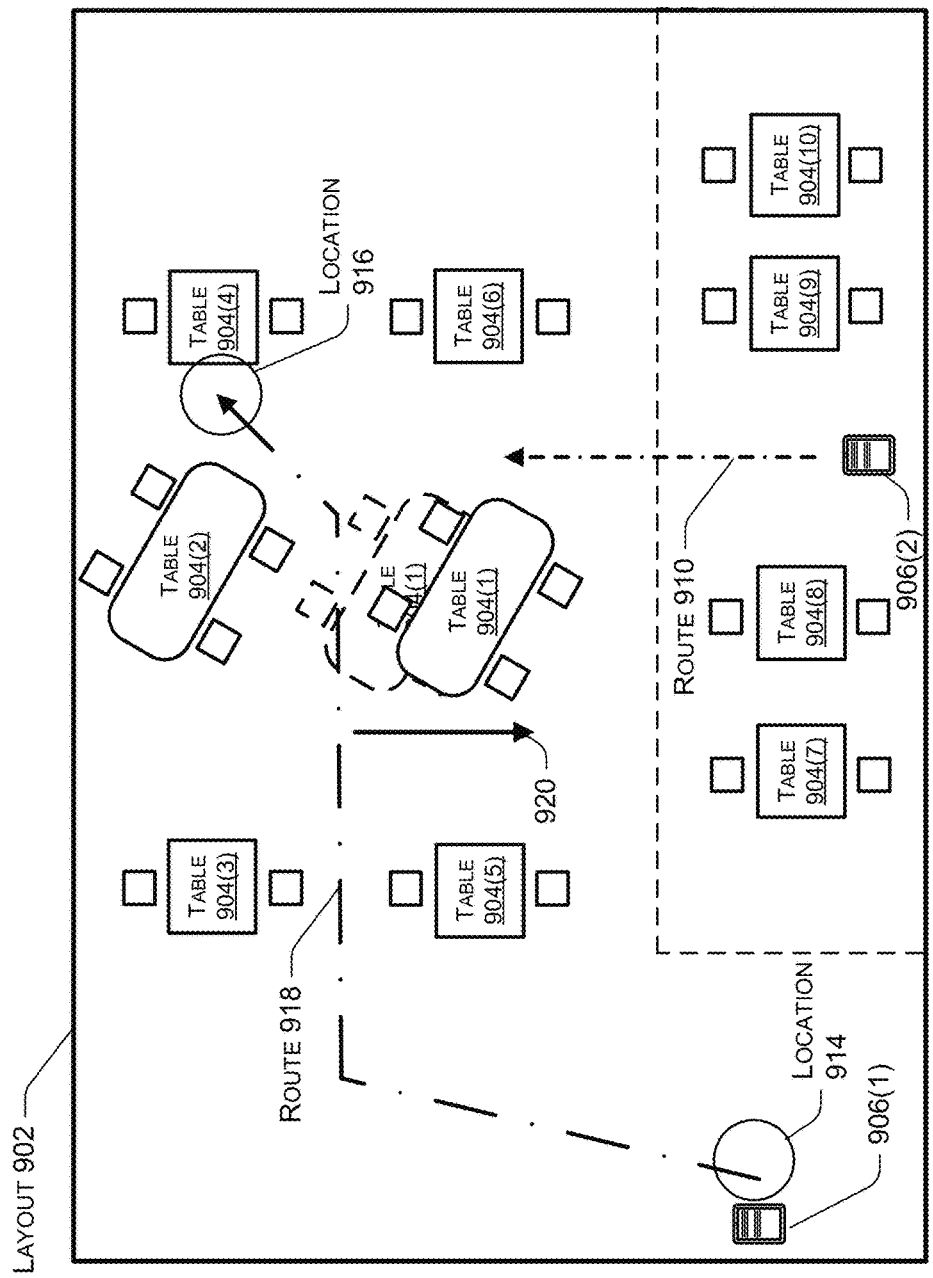

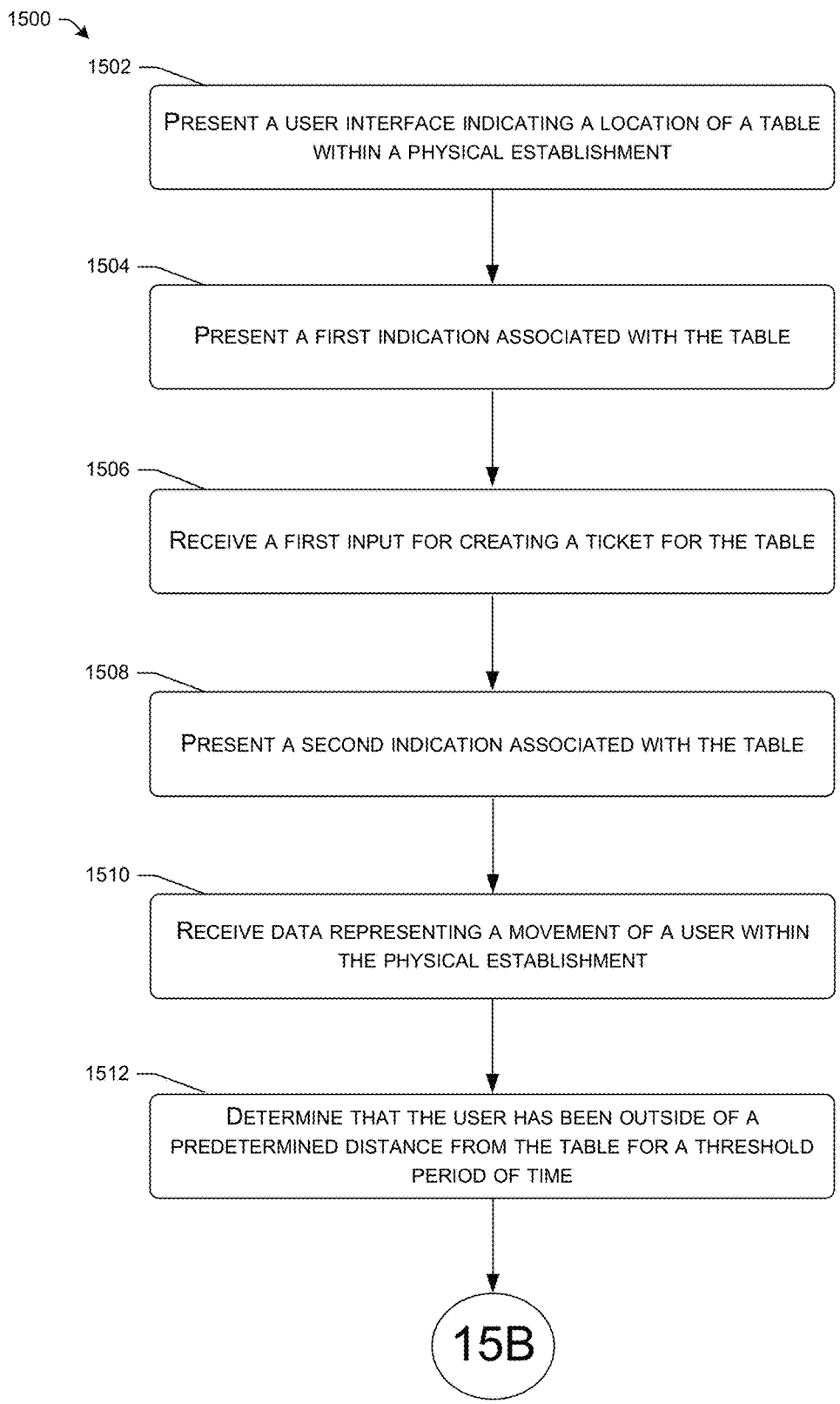

ANALYZING LAYOUTS USING SENSOR DATA

BACKGROUND

During transactions with customers, merchants may use point-of-sale (POS) devices to manage respective customers within the merchants' physical establishments. For instance, a POS device can display a layout of a restaurant to a merchant. The layout can indicate designated sections within the restaurant, such as the kitchen, the dining room, the bar, or the waiting area. The layout can further indicate locations of objects within the restaurant, such as tables or chairs.

Using the POS device, the merchant can indicate which tables are currently occupied by customers, and which tables are open for new customers. For instance, the POS device may receive input indicating that customers were seated at a table within the restaurant. In response, the layout may display an indication that notifies the merchant that the table is occupied by customers. When the customers are finished, and have left the table, the POS device may receive input indicating that the table is open. In response, the layout may display an indication that the table is open.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 6A-6F illustrate an example of a merchant utilizing a user interface during a transaction.

FIGS. 7A-7C illustrate examples of determining a geographical location of a merchant within a physical establishment.

FIGS. 9A-9D illustrate a first example of analyzing sensor data to update a layout of a physical establishment.

FIGS. 15A-15B illustrate a flow diagram of a first example process for utilizing a user interface.

DETAILED DESCRIPTION

Figure 1:
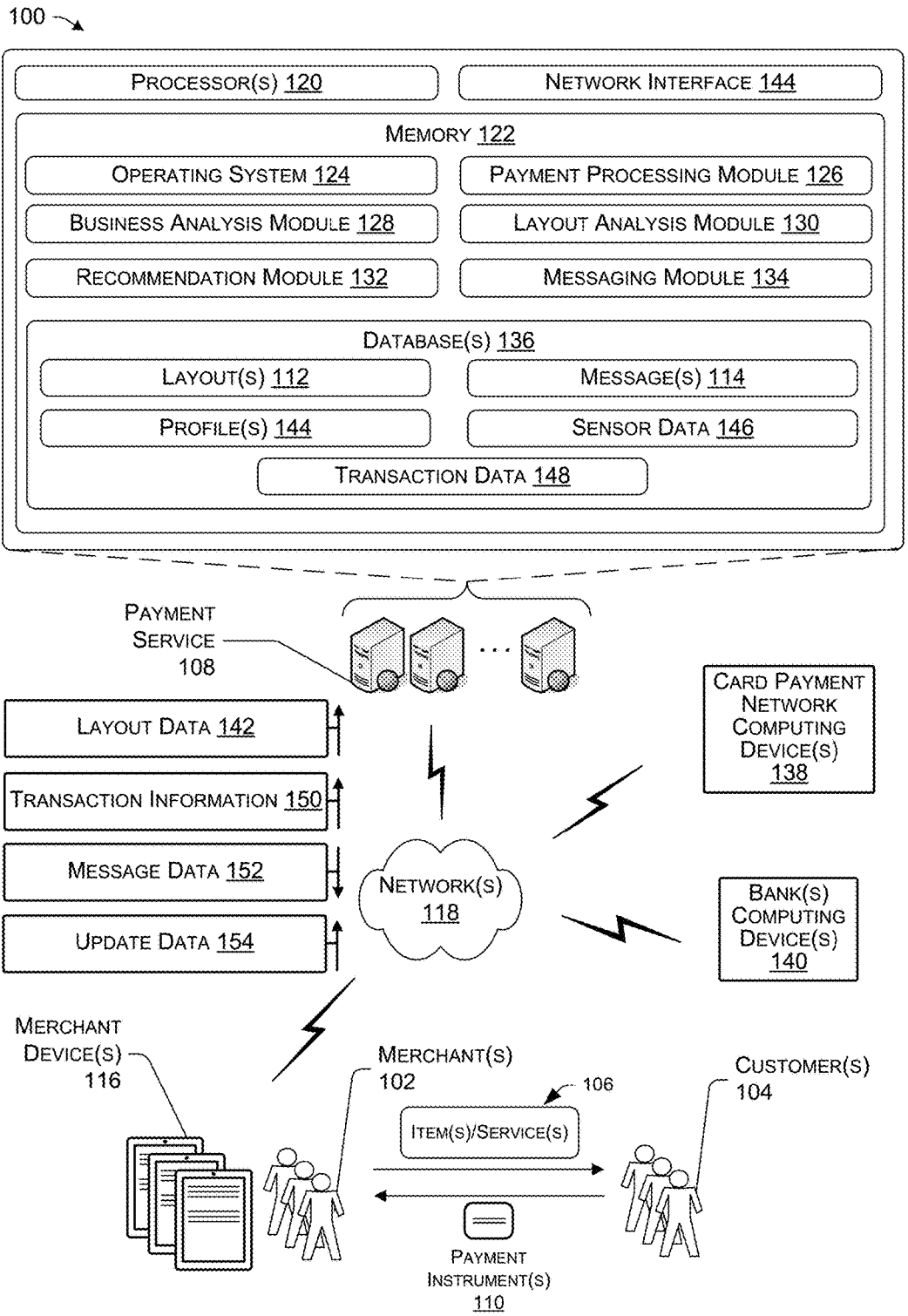
FIG. 1 illustrates an example environment in which techniques discussed herein may be implemented.

This disclosure describes, in part, user interfaces for generating and utilizing layouts of physical establishments, as well as techniques for analyzing data (e.g., sensor data, templates representing other layouts, etc.) to update the layouts via the user interfaces. For instance, a merchant device may present a user interface to a merchant via a display device. The merchant can use the user interface to create one or more layouts associated with a physical establishment of the merchant. In some instances, a layout can correspond to a floor plan of the physical establishment. For instance, the layout can indicate locations of one or more designate sections within the physical establishment, such as the waiting area, dining room, bathroom, kitchen, retail area, patio, or the like. The layout can further indicate locations of objects within the physical establishment, such as tables, chairs, televisions, merchant devices, items, rugs, windows, or the like.

For instance, to create a layout, the merchant device may present a "blank canvas" that the merchant can use to indicate locations of designated sections and objects within the physical establishment. For example, the merchant device may receive, via the user interface, input that indicates locations of designated sections within the physical establishment. Based on receiving the input, the merchant device can update the layout on the user interface to include graphical elements (e.g., border lines, highlighted areas, etc.) corresponding to the designated sections of the physical establishment at the indicated locations. The merchant device can further receive, via the user interface, input that indicates respective locations of objects within the physical establishment. Based on the input, the merchant device can update the layout on the user interface to include graphical elements corresponding to the objects located at the respective locations within the physical establishments.

After the merchant creates the layout, the merchant device can receive input indicating that the layout is complete. The merchant device can then generate data (e.g., a template) that represents the layout, and store the data locally. Additionally, in some instances, the merchant device can send the data to a payment service, via a network connection, for storage or analysis. For instance, the payment service can receive the data from the merchant device and store the data in one or more databases. The payment service can further analyze the data (i.e., the layout) with respect to additional data representing additional layouts of additional physical establishments associated with additional merchants. Based on the analysis, the payment service can send recommendations to the merchant that indicate areas within the physical establishment to designate as one or more designated sections and/or locations for placing objects within the physical establishment.

For instance, the payment service can determine a type of business associated with the merchant. In some examples, the type of business may include a retail merchant, a restaurant merchant, a services merchant (e.g., merchant that provides services), or the like. In some examples, the type of business may be more specific to the merchant. For instance, the payment service may determine the type of business associated with the merchant using a MCC and/or other type of code that defines the merchant's business. In either example, the payment service may then identify at least a second merchant that is also associated with the type of business. The payment service can then analyze the data representing the layout of the physical establishment of the merchant with respect to data representing an additional layout of an additional physical location associated with the second merchant.

For instance, the payment service may compare the layout of the physical establishment to the additional layout of the additional physical establishment to identify differences between locations of designated sections and/or objects within the physical establishment and locations of designated sections and/or objects within the additional physical establishment. The payment service can then generate one or more recommendations for the merchant based on the comparing. For instance, the payment service can generate a recommendation that indicates that the merchant move a location (e.g., an area) of a designated section within the physical establishment to a new location (e.g., a new area). For another example, the payment service can generate a recommendation that indicates that the merchant move an object from a first location within the physical establishment to a second location within the physical establishment. In either example, the payment service can send a message that includes a recommendation to the merchant.

The merchant device can receive a message from the payment service. In response, the merchant device can present the message that includes the recommendation to the merchant. If the merchant agrees with the recommendation, the merchant can update the physical establishment by changing the location of a designated section and/or changing the location of an object. The merchant device can then receive input indicating any changes. For instance, the merchant can use the user interface to update the layout based on the changes made to the physical establishment. Based on receiving the input, the merchant device can update the layout to reflect the changes, and save the updated layout locally. Additionally, the merchant device can send the payment service data representing the updated layout and/or send the payment service data indicating the changes.

In some instances, the payment service can utilize one or more other factors when analyzing the layout for the merchant. For instance, the payment service can determine that a specific event (e.g., a holiday, birthday, sporting event, etc.) is approaching that may cause an increase or decrease to the number of customers that visit the physical establishment of the merchant. In some instances, the payment service determines that the specific event is approaching based on a current time period being within a threshold time (e.g., one day, one week, one month, etc.) from the special event. The payment service can then generate and provide the merchant with recommendations that are based on the estimated increase or decrease in the number of customers. For example, the payment service may generate and provide the merchant a recommendation that indicates that the merchant should add more tables and chairs to the physical establishment when the specific event is likely to cause an increase in the number of customers. For another example, if the specific event includes a sporting event, the payment service may generate and provide the merchant a recommendation that indicates that the merchant add more televisions or change the layout of the physical establishment so that more tables and accompanying chairs face the television.

In some instances, the payment service can analyze the layout using sensor data associated with the physical establishment. For instance, the payment service can receive sensor data representing movements of users (e.g., the merchant's employees, customers, etc.) within the physical establishment. In some instances, the sensor data can include location data received from respective electronic devices associated with, and in possession of, each of the users. In some instances, the sensor data can include image data representing the physical establishment, which is captured from or more image capturing devices located within the physical establishment. In either instance, the payment service can the analyze the sensor data to track routes of the users through the physical establishment. Based on the routes, the payment service can generate and provide recommendation to the merchant.

For instance, the payment service can identify locations (e.g., cluster locations) within the physical establishment that cause a "bottleneck" to the movements of the users within the physical establishment. In some instances, the payment service can identify a bottleneck based on respective locations along two or more of the routes corresponding to one another (e.g., being similar, being within a threshold distance, etc.) at a specific time period (e.g., same time period, within two seconds, within five seconds, etc.). In some instances, the payment service can identify a bottleneck based on a threshold number of the routes including respective locations that correspond to one another at a specific time period. Based on identifying a bottleneck, the payment service can generate and provide the merchant a recommendation for reducing or eliminating the bottleneck within the physical establishment.

For example, for at least one of the routes identified as creating the bottleneck, the payment service can identify a starting location and an ending location associated with the route. The payment service can then generate a second route within the physical establishment that starts at the starting point, ends at the ending point, and does not include the location of the bottleneck. Using the second route, the payment service can generate and provide the merchant with a recommendation. For example, the payment service can determine that an initial location of an object (e.g., a table) is along the line of the second route. The payment service can then determine a new location (e.g., an optical location) for the object such that the object is no longer located along the second route. Using the new location, the payment service can generate and provide the merchant with a message that recommends that the merchant move the object to the second location so that the user can use the second route through the physical establishment.

For another example, the payment service can identify an object that is located near (e.g., proximate to) the bottleneck location, such as within a threshold distance (e.g., one foot, two feet, five, feet, or the like). The payment service can then identify a new location (e.g., optical location) for placing the object such that the users have more room to move around the bottleneck location. For instance, if a first user's location and a second's user location are within a threshold distance at the bottleneck location, then the payment service can identify and optical location for the object such that the threshold distance is increased when the first user and the second user are moving within the physical establishment.

In addition to generating layouts, the merchant can use utilize one of the layouts during transactions with customers. For instance, the merchant device can present a layout of the physical establishment to the merchant. As discussed above, the layout can indicate locations of designated areas and objects within the physical establishment. For instance, the layout can indicate locations of tables and chairs within the physical establishment. The user interface can further present indications based on one or more states of the tables or chairs. The states can indicate that a table (and/or similarly a chair) is open, is occupied by one or more customers, requires assistance from the merchant, does not require assistance from the merchant, received a check, or the like.

For instance, the merchant device can cause the user interface to present a first indication that indicates that a table is in a first state when the table is open. A table is open when no other customer is located at the table, and the table is ready for a new customer. The merchant device may then receive input indicating that one or more customers are being seated at the table. In some instances, the input can include a selection corresponding to creating a ticket for the table. Based on the input, the merchant device can create and associate the ticket with the table, and cause the user interface to present a second indication that indicates the table is occupied by the one or more customers. The merchant device can further cause the user interface to present a timer that indicates an amount of time that the one or more customers are seated at the table.

While the one or more customers are at the table, the merchant device can receive inputs indicating items ordered by the one or more customers during the transaction. In response, the merchant device can update the ticket to indicate the items, a cost of the item, or the like. The merchant device can further determine whether the one or more customers at the table are in need of assistance. For instance, the merchant device can determine that the merchant (e.g., an associated of the merchant, such as an employee, like a waiter) has not checked in on the one or more customers for a threshold period of time (e.g., five minutes, ten minutes, thirty minutes, etc.). Based on the determination, the merchant device can cause the user interface can present a third indication that indicates that the table requires assistance from the merchant. In some instances, the third indication can change based on the amount of time since the merchant has last checked in on the one or more customers. For instance, the third indication can change color or size of the object so as to indicate the amount of time a customer has been without service.

The merchant device can use sensor data to determine that the merchant has not checked in on the one or more customers for the threshold period of time. In some instances, the sensor data can include data received from an electronic device associated with an employee assigned to the table within a given time period. For instance, the employee may be in possession of the electronic device, and the electronic device may send the merchant device data indicating geographical locations of the electronic device within the physical establishment. The merchant device can receive the data from the electronic device, and then analyze the data to determine whether the electronic device has been proximate to the table. In some instances, the merchant device determines that the electronic device has not been proximate to the table, and thus the merchant has not checked in on the table, based on the geographical location of the electronic device being outside of a predetermined distance (e.g., a foot, five feet, ten feet, etc.) of the table for the threshold period of time.

Additionally, or alternatively, in some instances, the sensor data can include data received from an electronic device associated with the table. For instance, an electronic device may be positioned on and/or near the table, where the electronic device detects when an employee is within the predetermined distance of the table. In some instances, the electronic device may detect an employee based on detecting a tag (e.g., a radio-frequency identification (RFID) tag) in possession of the employee. Based on detecting an employee, the electronic device can send the merchant device the sensor data that indicates that the electronic device detected the employee. As such, the merchant device can determine that the merchant has not checked in on the table based on the merchant device not receiving the sensor data and/or receiving sensor data that does not indicate that the electronic device detected the employee for the threshold period of time.

Additionally, or alternatively, in some instances, the sensor data can include image data captured from one or more image capturing devices. For instance, the merchant device can receive image data from one or more image capturing devices located within the physical establishment, where the image data represents the physical establishment. The merchant device can then analyze the image data to track the respective geographical locations of the employees within the physical establishment. Using the respective geographical locations, the merchant device can determine that the merchant has not checked in on the table based on the respective geographical locations being outside of the predetermined distance for the threshold period of time.

In addition to using the sensor data to determine that the merchant has not checked in on the table, the merchant device can use similar techniques to determine that the merchant has checked in on the table. For example, the merchant device can receive sensor from an electronic device associated with the employee and analyze the sensor data to determine that a geographical location of the electronic device was within the predetermined distance. For a second example, the merchant device can receive sensor data from the electronic device associated with the table and analyze the sensor data to determine that the electronic device detected an employee. For a third example, the merchant device can receive the sensor data (e.g., image data) from the one or more image capturing devices and analyze the sensor data to determine that an employee was within the predetermined distance from the table. In either example, the merchant device can cause the user interface can present a fourth indication that indicates that the table does not require assistance.

During the transaction, the merchant device can receive input indicating that the one or more customers are ready for the ticket. Based on the input, the merchant device can provide the ticket to the one or more customers. In some instances, the merchant device can provide the ticket by sending data representing the ticket to an electronic device (e.g., an electronic device associated with the table, an electronic device associated with a customer, etc.). In some instances, the merchant device can provide the ticket by printing a physical copy of the ticket for the one or more customers. In either instance, the merchant device can cause the user interface to present a fifth indication that indicates that the one or more customers received the ticket.

After providing the ticket, the merchant device can receive input associated with a payment instrument of the one or more customers. The merchant device can then attempt to authorize the payment instrument for a cost of the ticket, and provide an indication that indicates whether the payment instrument was authorized. Additionally, the merchant device can cause the user interface to present a sixth indication that indicates that the table is once again open and ready for one or more new customers.

It should be noted that, although the above describes specific techniques and processes that are performed by either a payment service or a merchant device, the above techniques and processes can be performed by any combination of the payment service, the merchant device, or one or more other electronic devices. For instance, in some examples, the merchant device may perform the techniques and processes described above for analyzing layouts and data to generate and provide recommendations. Additionally, in some examples, the payment service may perform the techniques and processes described above for analyzing sensor data to determine one or more states of tables or chairs within the physical establishment.

It should further be noted that, as described herein, messages can include any type of electronic communication that electronic devices can send and receive with other electronic devices. For instance, a message can include an email message, a short message service (SMS), multimedia messages (MMS), a voicemail message, an audio signal, or any other type of electronic communication that an electronic device can send to another electronic device. In some instances, an electronic device may use messages to send indications, notifications, alerts, and/or requests to another electronic device.

Additionally, as described herein, image data can include still image data and video data. Still image data can represent images captured within a physical environment by an image capturing device at given time intervals. Video data can represent a video captured within the physical environment from an image capturing device. For instance, formats for image data can include Joint Photographic Expert Group (JPEG), Exchangeable Image File Format (Exif), Tagged Image File Format (TIFF), Graphics Interchange Format (GIF), Portable Network Graphics (PNG), Better Portable Graphics (BPG) or any other type of image data format that electronic devices can send and receive with one another.

FIG. 1 illustrates an example environment 100 that includes merchant(s) 102 conducting transactions with customer(s) 104 for item(s)/service(s) 106, as well as a payment service 108 to authorize payment instrument(s) 110 of the customer(s) 104 for the transactions. FIG. 1 further illustrates that the payment service 108 analyzes and updates layout(s) 112 associated with the merchant(s) 102. Furthermore, FIG. 1 illustrates that the payment service 108 generating and/or providing message(s) 114 for merchant(s) 102.

As used in herein, merchant device(s) 116 may comprise any sort of mobile or non-mobile devices (e.g., electronic device(s)) that include instances of application(s) that execute on the respective devices. The application(s) may provide POS functionality to the merchant device(s) 116 to enable merchant(s) 102 (e.g., owners, employees, etc.) to at least accept payments from the customer(s) 104. In some types of businesses, the merchant device(s) 116 may correspond to a store or other place of business of the merchants, and thus, may be a fixed location that typically does not change on a day-to-day basis. In other types of businesses, however, the location of the merchant device(s) 116 may change from time to time, such as in the case that the merchant(s) 102 operate a food truck, is a street vendor, is a cab driver, etc., or has an otherwise mobile business, e.g., in the case the merchant(s) 102 sell items at buyer's homes, places of business, and so forth. In either of the examples above, the place of business of the merchant(s) 102 may be referred to a physical establishment.

Additionally, as used herein, a merchant 102 (also referred to as an "entity") may include any business engaged in the offering of items (e.g., goods) or services for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and merchant(s) 102. For example, when paying for a transaction, the customer 104 can provide the amount that is due to the merchant 102 using cash or other payment instrument 110 (e.g., a debit card, a credit card, a stored-value or gift card, a check, through an electronic payment application on a device carried by the customer 104, or the like). The merchant 102 can interact with the merchant device(s) 116 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the device when the card is "dipped" into the reader, a radiofrequency identification tag, or so forth.

During a transaction between a merchant 102 and a customer 104, the merchant device(s) 116 can determine transaction information describing the transaction, such as the payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, a location of a customer within a physical establishment (e.g., a chair, a table, etc.) and so forth. The merchant device(s) 116 can send the transaction information to the payment service 108 over a network 118, either substantially contemporaneously with the conducting of the transaction (in the case of online transactions) or later when the device is in the online mode (in the case offline transactions).

The payment service 108 may include one or more processors 120 and memory 122, which may store an operating system 124, a payment processing module 126, a business analysis module 128, a layout analysis module 130, a recommendation module 132, a messaging module 134, and database(s) 136. The payment processing module 126 may function to receive the information regarding the transaction from the merchant device(s) 116 and attempt to authorize the payment instrument 110 used to conduct the transaction. The payment processing module 126 may then send an indication of whether the payment instrument 110 has been approved or declined back to the merchant device(s) 116.

Generally, when a customer 104 and a merchant 102 enter into an electronic payment transaction, the transaction is processed by electronically transferring funds from a financial account associated with the customer 104 to a financial account associated with the merchant 102. As such, the payment processing module 126 may communicate with one or more computing devices of a card network (or "card payment network") 138, e.g., MasterCard®, VISA®, over the network 118 to conduct financial transactions electronically. The payment processing module 126 can also communicate with one or more computing devices of one or more banks 140, processing/acquiring services, or the like over the network 118. For example, the payment processing module 126 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may analyze layout(s) 112 associated with respective physical establishments of merchant(s) 102 in order to provide message(s) 114 that includes recommendations associated with the layout(s) 112 to the merchant(s) 102. In some instances, a layout 112 can correspond to a floor plan of the physical establishment of a merchant 102. For instance, the layout 112 corresponding to a floor plan can indicate locations of one or more designate sections within the physical establishment, such as the waiting area, dining room, bathroom, kitchen, retail area, patio, or the like. The layout 112 can further indicate locations of objects within the physical establishment, such as tables, chairs, televisions, merchant devices, items, or the like.

To analyze a layout 112, the payment service 108 may receive data representing the layout 112 from a merchant device 116 associated with a first merchant 102, as representing by layout data 142. The payment service 108 can then utilize the business analysis module 128 to identify at least a second merchant 102 that is associated with a similar type of business as the first merchant 102. For instance, the business analysis module 128 can analyze data associated with the first merchant 102 to identify a type of business associated with the first merchant 102. In some instances, analyzing the data can include analyzing a profile 144 associated with the first merchant 102 that indicates the type of business. The payment service 108 can then analyze data (e.g., profile(s) 144) associated with other merchant(s) 102 to identify at least a second merchant 102 that is also associated with the type of business.

In some examples, the type of business associated with a merchant 102 may be general, such as a retail merchant, a restaurant merchant, a services merchant (e.g., merchant that provides services), or the like. In some examples, the type of business may be more specific to the merchant 102. For instance, the business analysis module 128 may determine the type of business associated with the merchant 102 using a MCC and/or other type of code that defines the merchant's business.

The payment service 108 can then utilize the layout analysis module 130 to analyze the first layout 112 associated with the first physical establishment of the first merchant 102 with respect to second layout(s) 112 of respective second physical establishments of the identified second merchant(s) 102. For instance, for one of the second merchant(s) 102, the layout analysis module 130 can compare the first layout 112 of the first physical establishment to a second layout of a second physical establishment to identify at least differences between the locations of designated sections and/or objects within the first physical establishment and locations of designated sections and/or objects within the second physical establishment.

For example, based on the analysis, the layout analysis module 130 may determine that the first layout 112 indicates that a designated section (e.g., a kitchen area) is located near the center of the first physical establishment, and that the second layout 112 indicates that the same designated section is located near the north end of the second physical establishment. For another example, and again based on the analysis, the layout analysis module 130 may determine that the first layout 112 indicates that objects (e.g., tables) are located near the bathroom of the first physical establishment, and that the second layout 112 indicates that similar objects (e.g., also tables) are located near the kitchen of the second physical establishment. Based on identifying the differences, the payment service 108 can generate and provide message(s) 114 that includes recommendations for the first layout 112 to the first merchant 102.

For instance, the payment service 108 can utilize the recommendation module 132 to generate a recommendation for the first merchant 102 based on the analysis. The recommendation can indicate that the first merchant 102 move a location of a designated section and/or that the first merchant 102 move a location of an object within the first physical establishment. For example, and using the example above with respect to the designated section, the recommendation module 132 can generate a recommendation for the first merchant 102 that indicates that the first merchant 102 move the designated area (e.g., the kitchen in the example above) to the north end of the first physical establishment, similar to the second physical establishment. For another example, and using the example above with respect to the objects, the recommendation module 132 can generate a recommendation for the first merchant 102 that indicates that the first merchant 102 move the objects (e.g., tables in the example above) near the kitchen of the first physical establishment, similar to the second physical establishment.

It should be noted that, in some instances, based on the analysis, the recommendation module 132 may generate recommendations for designated sections and/or objects that are not already located within the first physical establishment of the first merchant 102. For instance, based on the comparison above, the layout analysis module 130 may determine that the second layout 112 indicates a designated section and/or object that is not included in the first layout 112. Based on the determination, the recommendation module 132 can generate a recommendation that indicates that the first merchant 102 add the designed section and/or object to the first physical establishment. In some instances, the generated recommendation may further indicate a location for the designated section and/or object within the first physical establishment. As such, in some instances, even new merchant(s) 102 that have yet to create a full layout of a physical establishment can still receive recommendations from the payment service 108.

In some instances, the layout analysis module 130 can analyze layout(s) 112 using other techniques. For instance, the layout analysis module 130 can determine that a specific event (e.g., a holiday, birthday, sporting event, etc.) is approaching that may cause an increase or a decrease to the number of customer(s) 104 that visit the first physical establishment of the first merchant 102. In some instances, the layout analysis module 130 determines that the specific event is approaching based on a current time period being within a threshold time (e.g., one day, one week, one month, etc.) from the special event. Based on the determination, the recommendation module 132 can generate a recommendation based on the estimated increase or decrease in the number of customer(s) 104.

For example, the recommendation module 132 can generate a recommendation that indicates that the first merchant 102 add more objects (e.g., tables, chairs, televisions, etc.) to the first physical establishment in order to accommodate an increase in the number of expected customer(s) 104. For a second example, the recommendation module 132 can generate a recommendation that indicates that the first merchant 102 increase the area of a designated section (e.g., the bar area) in order to accommodate an increase in the number of customer(s) 104 that are expected to utilize the designated section at the first physical establishment (e.g., more customer(s) 104 are expected in the bar area to watch a specific sporting event). Finally, for a third example, the recommendation module 132 may generate a recommendation that indicates that the first merchant 102 remove objects (e.g., tables) from the first physical establishment since the number of customer(s) 104 is expected to decrease, and as such, customer(s) 104 will be more comfortable with the added room.

Additionally, or alternatively, in some instances, the layout analysis module 130 can analyze the layout(s) 112 using sensor data 146 associated with the physical establishments. For instance, the payment service 108 can receive sensor data 146 representing movements of users (e.g., merchant(s) 102, such as employees, and/or customer(s) 104) within the first physical establishment of the first merchant 102. In some instances, the sensor data 146 can include location data received from respective electronic devices associated with, and in possession of, each of the users. In some instances, the sensor data 146 can include image data representing the physical establishment, which is captured from or more image capturing devices located within the first physical establishment. In either instance, the layout analysis module 130 can analyze the sensor data 146 to track routes of the users through the first physical establishment. Based on the routes, the recommendation module 132 can generate a recommendation for the first merchant 102.

For instance, the layout analysis module 130 can identify locations (e.g., cluster locations) within the first physical establishment that cause a "bottleneck" to the movements of the users. In some instances, the layout analysis module 130 can identify a bottleneck based on respective locations along two or more of the routes corresponding to one another (e.g., being similar, being within a threshold distance, etc.) at a specific time period (e.g., same time period, within two seconds, within five seconds, etc.). In some instances, the layout analysis module 130 can identify a bottleneck based on a threshold number of the routes including respective locations that correspond to one another at a specific time period. Based on identifying a bottleneck, the recommendation module 132 can generate a recommendation for reducing or eliminating the bottleneck within the first physical establishment For example, for at least one of the routes identified as creating the bottleneck, the layout analysis module 130 can identify a starting location and an ending location associated with the route. The layout analysis module 130 can then generate a second route within the first physical establishment that starts at the starting point, ends at the ending point, and does not include the location of the bottleneck. Using the second route, the layout analysis module 130 can determine that an initial location of an object (e.g., a table) is located along the line of the second route. The layout analysis module 130 can then determine a new location (e.g., an optimal location) for the object such that the object is no longer located along the second route. Using the new location, the recommendation module 132 can generate recommendation that indicates that the first merchant 102 move the object to the new location.

For another example, the layout analysis module 130 can identify an object that includes an initial location that is proximate to the location of the bottleneck (e.g., the clustering location). In some instance, the layout analysis module 130 identifies the object based on an initial location of the object being within a threshold distance to the location, such as one foot, five feet, or the like. The layout analysis module 130 can then determine an optimal location for the object. For instance, if the layout analysis module 130 identifies the location of the bottleneck by identifying that a first location of a first user is within a threshold distance to a second location of a second user, the layout analysis module 130 can determine an optimal location of the object such that the threshold distance between the first location and the second location is increased. In other words, by moving the object, users will have more room to move in an area around the bottleneck location within the physical establishment.

In some instances, the layout analysis module 130 can analyze the layout(s) 112 using transaction data 148. For instance, as discussed above, the payment service 108 may receive transaction information associated with transactions conducted between merchant(s) 102 and customer(s) 104, as represented by 150. The transaction information for a respective transaction can indicate payment information of the payment instrument 110, an amount of payment received from the customer 104, the item(s)/service(s) 106 acquired by the customer 104, a time, place and date of the transaction, a card network associated with the payment instrument 110, an issuing bank of the payment instrument 110, a name of the customer 104, a location of a customer within a physical establishment (e.g., a chair, a table, etc.) and so forth. The payment service 108 can store the transaction information as transaction data 148 within the databases(s) 136.

To analyze the first layout 112 using the transaction data 148, the layout analysis module 130 can use the transaction data 148 associated with the first merchant 102 to identify one or more tables, chairs, or designated sections in which customer(s) 104 acquire a greater amount of item(s)/service(s) 106 than other tables, chairs, or designated sections within the first physical establishment. For instance, the layout analysis module 130 may analyze the first layout 112 with respect to the transaction data 148 to identify that a designated section (e.g., the bar area) within the first physical establishment has a higher sales volume than any other designated section (e.g., the dining area) within the first physical establishment. For another example, the layout analysis module 130 may analyze the first layout 112 with respect to the transaction data 148 to identify that tables located within a first portion (e.g., near the kitchen) of a designated area (e.g., dining area) have a higher sales volume than tables located within a second portion (e.g., near the bathrooms) of the designated area.

Based on the analysis of the transaction data 148, the recommendation module 132 can generate one or more recommendations for the first merchant 102 in order to maximize sales within the first physical establishment. In some instances, the recommendation engine 132 may recommend that the first merchant 102 change the layout of the first physical establishment such that designated sections with greater sales volume are increased in size. For example, and using the example above, the recommendation engine 132 may generate a recommendation that indicates that the first merchant 102 increase the area designated to the bar based on the bar including a higher sales volume than other designated sections of the first physical establishment (e.g., the dining area). In some instances, the recommendation engine 132 may recommend that the first merchant 102 change the locations of objects to areas of the first physical establishment that include the greatest sales volume. For example, and using the example above, the recommendation engine 132 may generate a recommendation that indicates that the first merchant 102 move tables from the second portion of a designated area to the first portion of a designated area based on the first portion including a higher sales volume that the second portion.

In some instances, the layout analysis module 148 can further use transaction data 148 associated with other merchant(s) 102 when generating and providing recommendations. For instance, the layout analysis module 148 can analyze transaction data 148 associated with at least a second merchant 102 (e.g., a merchant 102 that is similar to the first merchant 102) to determine that a first designated section (e.g., the bar) within a second physical establishment of the second merchant 102 includes a higher sales volume than a second designated section (e.g., a dining area). The layout analysis module 130 can further determine that a second layout 112 associated with the second physical establishment includes a larger area for the first designated section than the first layout 112 associated with the first physical establishment. Based on the determinations, the recommendation module 130 can generate a recommendation that indicates that the first merchant 102 increase the amount of area within the first physical establishment that is designated to the first section.

Based on any of the recommendation techniques described above, the payment service 108 can send the first merchant 102 a message 114 that includes the recommendation. For instance, the payment service 108 can utilize the messaging module 134 to generate a message 114 for the first merchant 102 that includes a recommendation. The payment service 108 can then send the message 114 to the merchant device 116 associated with the first merchant 102, as represented by 152. The merchant device 116 can receive the message 114 from the payment service 108 and provide the message 114 to the first merchant 102. For instance, the merchant device 116 can receive the message 114 and display the recommendation to the first merchant 102.

Based on the first merchant 102 agreeing with the recommendation, and making the change within the first physical establishment, the merchant device 116 can the receive input indicating that the change has been made. The merchant device 116 can then update data representing the first layout 112 as stored locally on the merchant device 116. Additionally, the merchant device 116 can send the payment service 108 data indicating the update, as represented by 154, so that the payment service 108 can update the first layout 112 stored locally within the database(s) 136.

It should be noted that, in some instances, the layout data 142 may include image data captured by one or more image capturing devices located with a physical establishment of a merchant 102. In such instances, the payment service 108 can analyze the image data to generate a layout 112 that represents the physical establishment. For instance, the payment service 108 can analyze the image data using one or more image processing techniques (e.g., appearance-based methods, such as edge matching, features-based methods, etc.) to identify respective locations of designated sections and/or respective locations of objects within the physical establishment. The payment service 108 can then generate a layout 112 based on the respective locations using any of the techniques described herein (e.g., updating the layout 112 to include graphical elements).

As discussed herein, processor(s), such as processor(s) 120, may comprise one or more processors or processing cores. For example, the processor(s) can be implemented as one or more microprocessors, microcomputers, microcontrollers, digital signal processors, central processing units, state machines, logic circuitries, and/or any devices that manipulate signals based on operational instructions. In some cases, the processor(s) may be one or more hardware processors and/or logic circuits of any suitable type specifically programmed or configured to execute the algorithms and processes described herein. The processor(s) can be configured to fetch and execute computer-readable processor-executable instructions stored in the memory.

Additionally, as discussed herein, memory, such as memory 122, may be an example of tangible non-transitory computer storage media and may include volatile and non-volatile memory and/or removable and non-removable media implemented in any type of technology for storage of information such as computer-readable processor-executable instructions, data structures, program modules or other data. The memory may include, but is not limited to, RAM, ROM, EEPROM, flash memory, solid-state storage, magnetic disk storage, optical storage, and/or other computer-readable media technology.

Further, in some cases, devices, such as merchant device(s) 116, the payment service 108, a customer device, or the like, can access external storage, such as RAID storage systems, storage arrays, network attached storage, storage area networks, cloud storage, or any other medium that can be used to store information and that can be accessed by the processor(s) directly or through another computing device or network. Accordingly, the memory may be computer storage media able to store instructions, modules or components that may be executed by the processor(s). Further, when mentioned, non-transitory computer-readable media exclude media such as energy, carrier signals, electromagnetic waves, and signals per se.

As discussed above, the memory 122 may include functional components, such as the operating system 124, for controlling and managing various functions of the payment service 108 and for enabling basic user interactions with the payment service 108.

Figure 2:
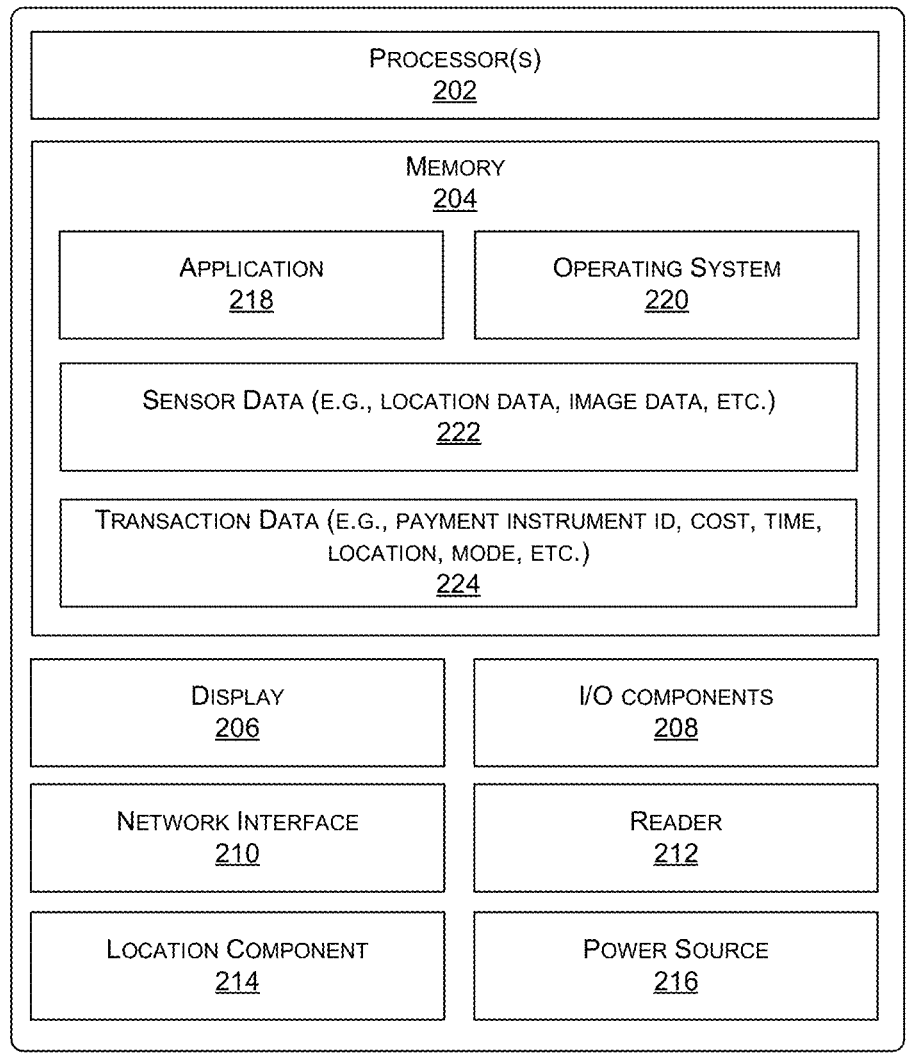
FIG. 2 illustrates components of a merchant device.

FIG. 2 illustrates select example components of an example merchant device 200 according to some implementations. The merchant device 200 may include any of the merchant device(s) 116 from FIG. 1. The merchant device 200 may be any suitable type of computing device, e.g., mobile, semi-mobile, semi-stationary, or stationary. Some examples of the merchant device 200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the merchant device 200 includes at least one processor 202, memory 204, a display 206, one or more input/output (I/O) components 208, one or more network interfaces 210, at least one card reader 212, at least one location component 214, and at least one power source 216. Each processor 202 may itself comprise one or more processors or processing cores. For example, the processor 202 can be implemented as one or more microprocessors, microcomputers, microcontrollers, digital signal processors, central processing units, state machines, logic circuitries, and/or any devices that manipulate signals based on operational instructions. In some cases, the processor 202 may be one or more hardware processors and/or logic circuits of any suitable type specifically programmed or configured to execute the algorithms and processes described herein. The processor 202 can be configured to fetch and execute computer-readable processor-executable instructions stored in the memory 204.

Depending on the configuration of the merchant device 200, the memory 204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 204 may include, but is not limited to, RAM, ROM, EEPROM, flash memory, solid-state storage, magnetic disk storage, optical storage, and/or other computer-readable media technology. Further, in some cases, the merchant device 200 may access external storage, such as RAID storage systems, storage arrays, network attached storage, storage area networks, cloud storage, or any other medium that can be used to store information and that can be accessed by the processor 202 directly or through another computing device or network. Accordingly, the memory 204 may be computer storage media able to store instructions, modules or components that may be executed by the processor 202. Further, when mentioned, non-transitory computer-readable media exclude media such as energy, carrier signals, electromagnetic waves, and signals per se.

The memory 204 may be used to store and maintain any number of functional components that are executable by the processor 202. In some implementations, these functional components comprise instructions or programs that are executable by the processor 202 and that, when executed, implement operational logic for performing the actions and services attributed above to the merchant device 200. Functional components of the merchant device 200 stored in the memory 204 may include an application 218, and an operating system 220.

The application 218 can provide the merchant device 200 with functionality for creating and updating layouts of a physical establishment. For instance, to create a layout, the application 218 may cause the merchant device 200 may present, via a user interface, a "blank canvas" that the merchant can use to indicate locations of designated sections and objects within a physical establishment. For instance, the merchant device 200 may receive, via the user interface, one or more inputs that indicate respective location(s) of designated section(s) within the physical establishment. In some instances, an input can include the merchant dragging an input device (e.g., a finger, a digital pen, a mouse cursor, or any other type of input device) across the canvas (e.g., portions of the display 206 presenting the canvas) to indicate the respective location of the designated area within the physical establishment. In some instances, an input can include the merchant drawing lines on the canvas that correspond to the borders of a designated area within the physical establishment. In either instance, based on receiving the one or inputs, the merchant device 200 can update the layout on the user interface to include graphical elements (e.g., border lines, highlighted areas, etc.) corresponding to the designated section(s) of the physical establishment at the indicated locations.

The merchant device 200 can further receive, via the user interface, one or more inputs that indicate respective location(s) of object(s) located within the physical establishment. In some instances, an input may correspond to the merchant drawing a "sketch" of an object at a location on the canvas that correspond to the respective location of the object within the physical environment. In some instances, an input may correspond to the merchant clicking on a pre-generated graphical element corresponding to the object and dragging the graphical element to the location on the canvas that corresponds to the respective location of the object within the physical establishment. In either instance, based on the input, the merchant device 200 can update the layout on the user interface to include graphical elements corresponding to the objects located at the respective locations within the physical establishments.

In some instances, the graphical elements can include images that represent the objects. For example, if an object is a table, the graphical element can include a digital image of the table. For another example, and again if the object is a table, the graphical element can include a graphical shape that represents the table, such as a square, oval, or the like. In some instances, the merchant device 200 can receive image data representing the images. For example, the merchant device 200 can obtain the image data from one or more network resources, such as the Internet. In some instances, a merchant may upload the images into the merchant device 200. For instance, the merchant can use an image capturing device, such as a camera or a scanner, to capture images of the objects.

In some instances, in addition to or alternatively from receiving input, the merchant device 200 can cause the application 218 to generate a layout using image data. For instance, the merchant device 200 may receive, from one or more image capturing devices, image data representing the physical establishment. The merchant device 200 can then analyze the image data using one or more image processing techniques (e.g., appearance-based methods, such as edge matching, features-based methods, etc.) to identify respective locations of designated sections and/or respective locations of objects within the physical establishment. The merchant device 200 can then generate a layout of the physical establishment based on the respective locations using any of the techniques described here (e.g., updating the layout to include graphical elements).

After creating the layout, the merchant device 200 can receive, via the user interface, input indicating that the layout is complete. In response, the merchant device 200 can generate data (e.g., a template) representing the layout, and save the data locally in the memory 204. The merchant device 200 can then later receive input indicating that the merchant wants to edit the layout. In response, the merchant device 200 can use the data to present the layout to the merchant via the user interface. The merchant device 200 can then receive inputs indicating changes to the physical establishment, such as the addition, removal, or moving of designated sections and/or objects. Based on the inputs, the merchant device 200 can update layout to reflect the changes, and then save data representing the updated layout in response.

In addition to generating and editing layouts, the application 218 can provide the merchant device 200 with functionality to utilize the layouts during transactions with customers. For instance, the application 218 can cause the merchant device 200 to present, via a user interface, the layout of the physical establishment to the merchant. As discussed above, the layout can indicate locations of designated areas and objects within the physical establishment. For instance, the layout can indicate locations of tables and chairs within the physical establishment. The merchant device 200 can further present, via the user interface, indications based on one or more states of the objects. When objects include tables and chairs, the states can indicate whether a table (and/or similarly a chair) is open, is occupied by one or more customers, requires assistance from the merchant, does not require assistance from the merchant, received a check, and/or the like.

For instance, the user interface can present a first indication that indicates that a table is in a first state when the table is open. A table is open when no customer is seated at the table, and the table is ready for a customer. The merchant device 200 may then receive input indicating that one or more customers are being seated at the table. In some instances, the input can include a selection corresponding to creating a ticket for the table. Based on the input, the merchant device 200 can associated the ticket with the table. Additionally, the user interface can present a second indication that indicates that the table is occupied by the one or more customers. The user interface can further present a timer that indicates an amount of time that the one or more customers are seated at the table.

While the one or more customers seated are at the table, the merchant device 200 can receive inputs indicating items ordered by the one or more customers during the transaction. In response, the merchant device 200 can update the ticket to indicate at least the items being acquired, a cost of the item, or the like. The merchant device 200 can further determine whether the one or more customers at the table need assistance. For instance, the merchant device 200 can determine that the merchant (e.g., an employee, such as a waiter) has not checked in on the one or more customers for a threshold period of time (e.g., five minutes, ten minutes, thirty minutes, etc.). Based on the determination, the user interface can present a third indication that indicates that the table requires assistance from the merchant. In some instances, the third indication can change based on the amount of time since the merchant has last checked in on the one or more customers. For instance, the third indication can change colors to indicate the amount of time.

The merchant device 200 can use sensor data 222 (which may represent sensor data 146 from FIG. 1) to determine that the merchant has not checked in on the one or more customers for the threshold period of time. In some instances, the sensor data 222 can include data received from an electronic device associated with an employee assigned to the table. For instance, the employee may be in possession of the electronic device, and the electronic device may send the merchant device 200 sensor data 222 indicating geographical locations of the electronic device within the physical establishment. The merchant device 200 can receive the sensor data 222 from the electronic device, and then analyze the sensor data 222 to determine whether the electronic device has been proximate to the table. In some instances, the merchant device 200 determines that the electronic device has not been proximate to the table, and thus the merchant has not checked on the table, based on the geographical location of the electronic device being outside of a predetermined distance (e.g., a foot, five feet, ten feet, etc.) for the threshold period of time.

Additionally, or alternatively, in some instances, the sensor data 222 can include data received from an electronic device associated with the table. For instance, an electronic device may be positioned on and/or near the table, where the electronic device detects when an employee is within the predetermined distance of the table. In some instances, the electronic device may detect an employee based on detecting a tag (e.g., a radio-frequency identification (RFID) tag, etc.) in possession of the employee. Based on detecting an employee, the electronic device can send the merchant device 200 the sensor data 222 that indicates that the electronic device detected the employee. As such, in some instances, the merchant device 200 can determine that the merchant has not checked in on the table based on the merchant device 200 not receiving the sensor data 222 for the threshold period of time. In some instances, the merchant device 200 can determine that the merchant has not visited the table based on the merchant device 200 receiving sensor data 222 that does not indicate that the electronic device detected the employee for the threshold period of time.

Additionally, or alternatively, in some instances, the sensor data 222 can include image data captured from one or more image capturing devices within the physical establishment. For instance, the merchant device 200 can receive image data from one or more image capturing devices located within the physical establishment, where the image data represents the physical establishment. The merchant device 200 can then analyze the image data to track the respective geographical locations of the employees within the physical establishment. Using the respective geographical locations, the merchant device 200 can determine that the merchant has not checked in on the table based on the respective geographical locations being outside of the predetermined distance for the threshold period of time.

In addition to using the sensor data 222 to determine that the merchant has not checked in on the table, the merchant device 200 can use similar techniques to determine that the merchant has checked in on the table. For example, the merchant device 200 can receive sensor data 222 from an electronic device associated with the employee and analyze the sensor data 222 to determine that a geographical location of the electronic device was within the predetermined distance. For a second example, the merchant device 200 can receive sensor data 222 from the electronic device associated with the table and analyze the sensor data 222 to determine that the electronic device detected an employee. For a third example, the merchant device 200 can receive sensor data 222 (e.g., image data) from the one or more image capturing devices and analyze the sensor data to determine that an employee was within the predetermined distance from the table. In either example, the user interface can present a fourth indication that indicates that the table does not require assistance.

During the transaction, the merchant device 200 can further receive, via the user interface, input indicating that the one or more customers are ready for the ticket. Based on the input, the merchant device 200 can provide the ticket to the one or more customers. In some instances, the merchant device 200 can provide the ticket by sending data representing the ticket to an electronic device (e.g., an electronic device associated with the table, an electronic device associated with a customer, etc.). In some instances, the merchant device 200 can provide the ticket by printing a physical copy of the ticket for the one or more customers. In either instance, the user interface can present a fifth indication that indicates that the one or more customers received the ticket. Additionally, after processing payment for a cost of the ticket, the user interface can present a sixth indication that indicates that the table is once again open.

Additional functional components may include an operating system 220 for controlling and managing various functions of the merchant device 200 and for enabling basic user interactions with the merchant device 200. The memory 204 may also store transaction data 224 that is received based on the merchant associated with the merchant device 200 engaging in various transactions with customers, such as the example customer 104 from FIG. 1. In some instances, the transaction data 224 can correspond to the transaction data 148 from FIG. 1.

In addition, the memory 204 may also store data, data structures and the like, that are used by the functional components. For example, this data may include item information that includes information about the items offered by the merchant, which may include images of the items, descriptions of the items, prices of the items, and so forth. Depending on the type of the merchant device 200, the memory 204 may also optionally include other functional components and data, which may include programs, drivers, etc., and the data used or generated by the functional components. Further, the merchant device 200 may include many other logical, programmatic and physical components, of which those described are merely examples that are related to the discussion herein.

The network interface(s) 210 may include one or more interfaces and hardware components for enabling communication with various other devices over the network or directly. For example, network interface(s) 210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 2 further illustrates that the merchant device 200 may include the display 206 mentioned above. Depending on the type of computing device used as the merchant device 200, the display 206 may employ any suitable display technology. For example, the display 206 may be a liquid crystal display, a plasma display, a light emitting diode display, an OLED (organic light-emitting diode) display, an electronic paper display, or any other suitable type of display able to present digital content thereon. In some examples, the display 206 may have a touch sensor associated with the display 206 to provide a touchscreen display configured to receive touch inputs for enabling interaction with a graphic interface presented on the display 206. Accordingly, implementations herein are not limited to any particular display technology. Alternatively, in some examples, the merchant device 200 may not include the display 206, and information may be present by other means, such as aurally.

The I/O components 208, meanwhile, may include speakers, a microphone, a camera, and various user controls (e.g., buttons, a joystick, a keyboard, a keypad, etc.), a haptic output device, and so forth. For instance, I/O components 208 can include a printing device for printing physical receipts for customers. In some examples, the POS device uses the printing device to print the physical receipts after receiving data representing the receipts from a payment service.

It should be noted that, in some examples, the I/O components 208 may be separate from the merchant device 200. For instance, the printing device may be separate from the merchant device 200. In some examples, the merchant device 200 sends data representing the receipts to the printing device in order to cause the printing device to print physical receipts.

In addition, the merchant device 200 may include or may be connectable to a payment instrument reader 212. In some examples, the reader 212 may plug in to a port in the merchant device 200, such as a microphone/headphone port, a data port, or other suitable port. In other instances, the reader 212 is integral with the entire merchant device 200. The reader 212 may include a read head for reading a magnetic strip of a payment card, and further may include encryption technology for encrypting the information read from the magnetic strip. Alternatively, numerous other types of card readers may be employed with the merchant device 200 herein, depending on the type and configuration of a particular merchant device 200.

The location component 214 may include a GPS device able to indicate location information, or the location component 214 may comprise another other location-based sensor. The merchant device 200 may also include one or more additional sensors (not shown), such as an accelerometer, gyroscope, compass, proximity sensor, and the like. Additionally, the merchant device 200 may include various other components that are not shown, examples of which include removable storage, a power control unit, and so forth.

Figure 3:
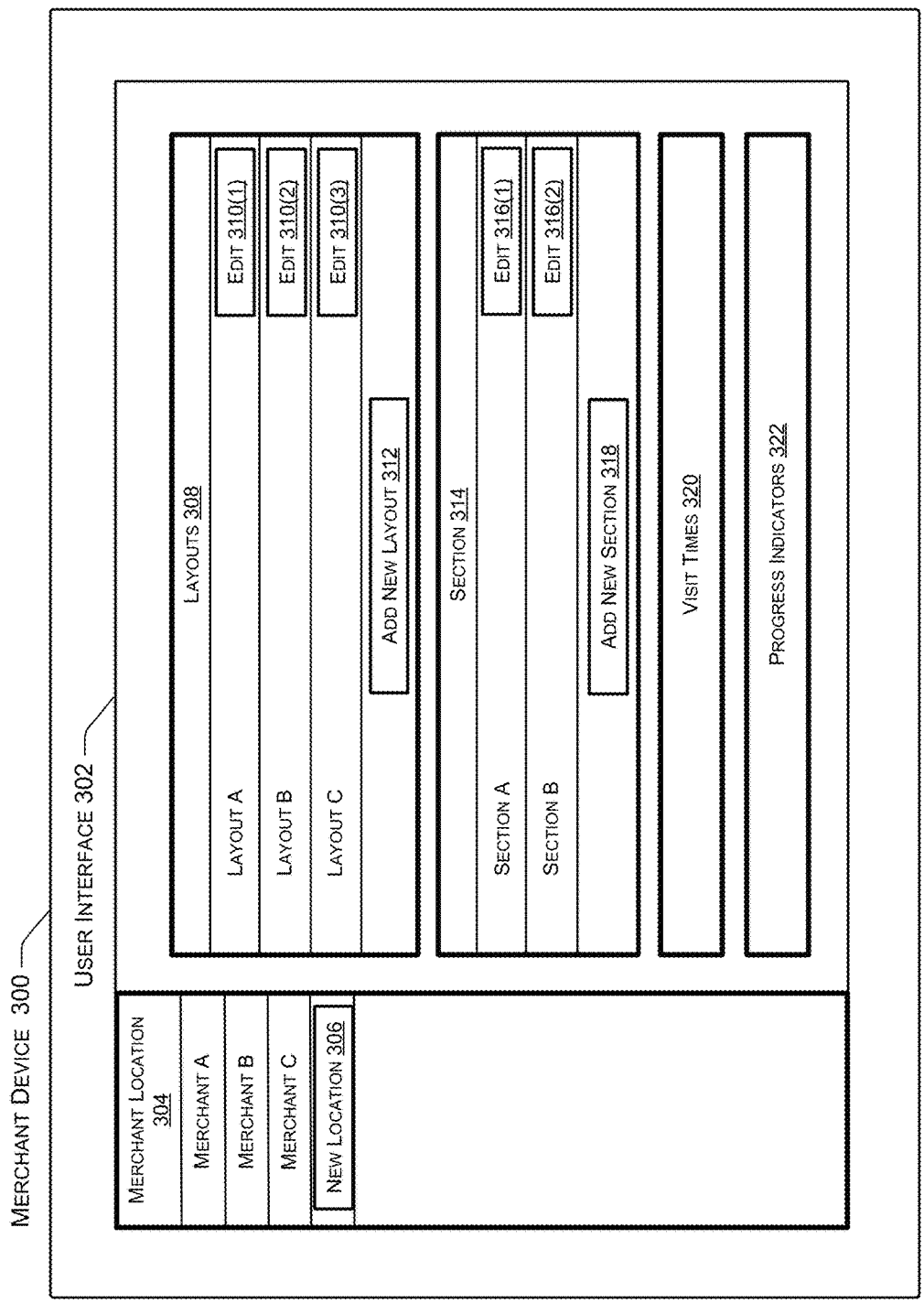
FIG. 3 illustrates an example user interface for creating layouts and sections for a physical establishment.

FIG. 3 illustrates an example of a merchant device 300 (which may represent one of merchant device(s) 116 and/or merchant device 200) providing a user interface 302 for creating layouts and sections for a physical establishment. As shown, the user interface 302 includes a merchant location 304 portion that lists each physical location (e.g., each physical establishment) associated with a merchant. For instance, the merchant location 304 portion lists three separate locations associated with a merchant, Merchant Location A, Merchant Location B, and Merchant Location C. In some instances, the merchant can use the merchant location 304 portion to select a physical establishment for creating and/or editing a layout. Additionally, the merchant can select the new location 306 button to create a new merchant location.

The user interface 302 further includes a layouts 308 portion that lists each layout that the merchant has created for the selected merchant location 304. For instance, the layouts 308 portion indicates that there are three separate layouts that have been created for a specific merchant location, Layout A, Layout B, and Layout C. In some instances, the merchant can select an edit 310(1) button to edit Layout A, select an edit 310(2) button to edit Layout B, and select an edit 310(3) button to edit Layout C. Additionally, the merchant can select an add new layout 312 button to create a new layout for the selected merchant location 304.

The user interface 302 further includes a section 314 that lists each designated section that the merchant has created for various layouts 308. For instance, the sections 314 portion indicates that there are two separate designated sections that have been created for various layouts 308, Section A and Section B. In some instances, the merchant can select an edit 316(1) button to edit Section A and select an edit 316(2) button to edit Section B. Additionally, the merchant can select an add new section 318 button to create a new section for one or more of the layouts 308.

Additionally, the user interface 302 includes a visit times 320 button and a progress indicators 322 button. The merchant can use the visit times 320 button to cause the user interface 302 to display and/or not display progress times associated with objects while the merchant is using one of the layouts 308. Furthermore, the merchant can use the progress indicators 322 button to cause the user interface 302 to display and/or not display state indicators associated with objects while the merchant is using one of the layouts 308. Examples of each are illustrated below with respect to FIGS. 6A-6F.

Figure 4:
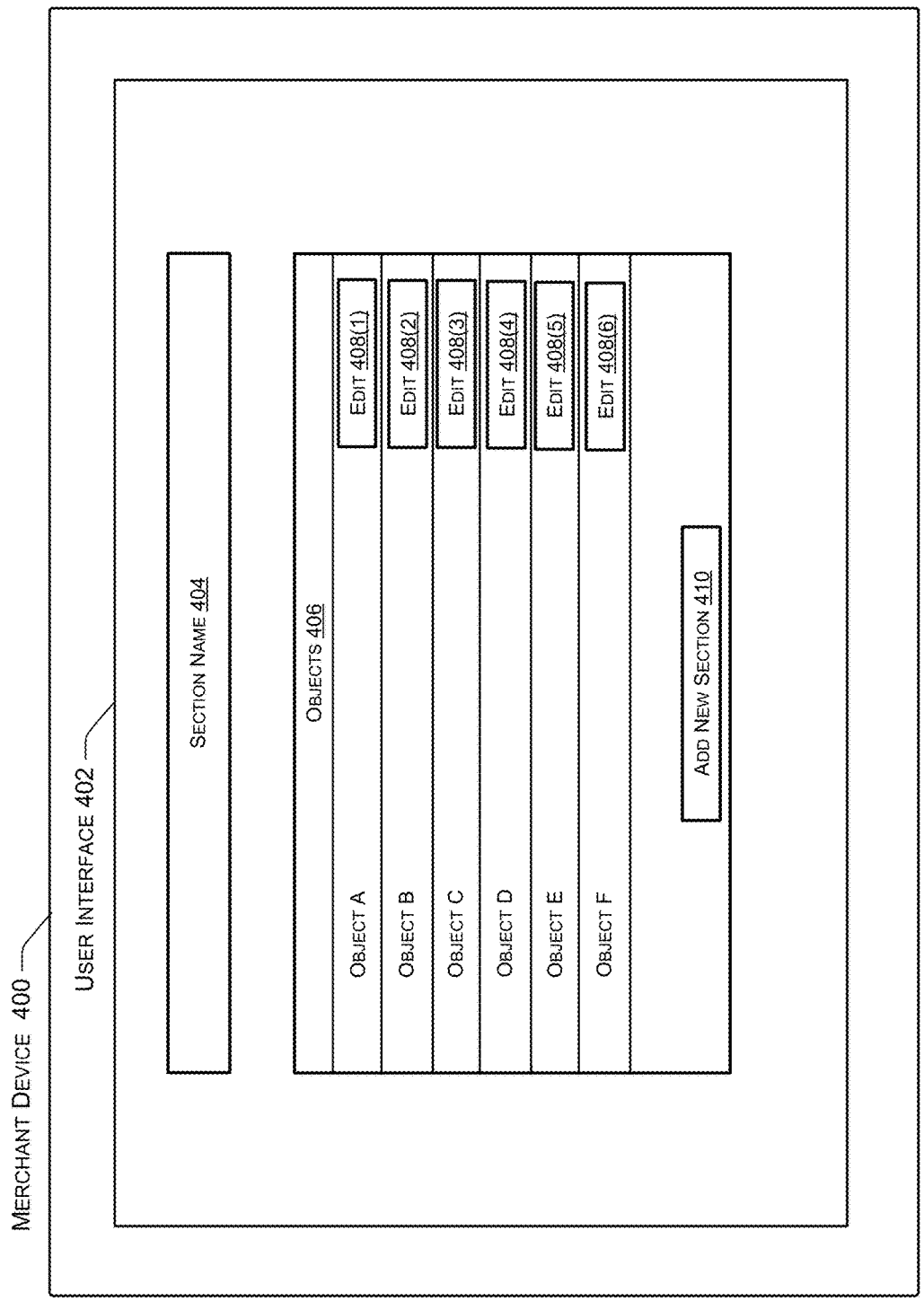
FIG. 4 illustrates an example user interface for editing a section.

FIG. 4 illustrates an example of the merchant device 300 providing a user interface 402 for editing a section. In some instances, the merchant device 300 may present the user interface 402 after receiving input selecting, edit 316(1) button for Section A, edit 316(2) button for Section B, or add a new section 318 button from the user interface 302 of FIG. 3. As illustrated, the user interface 402 includes the section name 404, which is an identifier for the section being created and/or edited. The merchant can update the section name 404 to identify which section the merchant is creating and/or editing. For instance, if the merchant is a restaurant, the merchant may update the second name 404 to include a bar area, dining area, kitchen, waiting area, patio area, bathroom area, or the like.

The user interface 402 further includes a portion for adding and removing objects 406 associated with the section. As shown, the section currently has six Objects A-F, although sections can include any number of objects. Objects 406 can include anything that a merchant may place within a physical establishment, such as tables, chairs, televisions, merchant devices, items, rugs, windows, or the like. The merchant can use the edit(a)-(6) buttons to edit the Objects A-F, respectively. For instance, if Object A is a table, the merchant can use the edit 408(1) button to change the characteristics (e.g., size, color, shape, etc.) of the table, change the number of chairs included with the table, delete the table, or the like. The merchant can further use the add new object 410 button to create a new object for the section.

FIGS. 5A-5F illustrates an example of the merchant device 300 providing a user interface 502 for creating a layout 504 of a physical establishment. As shown, a portion of the user interface 502 includes sections that were previously created by the merchant for the physical establishment. For instance, the merchant created Section A 506 to include six tables 508(1)-(6) (e.g., objects), and also created Section B 510 to include six tables 512(1)-(6) (e.g., objects). Additionally, a portion of the user interface 502 includes an editing 514 tool for editing tables 508(1)-(6) or tables 512(1)-(6) that are added to the layout 504. For instance, the merchant can use the shape 516 button to edit the shape (e.g., square, circle, oval, etc.) of a table, use the layout 518 button to edit the layout (e.g., equally around the table, all on one side of the table, etc.) of chairs around the table, use the chairs 520 button to edit the number of chairs (e.g., one, two, five, ten, etc.) around a table, and use the size 522 button to edit the size (e.g., width, height, etc.) of the table.

Figure 5A:
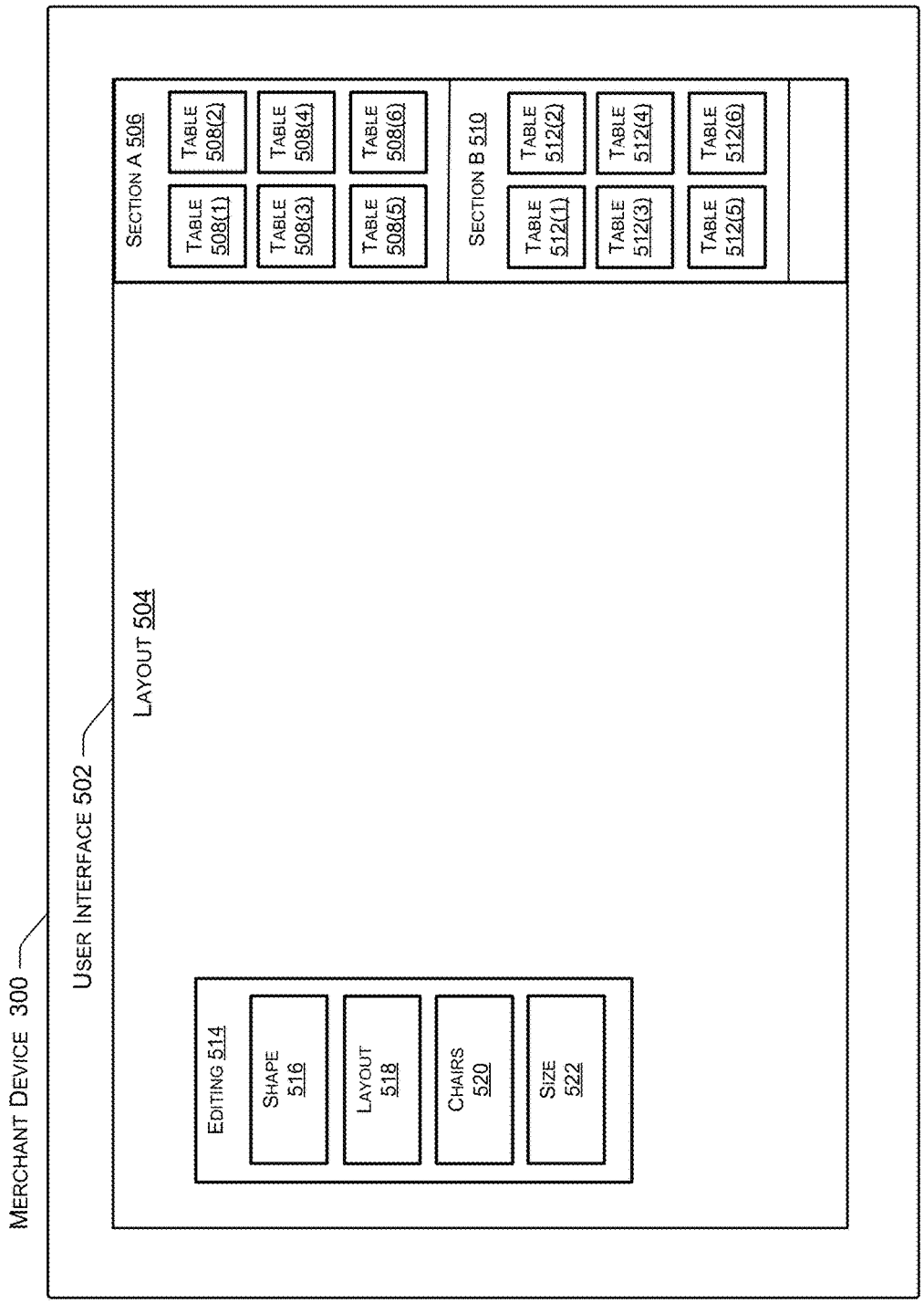
FIGS. 5A-5F illustrate an example user interface for creating a layout of a physical establishment.

Also, shown in FIG. 5A, the user interface 502 currently includes a "blank canvas," which the merchant uses to create the layout 504 of the physical establishment. For instance, and as shown in FIGS. 5B-5F, the merchant device 300 can receive, via the user interface 502, inputs from the merchant that indicate the locations of designated sections and objects within the physical establishment. Based on the inputs, the merchant device 300 updates the layout 504 being provided by the user interface 502 to include various graphical objects corresponding to the designated sections and objects at the indicated locations within the physical establishment.

Figure 5B:
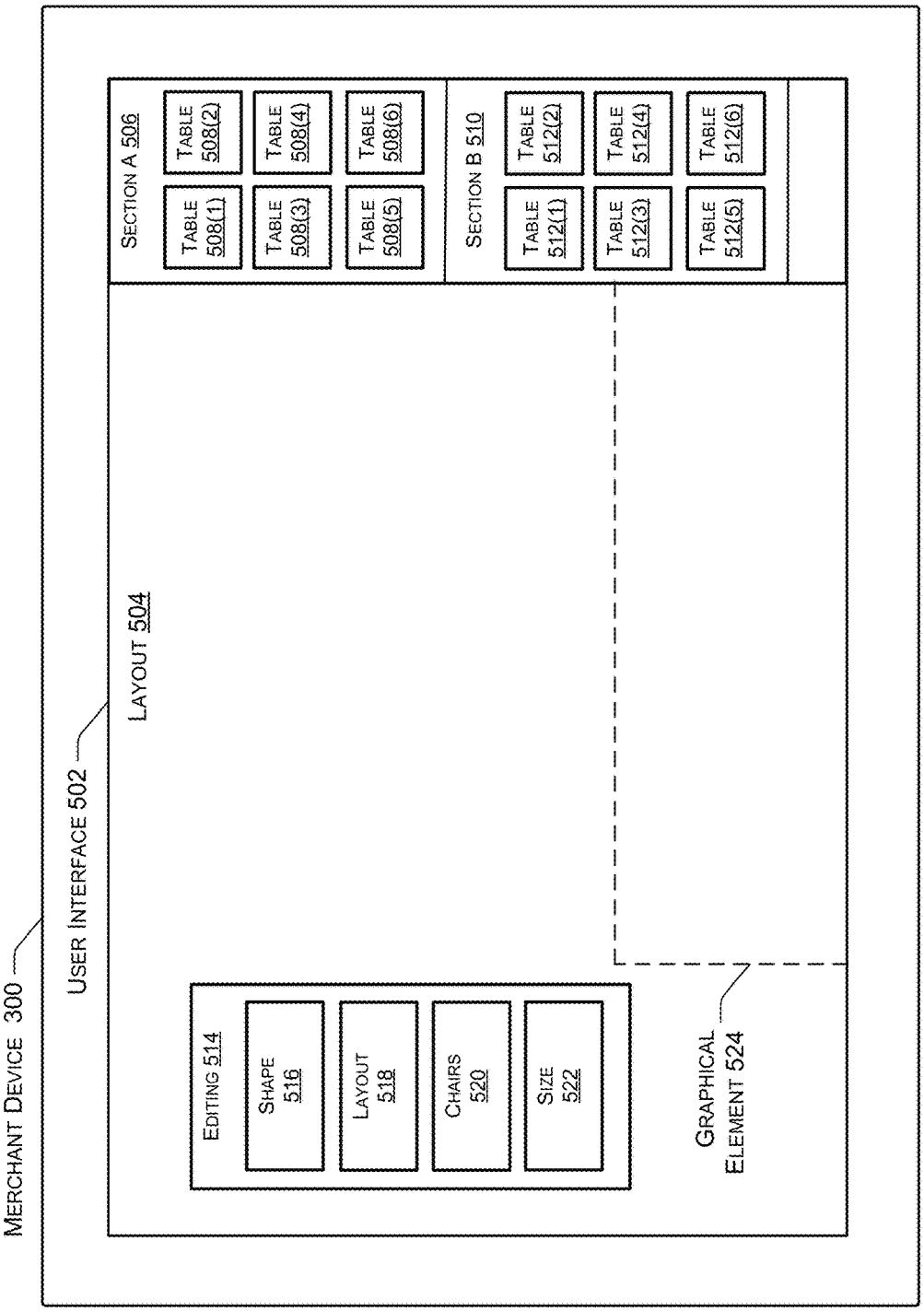

For instance, as shown in FIG. 5B, the merchant device 300 may receive, via the user interface 502, input that indicates the location of Section A 506 and the location of Section B 510 within the physical establishment. Based on the input, the merchant device 300 may update the layout 504 on the user interface 502 to indicate the locations of Section A 506 and Section B 510 within the physical establishment. In some instances, and as shown in FIG. 5B, updating the layout 504 may include adding a graphical element 524 corresponding to a border between Section A 506 and Section B 510 within the physical establishment. Additionally, or alternatively, in some instances, updating the layout 504 may include adding graphical elements (e.g., shading, colors, patterns, etc.) to areas of the layout 504 that correspond to the areas within the physical establishment of Section A 506 and Section B 510.

Figure 5C:
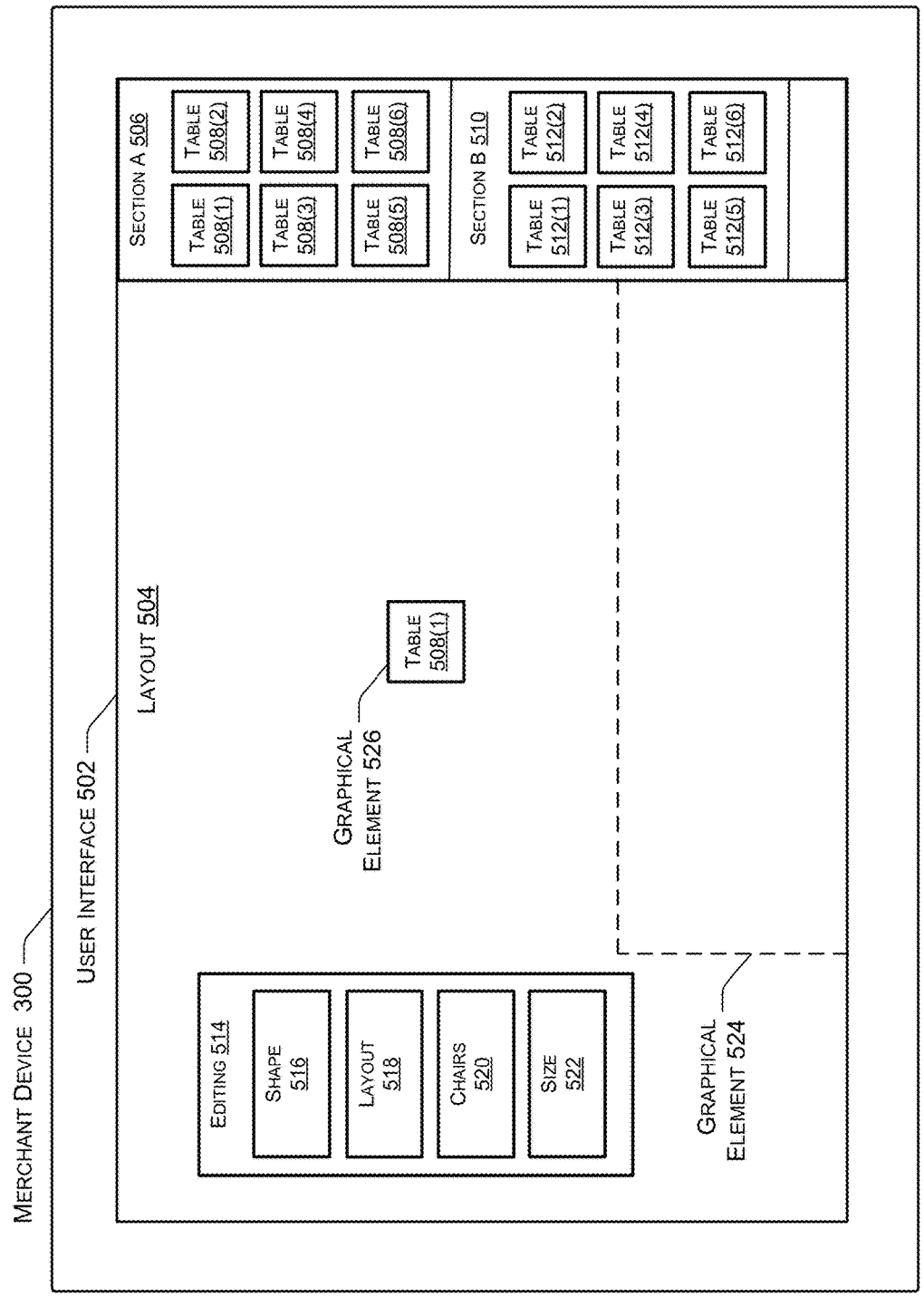

FIG. 5C illustrates adding an object (e.g., table 508(1)) to the layout 504 of the physical establishment. For instance, the merchant device 300 may receive, via the user interface 502, input indicating a location of table 508(1) within the physical establishment. In some instance, the input may include a selection of table 508(1) from Section A 506 of the user interface 502, followed by an indication on the layout 504 of where table 508(1) is located within the physical establishment. In some instances, the input may include a drag-and-drop type input where table 508(1) is selected, dragged across the user interface 502, and dropped at a location on the layout 504 that corresponds to where the table 508(1) is located within the physical establishment. In either instance, the merchant device 300 updates the layout 504 on the user interface 502 to include a graphical element 526 corresponding to the table 508(1) at the location within the physical establishment.

Figure 5D:
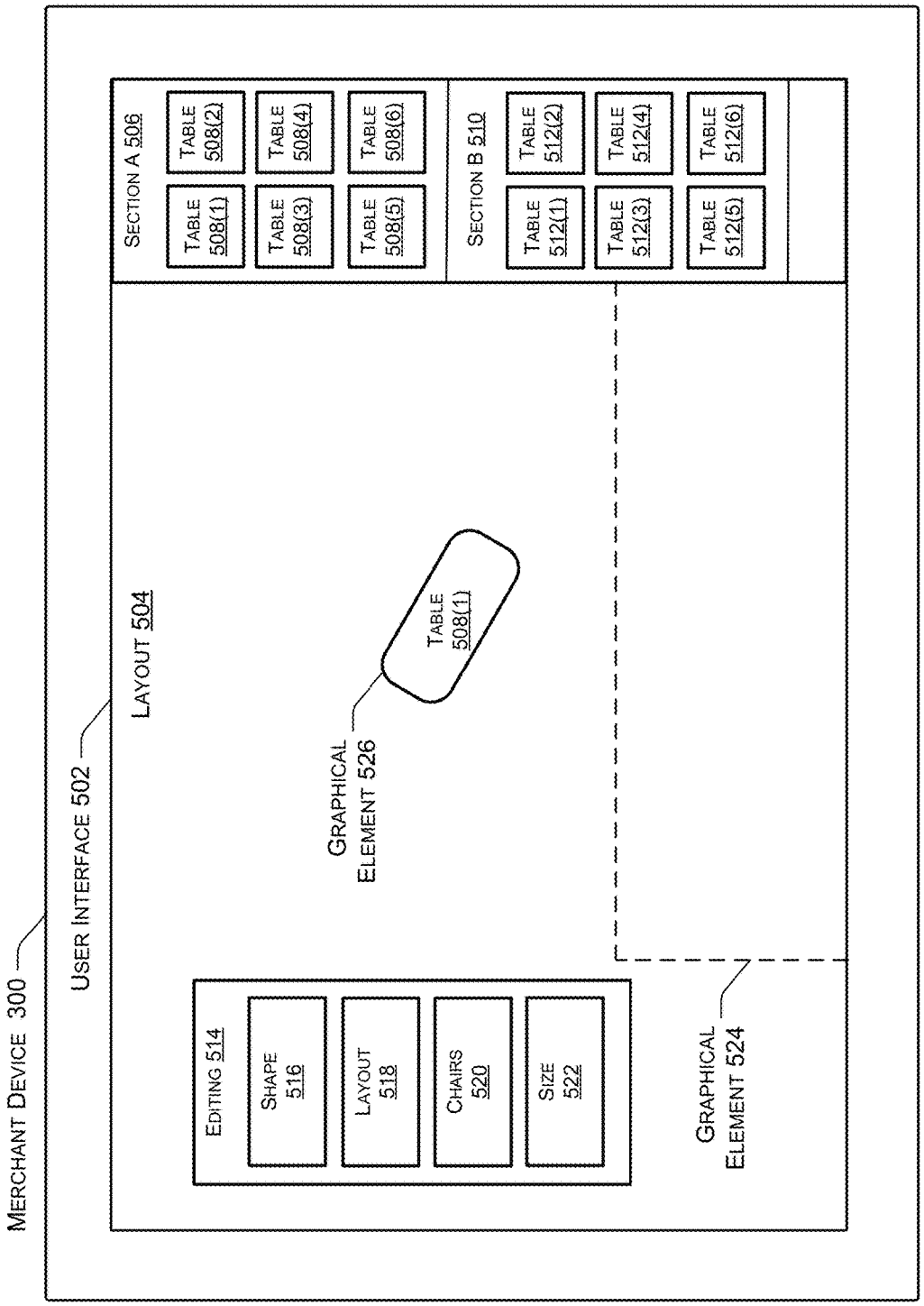

FIG. 5D illustrates editing an object (e.g., table 508(1)) that is already placed within the layout 504. For instance, as discussed above, the merchant can use the shape 516 button to edit the shape of objects, and use the size 522 button to edit the size of objects. As such, the merchant device 300 may receive, via the user interface 502, input for changing the shape of the table 508(1) from a square shape to a square with rounded corners. Additionally, the merchant device 300 may receive, via the user interface, input for changing the size the table 508(1) such that the table 508(1) includes a longer width. Furthermore, the merchant device 300 may receive, via the user interface, input for changing the orientation of the table 508(1). Based on each of the inputs, the merchant device 300 can update the graphical element 526 corresponding to the table 508(1) such that the graphical element 526 better represents the table 508(1) within the physical establishment.

Figure 5E:
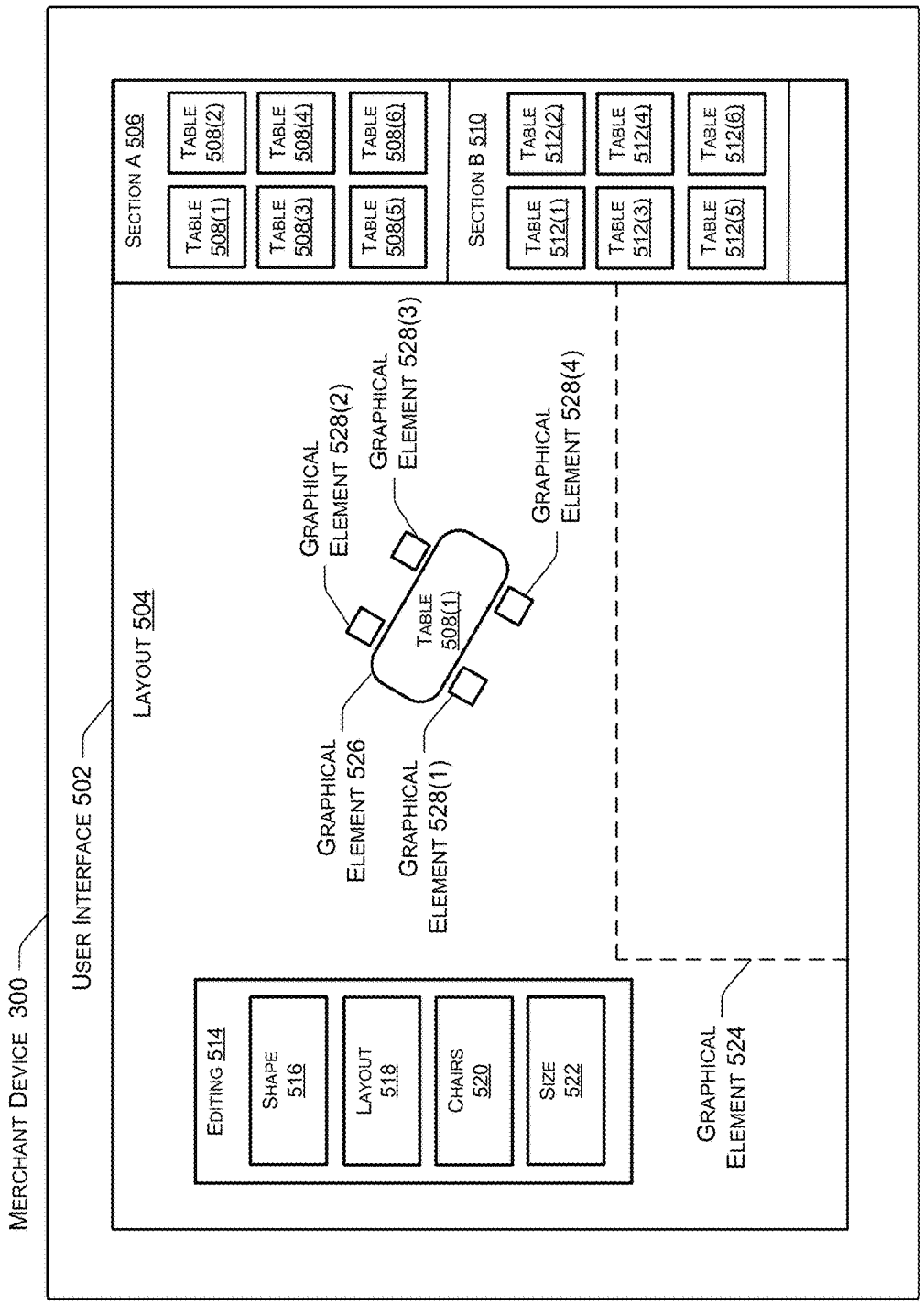

FIG. 5E illustrates adding additional objects (e.g., chairs) to an object (e.g., table 508(1)) already placed within the layout 504. For instance, as discussed above, the merchant can use the layout 518 button to edit the layout of chairs around a table, and use the chairs 520 button to edit the number of chairs around the table. As such, the merchant device 300 may receive, via the user interface 502, input for adding four chairs to the table 508(1). Additionally, the merchant device 300 may receive, via the user interface 502, input indicating the layout of the chairs around the table 508(1) (e.g., indicating the locations of the chairs around the table 508(1) within the physical establishment). In response to the inputs, the merchant device 300 can update the layout 504 on the user interface 502 to include graphical elements 528(1)-(4) corresponding to the chairs at the indicated locations within the physical establishment.

Figure 5F:
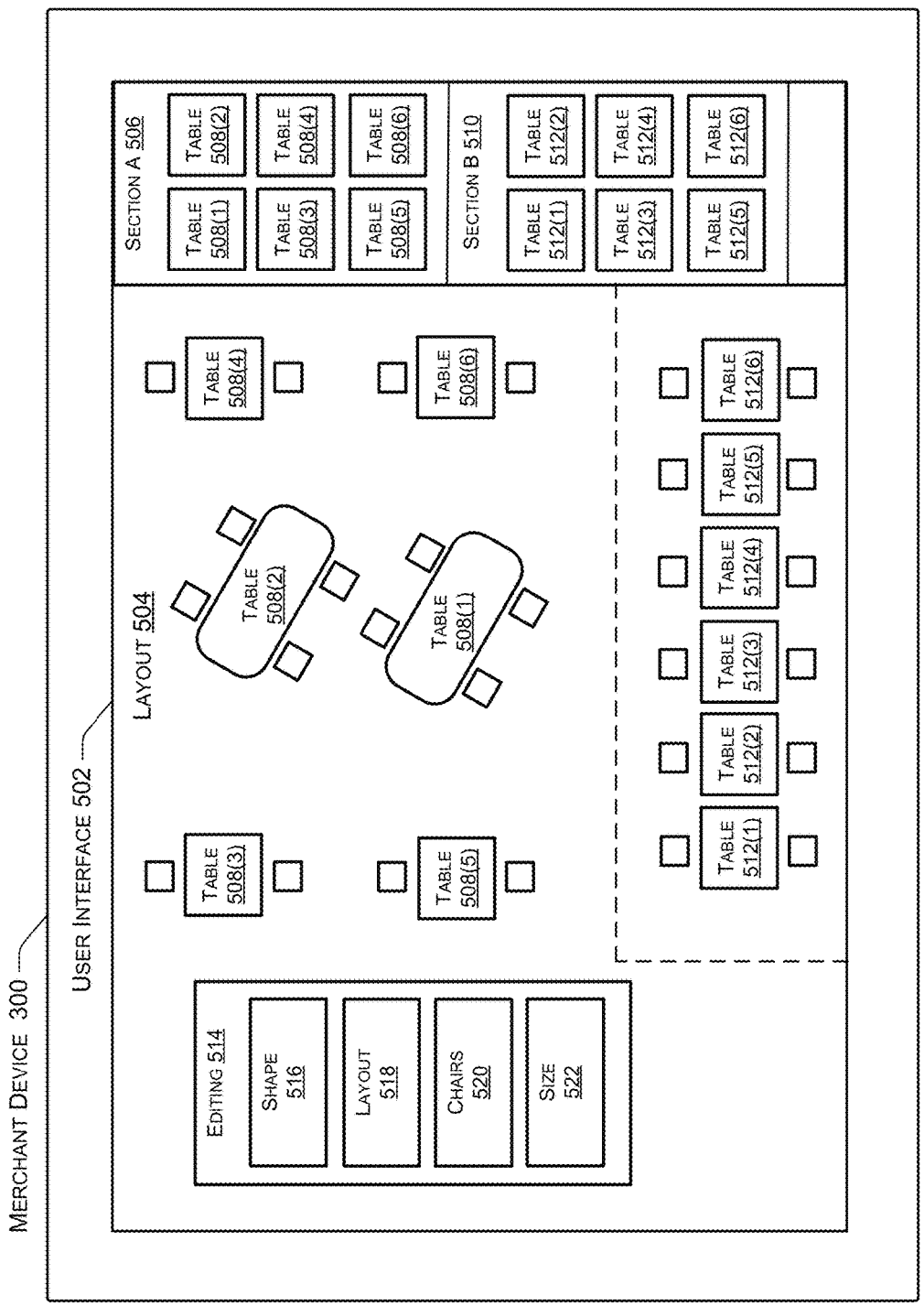

FIG. 5F illustrates the layout 504 of the physical establishment after the merchant indicates the respective locations of each of the tables 508(1)-(6) within Section A 506 and the respective locations of each of the tables 512(1)-(6) within Section B 510 of the physical establishment. As shown, the merchant device 300 may receive, via the user interface 502, input indicating each of the respective locations. Additionally, the merchant device 300 may receive, via the user interface 502, input indicating the respective locations of each of the chairs around each of the table 508(1)-(6) and each of the tables 512(1)-(6). In response, the merchant device 300 updates the layout 504 on the user interface 502 to include graphical elements corresponding to each of the tables and each of the chars at the respective locations within the physical establishment.

In some instances, based on the merchant completing the layout 504, the merchant device 300 may receive, via the user interface 502, input indicating that the layout 504 is complete. The merchant device 300 can then save data (e.g., a template) representing the layout 504, and add the layout 504 to the layouts 308 of the user interface 302 of FIG. 3. Additionally, the merchant device 300 can send the data representing the layout 504 to the one or more other computing devices, such as the payment service 108 of FIG. 1.

FIGS. 6A-6F illustrate an example of a merchant utilizing a user interface 602 during a transaction. For instance, and as discussed above, the user interface 602 can present indications based on one or more states of the objects within the physical establishment. In some instances, when the objects include tables and chairs, the states can include whether a table (and/or similarly a chair) is open, is occupied by one or more customers, requires assistance from the merchant, does not require assistance from the merchant, received a check, and/or the like.

Figure 6A:
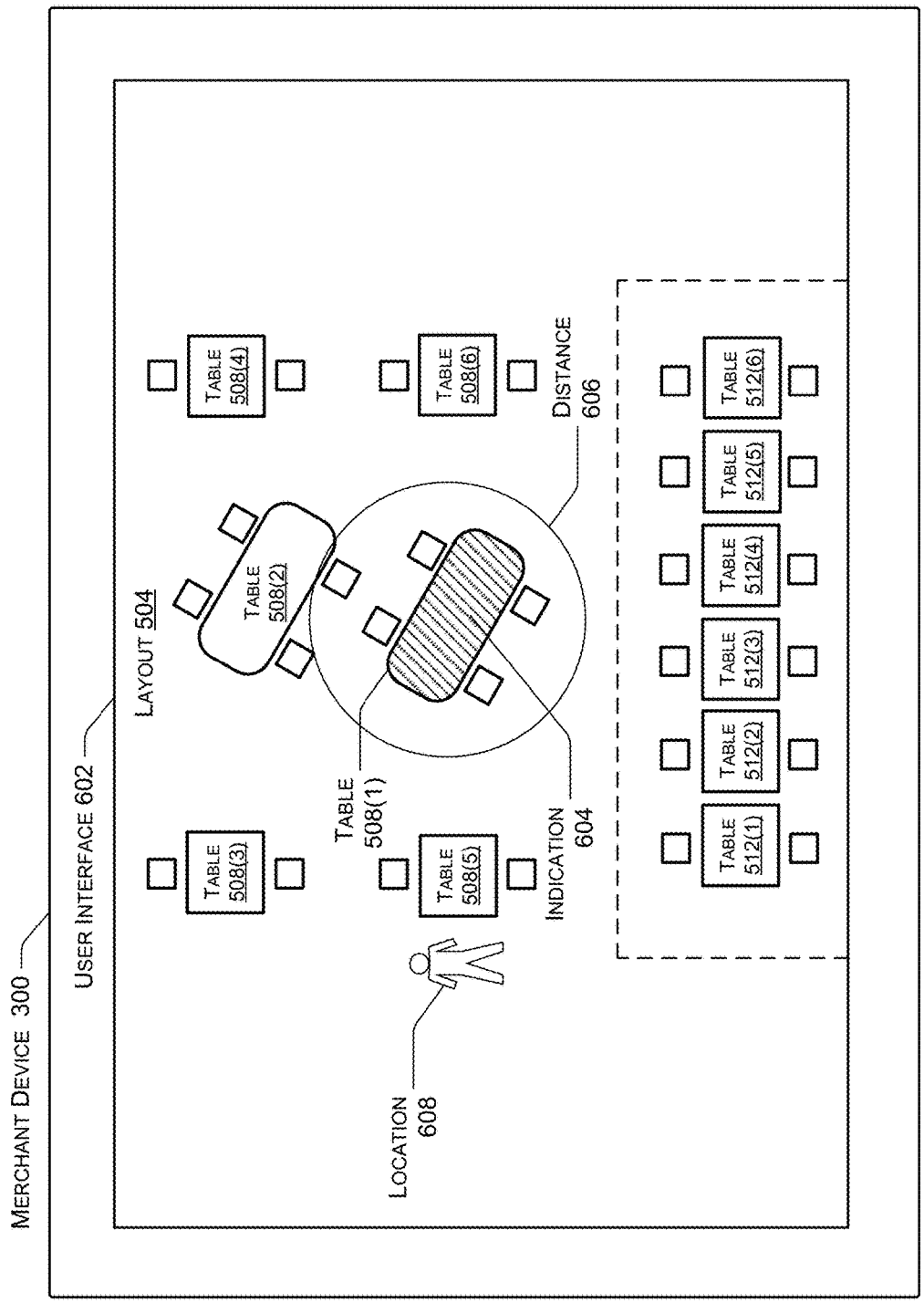

For instance, as illustrated in FIG. 6A, the user interface 602 can present a first indication 604 associated with table 508(1) (and/or similarly with any of the other tables) that indicates that the table 508(1) is in a first state. In some instances, the first indication 604 can include a first color and/or first pattern associated with the first state. For instance, in the example of FIG. 6A, the first indication 604 includes a diagonal pattern covering a top portion of the graphical element corresponding to the table 508(1). In some instances, the first state can correspond to an open state, in which no customers are seated at the table 508(1). However, in other instances, the first state can correspond to a different state of the table 508(1), such that the table 508(1) is occupied by one or more customers, requires assistance from the merchant, does not require assistance from the merchant, received a check, or the like.

As also illustrated in FIG. 6A, the user interface 602 further includes an indication of a predetermined distance 606 around the table 508(1) and a location 608 of an employee associated with the merchant. As will be described with reference to FIGS. 6B-6F, the merchant device 300 uses the predetermined distance 606 and the location 608 to identity the state of the table 508(1). In some instances, and as illustrated in FIG. 6A, the user interface 602 may indicate the predetermined distance 606 and the location 608. Additionally, or alternatively, in some instances, the user interface 602 may not indicate the predetermined distance 606 and/or the location 608.

Figure 6B:
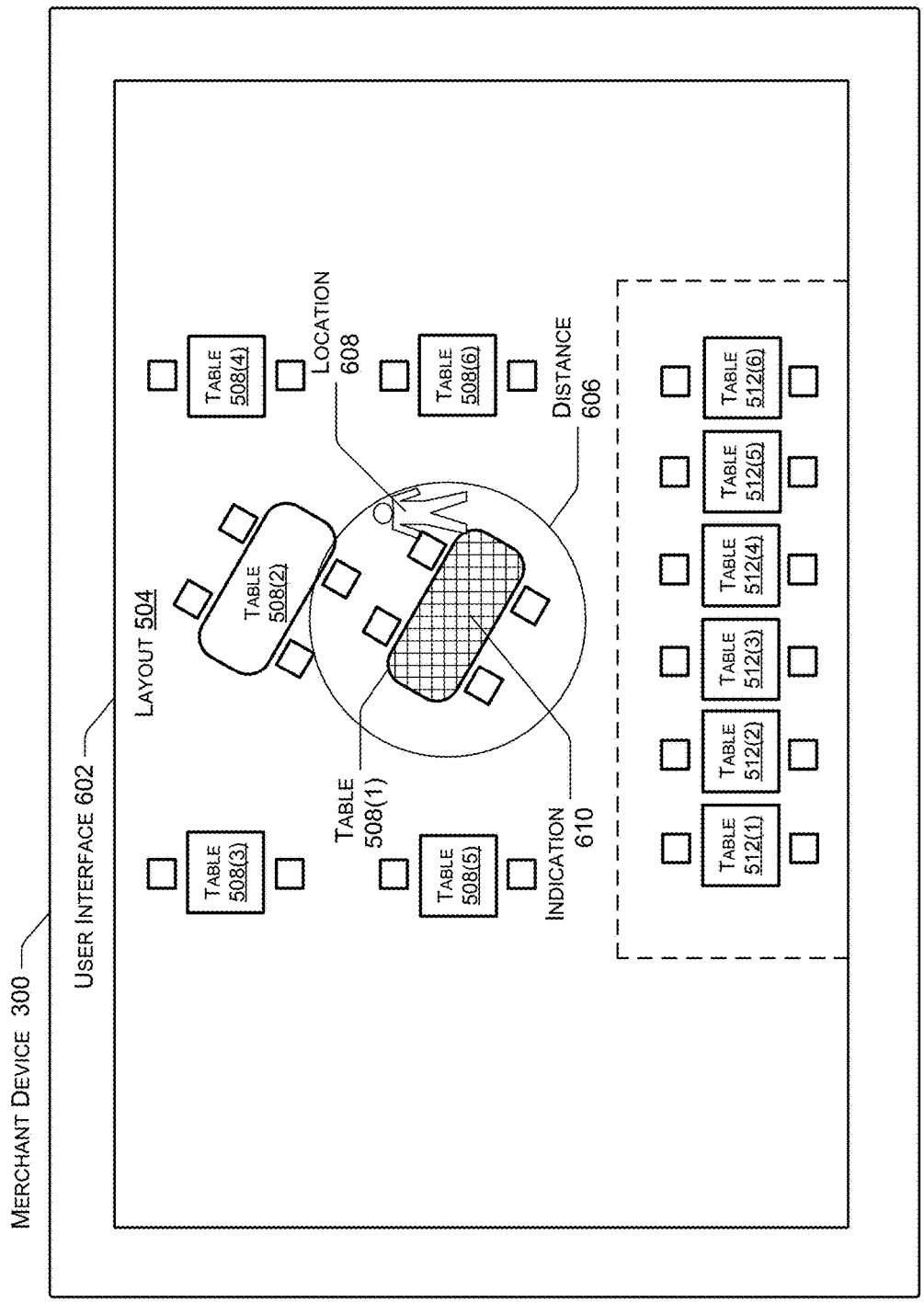

FIG. 6B illustrates the user interface 602 presenting a second indication 610 associated with the table 508(1) in response to determining that the table 508(1) is in a second state. In some instances, the second indication 610 can include a second color and/or second pattern associated with the second state. For instance, in the example of FIG. 6B, the second indication 610 includes a checkered pattern covering a top portion of the graphical element corresponding to the table 508(1). In some instances, the second state can correspond to an occupied state, in which one or more customers are seated at the table 508(1). However, in other instances, the second state can correspond to a different state of the table 508(1), such that the table 508(1) is open, requires assistance from the merchant, does not require assistance from the merchant, received a check, or the like.

In some instances, the merchant device 300 may determine that the table 508(1) is in the second state based on receiving input from the merchant. For instance, the merchant device 300 may receive, via the user interface 602, an input indicating that one or more customers are now seated at the table 508(1). In some instances, the merchant device 300 may determine that the table 508(1) is in the second state by analyzing sensor data associated with the physical establishment. For instance, the merchant device 300 may analyze the sensor data to determine that the location 608 of the employee is within the predetermined distance 606 of the table 508(1). Based on the determination, the merchant device 300 can determine that the table 508(1) is in the second state. Techniques for analyzing sensor data are described in detail with regard to FIGS. 7A-7C.

Figure 6C:
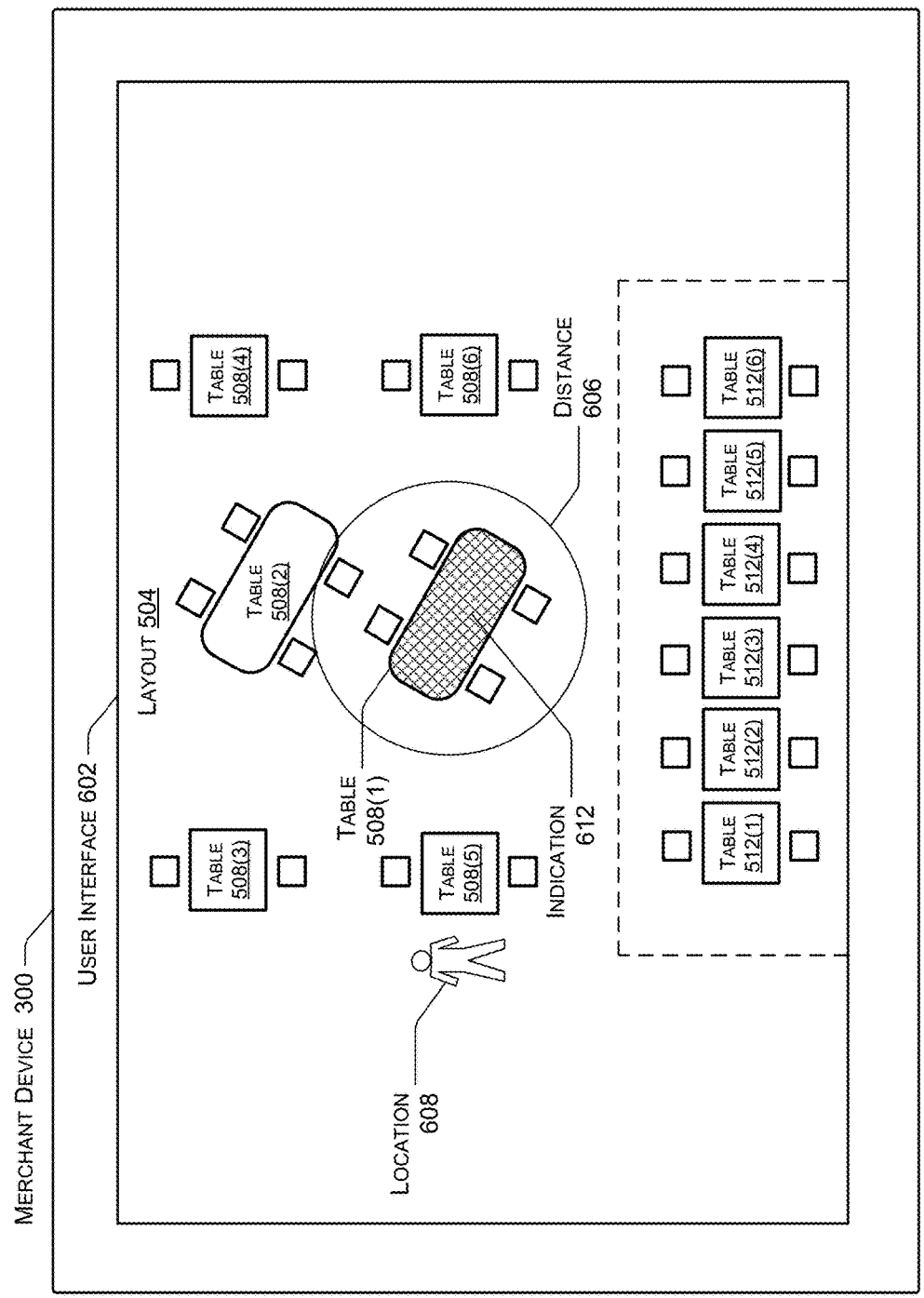

FIG. 6C illustrates the user interface 602 presenting a third indication 612 associated with the table 508(1) in response to determining that the table 508(1) is in a third state. In some instances, the third indication 612 can include a third color and/or third pattern associated with the third state. For instance, in the example of FIG. 6C, the third indication 612 includes a diagonal, checkered pattern covering a top portion of the graphical element corresponding to the table 508(1). In some instances, the third state can correspond to an assistance state, in which the table 508(1) requires assistance from the merchant. However, in other instances, the third state can correspond to a different state of the table 508(1), such that the table 508(1) is open, occupied by one or more customers, does not require assistance from the merchant, received a check, or the like.

In some instances, the merchant device 300 may determine that the table 508(1) is in the third state based on receiving input from the merchant. For instance, the merchant device 300 may receive, via the user interface 602, an input indicating that one or more customers requested assistance. In some instances, the merchant device 300 may determine that the table 508(1) is in the third state by analyzing sensor data associated with the physical establishment. For instance, the merchant device 300 may analyze the sensor data to determine that the location 608 of the employee has been outside of the predetermined distance 606 of the table 508(1) for a first threshold period of time (e.g., one minute, five minutes, etc.). Based on the determination, the merchant device 300 can determine that the table 508(1) is in the third state.

Figure 6D:
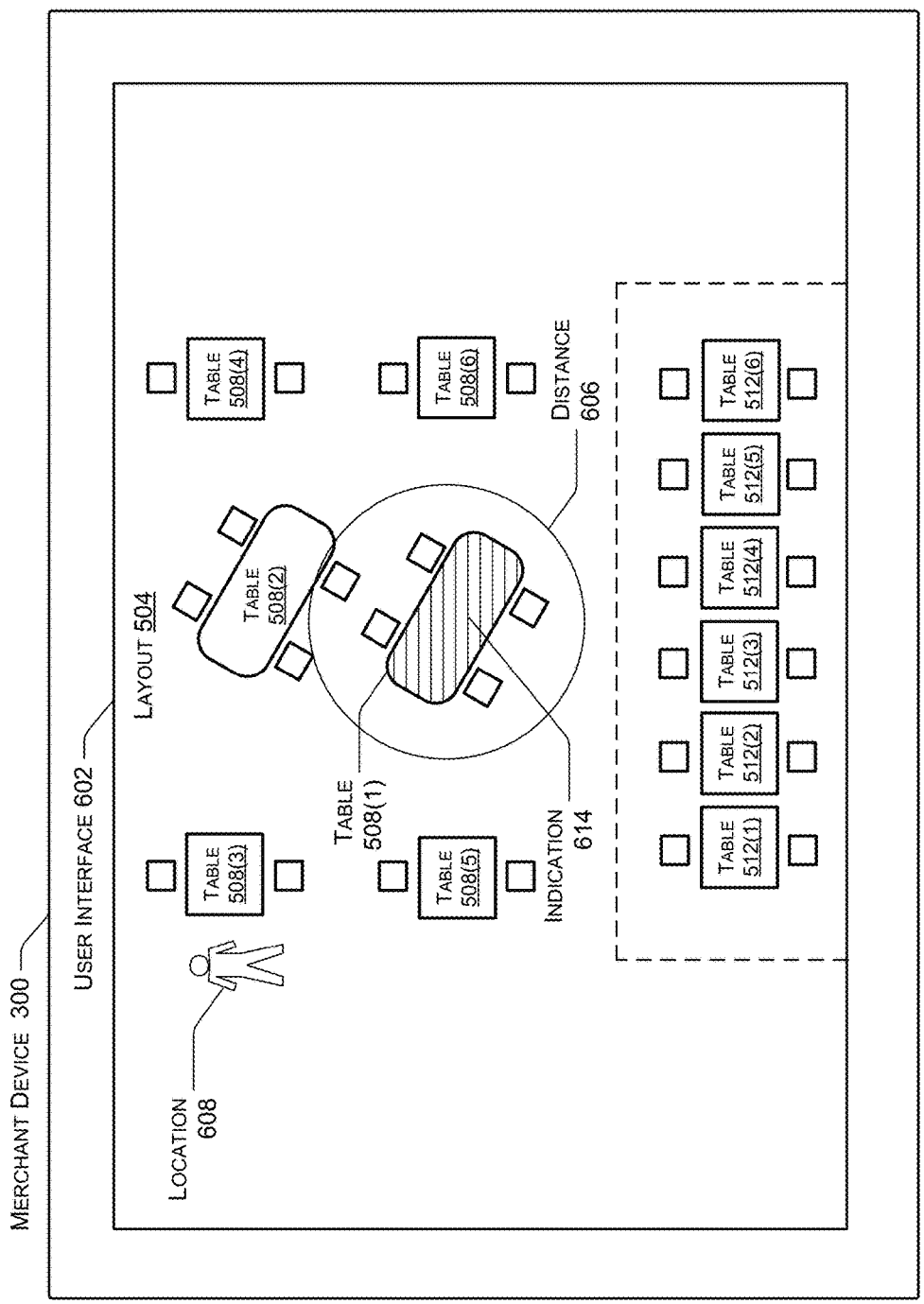

FIG. 6D illustrates the user interface 602 presenting a fourth indication 614 associated with the table 508(1) in response to determining that the table 508(1) is in a fourth state. In some instances, the fourth indication 612 can include a fourth color and/or fourth pattern associated with the fourth state. For instance, in the example of FIG. 6D, the fourth indication 614 includes a pattern of horizontal lines covering a top portion of the graphical element corresponding to the table 508(1). In some instances, the fourth state can correspond to a second assistance state, in which the table 508(1) still requires assistance from the merchant. However, in other instances, the fourth state can correspond to a different state of the table 508(1), such that the table 508(1) is open, occupied by one or more customers, does not require assistance from the merchant, received a check, or the like.

In some instances, the merchant device 300 may determine that the table 508(1) is in the fourth state based on receiving input from the merchant. For instance, the merchant device 300 may receive, via the user interface 602, an input indicating that one or more customers are still in need of assistance. In some instances, the merchant device 300 may determine that the table 508(1) is in the fourth state by analyzing sensor data associated with the physical establishment. For instance, the merchant device 300 may analyze the sensor data to determine that the location 608 of the employee has been outside of the predetermined distance 606 of the table 508(1) for a second, longer threshold period of time (e.g., ten minute, twenty minutes, etc.). Based on the determination, the merchant device 300 can determine that the table 508(1) is in the fourth state.

Figure 6E:
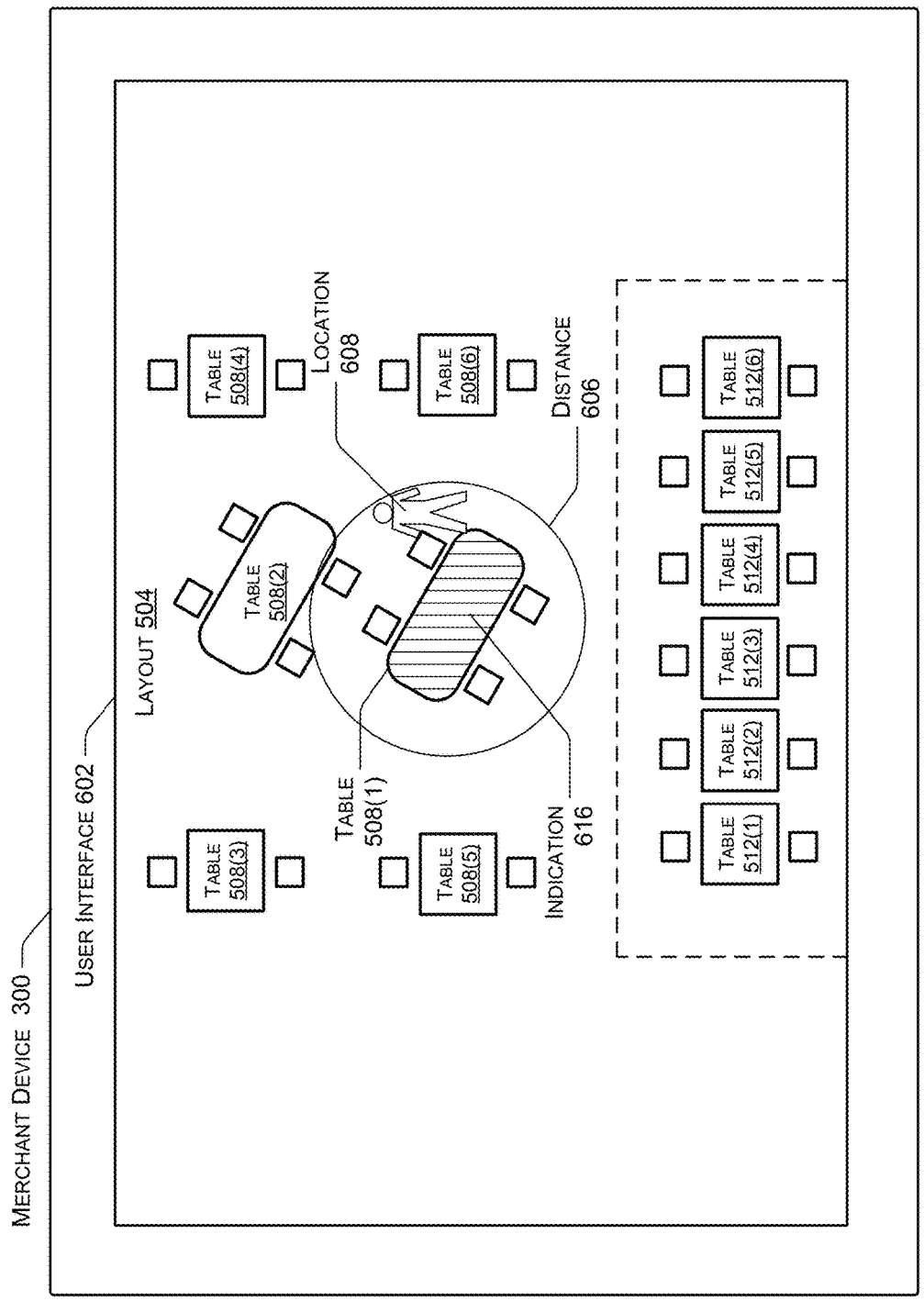

FIG. 6E illustrates the user interface 602 presenting a fifth indication 616 associated with the table 508(1) in response to determining that the table 508(1) is in a fifth state. In some instances, the fifth indication 616 can include a fifth color and/or fifth pattern associated with the fifth state. For instance, in the example of FIG. 6E, the fifth indication 616 includes a pattern of vertical lines covering a top portion of the graphical element corresponding to the table 508(1). In some instances, the fifth state can correspond to a non-assistance state, in which the table 508(1) does not require assistance from the merchant. However, in other instances, the fifth state can correspond to a different state of the table 508(1), such that the table 508(1) is open, occupied by one or more customers, requires assistance from the merchant, received a check, or the like.

In some instances, the merchant device 300 may determine that the table 508(1) is in the fifth state based on receiving input from the merchant. For instance, the merchant device 300 may receive, via the user interface 602, an input indicating one or more items acquired by the one or more customers from the merchant. In some instances, the merchant device 300 may determine that the table 508(1) is in the fifth state by analyzing sensor data associated with the physical establishment. For instance, the merchant device 300 may analyze the sensor data to determine that the location 608 of the employee is within the predetermined distance 606 of the table 508(1). Based on the determination, the merchant device 300 can determine that the table 508(1) is in the fifth state.

FIG. 6F illustrates the user interface 602 presenting a sixth indication 618 associated with the table 508(1) in response to determining that the table 508(1) is in a sixth state. In some instances, the sixth indication 618 can include a sixth color and/or sixth pattern associated with the sixth state. For instance, in the example of FIG. 6F, the sixth indication 618 includes a spotted pattern covering a top portion of the graphical element corresponding to the table 508(1). In some instances, the sixth state can correspond to a check state, in which the one or more customers at the table 508(1) received the check. However, in other instances, the sixth state can correspond to a different state of the table 508(1), such that the table 508(1) is open, occupied by one or more customers, requires assistance from the merchant, does not require assistance from the merchant, or the like.

In some instances, the merchant device 300 may determine that the table 508(1) is in the sixth state based on receiving input from the merchant. For instance, the merchant device 300 may receive, via the user interface 602, an input indicating that the one or more customers are ready for the check. In some instances, the merchant device 300 may determine that the table 508(1) is in the sixth state by analyzing sensor data associated with the physical establishment. For instance, the merchant device 300 may analyze the sensor data to determine that the location 608 of the employee is within the predetermined distance 606 of the table 508(1). Based on the determination, the merchant device 300 can determine that the table 508(1) is in the sixth state.

After the one or more customers pay for the check, the user interface 602 may again present the first indication 604 associated with the table 508(1), indicating that the table 508(1) is once again in the first state. In some instances, the merchant device 300 can determine that the table 508(1) is once again in the first state based on receiving input from the merchant. In some instances, the merchant device 300 can determine that the table 508(1) is once again in the first state based on authorizing a payment instrument for a cost of the ticket. Still, in some instances, the merchant device 300 can determine that the table 508(1) is in the first state based on analyzing sensor data to determine that the one or more customers are no longer located at the table 508(1).

Figure 7B:
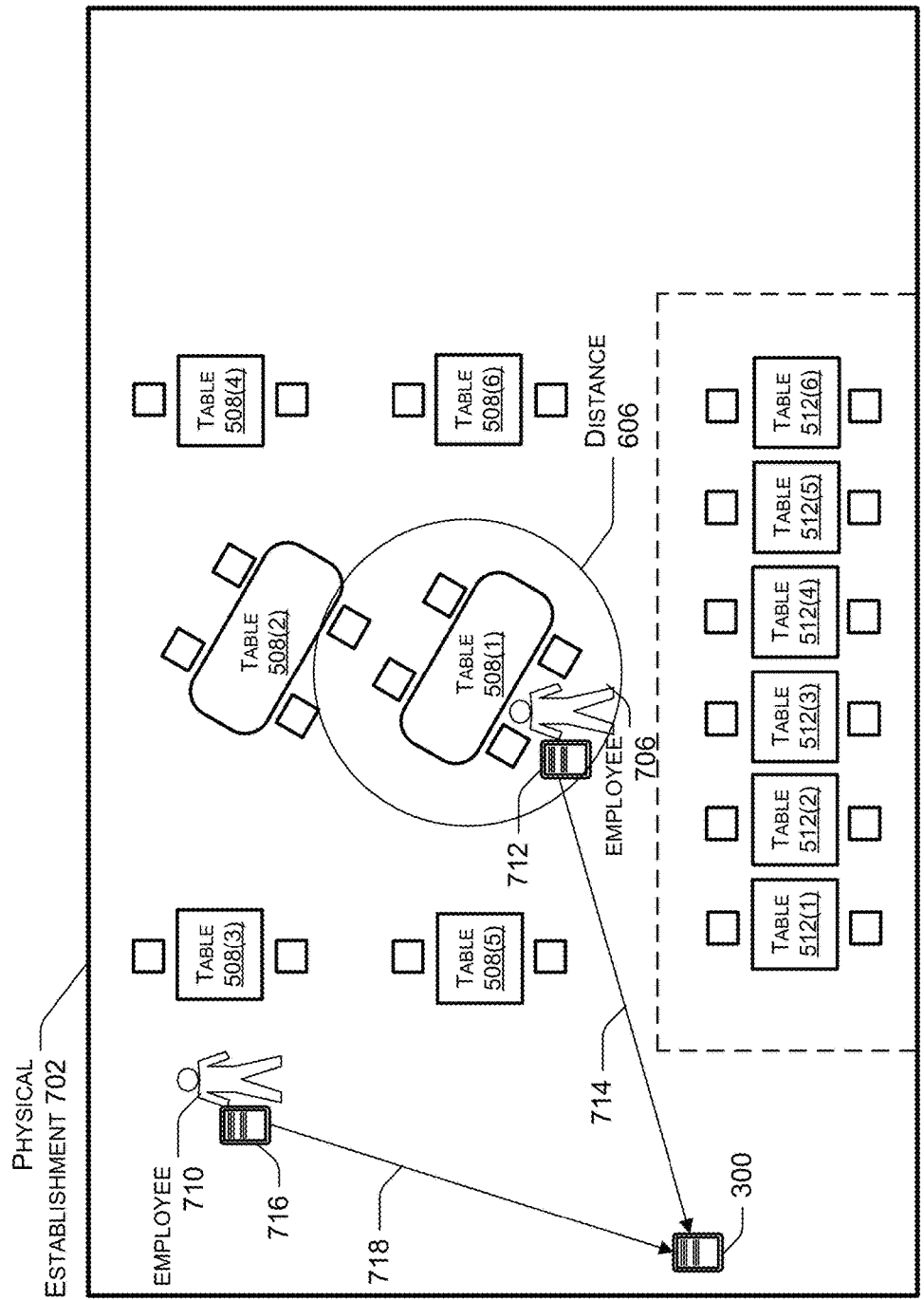
Figure 7C:
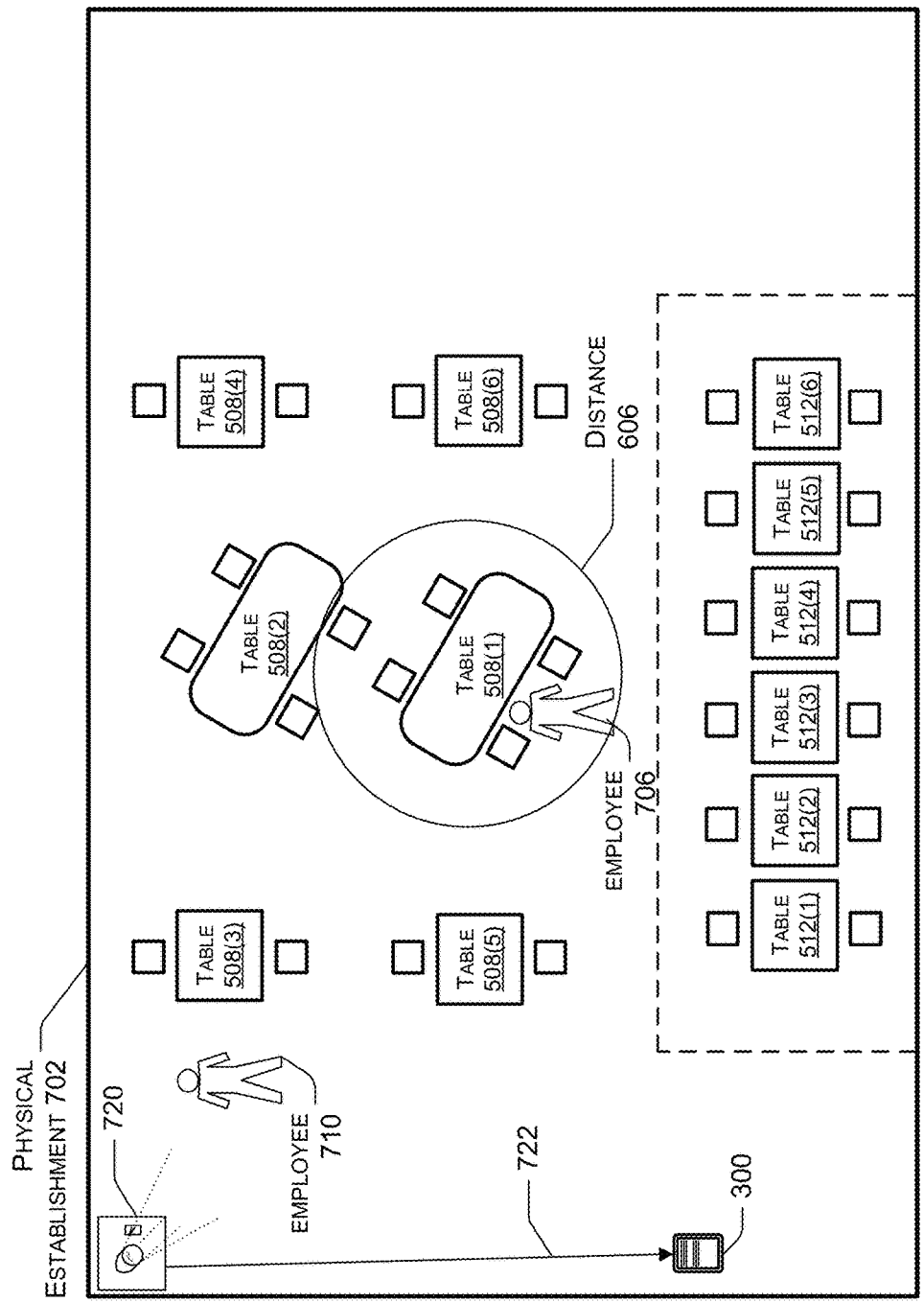

FIGS. 7A-7C illustrate examples of determining a geographical location of a merchant within a physical establishment 702, which may correspond to the layout 504 described in FIGS. 5A-6F. For example, as illustrated in FIG. 7A, a table 508(1) within the physical establishment 702 may be associated with an electronic device 704. For instance, the electronic device 704 may be positioned on and/or near a location of the table 508(1). The electronic device 704 may be configured to generate a geofence around the table 508(1), as illustrated by the predetermined distance 606, and detect when employees enter within the predetermined distance 606. In some instance, the electronic device 704 detects an employee based on detecting the presence of a tag and/or other identifier associated with the employee. For instance, the electronic device 704 may include an RFID that detects tags (e.g., RFID chips) associated with employees. In some instance, the electronic device 704 detects the employee based on receiving input from the employee.

Based on detecting the tag, the electronic device 704 can send a message (e.g., sensor data) to the merchant device 300 indicating that the employee was detected within the predetermined distance 606 of the table 506(1). For instance, in the example of FIG. 7A, the electronic device 704 can send the merchant device 300 a message indicating that the merchant device 300 detected a first employee 706 within the predetermined distance 606 of the table 508(1), as represented by 708. However, the electronic device 704 may not send the merchant device 300 a message indicating that the electronic device 704 detected a second employee 710, as the second employee 710 is outside of the predetermined distance 606.

For a second example, and as illustrated in FIG. 7B, each employee of the merchant may be associated with a respective electronic device that sends geographical location data to the merchant device 300. For instance, the first employee 706 may be associated with, and in possession of, a first electronic device 712 that sends data indicating the geographical location (e.g., sensor data) of the first electronic device 712 to the merchant device 300, as represented by 714. Additionally, the second employee 710 may be associated with, and in possession of, a second electronic device 716 that sends data indicating the geographical location (e.g., sensor data) of the second electronic device 716 to the merchant device 300, as represented by 718.

The merchant device 300 can receive the data from each of the first electronic device 712 and the second electronic device 716, and then analyze the data to determine whether the first employee 706 and/or the second employee 710 are within the predetermined distance 606 of the table 508(1). For instance, in the example of FIG. 7B, the merchant device 300 can analyze the data to determine that a geographical location associated with the first electronic device 712 is within the predetermined distance 606 of the table 508(1). Based on the determination, the merchant device 300 can determine that the first employee 706 is within the predetermined distance 606. Additionally, the merchant device 300 can analyze the data to determine that a geographical location associated with the second electronic device 716 is outside of the predetermined distance 606 of the table 508(1). Based on the determination, the merchant device 300 can determine that the second employee 710 is outside of the predetermined distance 606.

For a third example, and as illustrated in FIG. 7C, an image capturing device 720 (and/or one or more image capturing devices) may capture image data (e.g., sensor data) representing the physical establishment 702. The image capturing device 720 can include, but is not limited to, a camera, a video camera, an infrared camera, or any other type of electronic device that can capture image data representing the physical establishment 702. The image capturing device 720 can then send the image data to the merchant device 300, as represented by 722.

The merchant device 300 can receive the image data from the image capturing device 720. In response, the merchant device 300 can analyze the image data to determine respective geographical locations of each of the employees within the physical establishment 702. For instance, the merchant device 300 can analyze the image data to determine that at least a portion of the image data represents the first employee 706. In some instances, the merchant device 300 can make the determination using facial recognition and/or some other image processing technique. The merchant device 300 can then determine a geographical location of the first employee 706 within the physical establishment 702 based on the portion of the image data that represents the first employee 706. For instance, the merchant device 300 can analyze the portion of the image data with respect to a layout of the physical establishment 702 to identify where the first employee 706 is located within the physical establishment 702. Using the geographical location, the merchant device 300 can determine that the first employee 706 is within the predetermined distance 606.

The merchant device 300 can perform a similar analysis for determining whether the second employee 710 is within the predetermined distance 606. For instance, the merchant device 300 can analyze the image data to determine that at least a portion of the image data represents the second employee 710. In some instances, the merchant device 300 can make the determination using facial recognition and/or some other image processing technique. The merchant device 300 can then determine a geographical location of the second employee 710 within the physical establishment 702 based on the portion of the image data that represents the second employee 710. For instance, the merchant device 300 can analyze the portion of the image data with respect to a layout of the physical establishment 702 to identify where the second employee 710 is located within the physical establishment 702. Using the geographical location, the merchant device 300 can determine that the second employee 710 is outside the predetermined distance 606.

It should be noted that, in some instances, the merchant device 300 may use one or more of the techniques illustrated in FIGS. 7A-7C to determine whether employees are within the predetermined distance 606 of the table 508(1). For instance, the merchant device 300 may analyze one or more of the data received from the electronic device 704, the data received from the electronic device 712, the data received from the electronic device 716, and the data received from the image capturing device 720 to determine whether the first employee 706 and/or the second employee 710 are within the predetermined distance 606.

Figure 8:
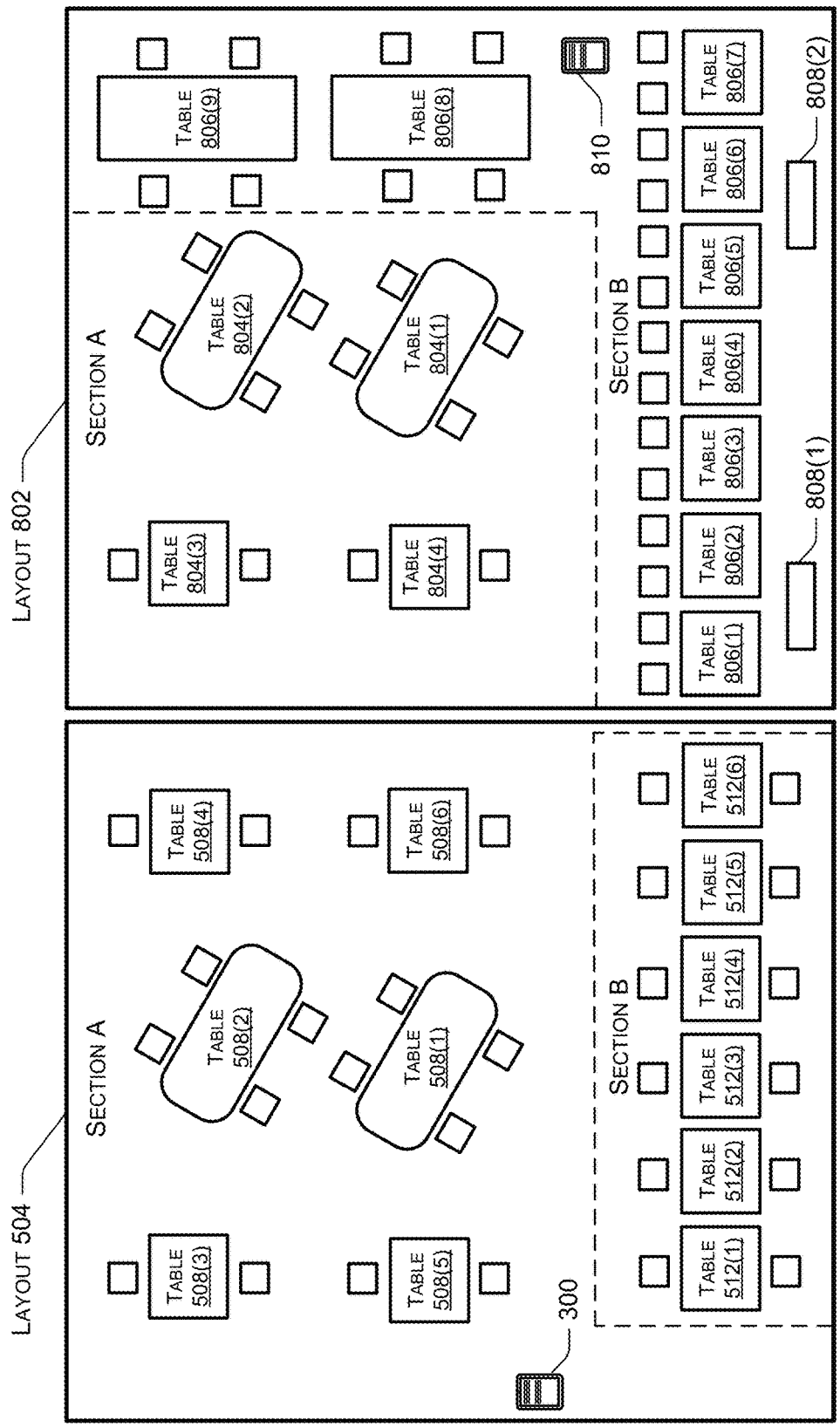
FIG. 8 illustrates an example of analyzing layouts in order to recommend at least one area to designate to at least one section, or at least one location for placing at least one object, within a physical establishment.

FIG. 8 illustrates an example of analyzing layouts in order to recommend at least one area to designate to at least one section and/or recommend at least one location for placing at least one object within a physical establishment. For instance, as illustrated in FIG. 8, a payment service (e.g., the payment service 108) and/or a merchant device (e.g., the merchant device 300) may analyze the created layout 504 (e.g., referred to as the first layout 504) in FIGS. 5A-5F with respect to a second layout 802 corresponding to another physical establishment. In some instances, analyzing the first layout 504 with respect to the second layout 802 includes comparing the first layout 504 to the second layout 802 to identify differences between the locations of designated sections and/or objects as indicated by the first layout 504 and locations of designated sections and/or objects as indicated by the second layout 802.

As shown in the example of FIG. 8, similar to the first layout 504, the second layout 802 includes designated Section A and designated Section B. For instance, Section A for each of the first layout 504 and the second layout 802 may represent respective dining areas within each of the physical establishments, and Section B for each of the first layout 504 and the second layout 802 may represent respective bar areas within each of the physical establishments. As also illustrated in the example of FIG. 8, Section A of the second layout 802 includes four tables 804(1)-(4), and Section B of the second layout 802 includes nine tables 806(1)-(9), two televisions 808(1)-(2), and a merchant device 810.

The payment service (and/or similarly the merchant device) may thus compare the first layout 504 to the second layout 802 in order to identify differences between the locations of designated sections and/or objects within the first physical establishment associated with the first layout 504 and locations of designated sections and/or objects within the second physical establishment associated with the second layout 802. For instance, based on the comparing, the payment service may identify that a larger area of the second physical establishment is designated to Section B than is designated to Section B within the first physical establishment. Additionally, the payment service may identify that Section B within the second physical establishment includes a greater number of tables than Section B within the first physical establishment, with tables 806(1)-(7) including a different layout for chairs and tables 806(8)-(9) including a larger size table. Finally, the payment service may identify that Section B of the second physical layout includes two televisions 808(1)-(2), and the merchant device 810 is located within Section B of the second physical establishment.

Using one or more of the identified differences, the payment service can then generate and provide recommendations to a first merchant associated with the first physical establishment. For instance, the payment service may generate and provide a recommendation that indicates that the first merchant increase the amount of area designated to Section B within the first physical establishment. The payment service may further generate and provide a recommendation that indicates that the first merchant add more tables within Section B and/or rearrange chairs around tables 512(1)-(6) to include a layout similar to tables 806(1)-(7). Furthermore, the payment service may generate and provide a recommendation that indicates that the first merchant place televisions within Section B. Finally, the payment service may generate and provide a recommendation that indicates that the first merchant move the location of merchant device 300 from Section A to Section B.

In some instances, and as discussed above, the payment service may use additional factors when generating and providing the recommendations. For instance, the payment service may determine that a second merchant associated with the second layout 802 has a higher volume of sales within Section B than Section A using transaction data associated with the second merchant. Based on the determination, the payment service may generate and provide the recommendations that the first merchant add more tables and/or arrange the layout of the chairs within Section B of the first physical establishment.

FIGS. 9A-9D illustrate a first example of analyzing sensor data to update a layout 902 of a physical establishment. For instance, a payment service, such as the payment service 108, (and/or a merchant device) may receive a layout 902 of a physical establishment that indicates at least locations of tables 904(1)-(10), locations of chairs (represented by the smaller squares), and locations of merchant devices 906(1)-(2) within the physical establishment. The payment service may further receive sensor data representing movements of users (e.g., merchants, such as the merchant's employees, customers, etc.) within the physical establishment. In some instances, the payment service receives the sensor data from respective electronic devices associated with, and in possession of, each of the users (similar to the example in FIG. 7B). In some instances, the payment service receives the sensor data from one or more image capturing devices located within the physical establishment (similar to the example in FIG. 7C). The payment service can then analyze the sensor data in order to determine movements of one or more of the users within the physical establishment.

Figure 9A:
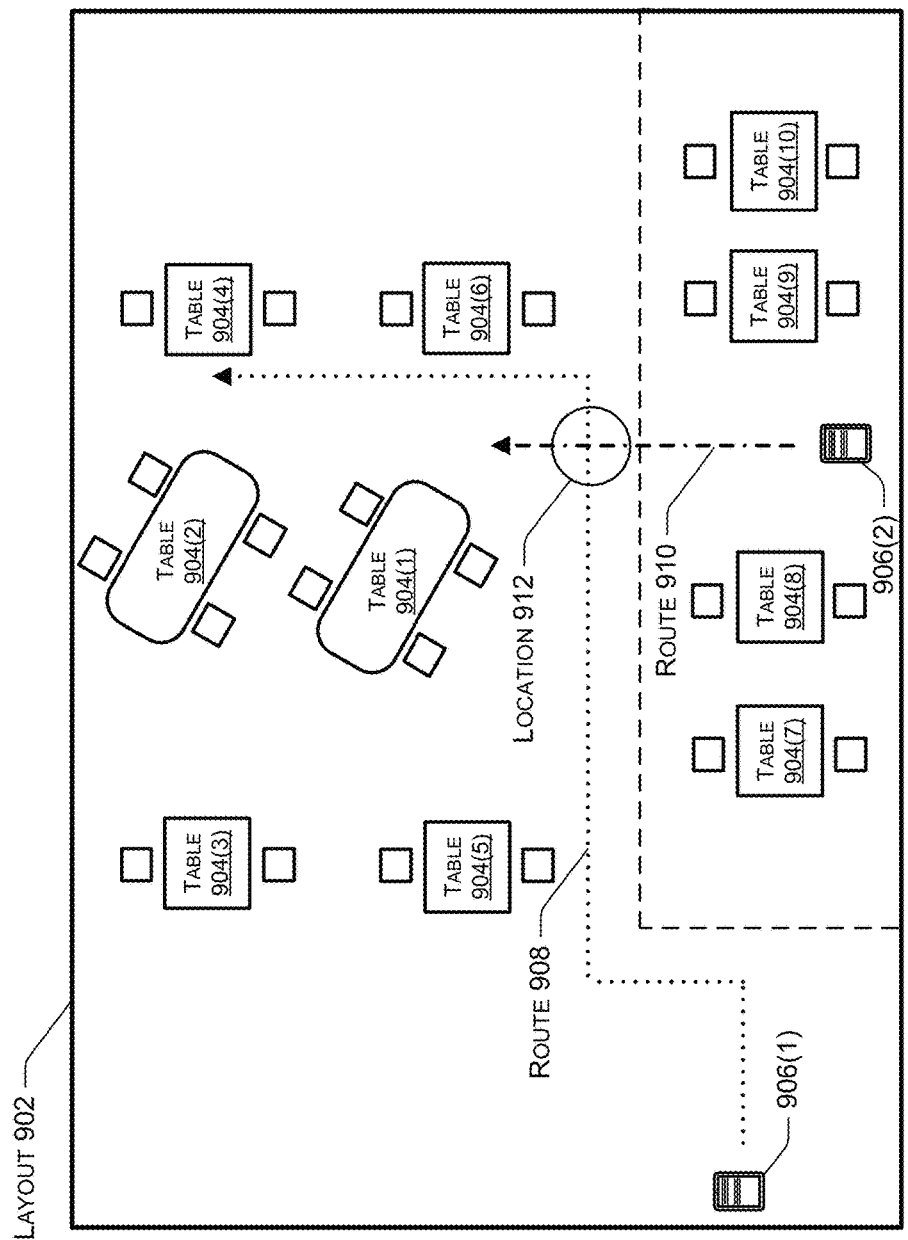

For instance, in the example of FIG. 9A, the payment service may determine a first route of a first user within the physical establishment, as represented by route 908. The payment service may further determine a second route of a second user within the physical establishment, as represented by route 910. Based on the first route 908 and the second route 910, the payment service can then identify at least one location within physical establishment in which a "bottleneck" occurs. A bottleneck can include a location or area within the physical establishment at which movements of the users cause congestion within the physical establishment such that movements of at least a portion of the users are slowed down or stopped.

For instance, as illustrated in FIG. 9A, the payment service may determine that a bottleneck occurs at location 912 within the physical establishment. In some instances, the payment service makes the determination based on the first route 908 and the second route 910 intersecting at the location 912 within the physical establishment. In some instances, the payment service makes the determination based on the first user associated with the first route 908 and the second user associated with the second route 910 being located at the location 912 (and/or within a threshold distance of the location 912) at approximately the same time (e.g., same second, within two seconds, within five seconds, etc.). Still, in some instances, the payment service makes the determination based on a threshold number of routes being located at the location 912 (and/or within a threshold distance of the location 912) at approximately the same time.

Figure 9B:
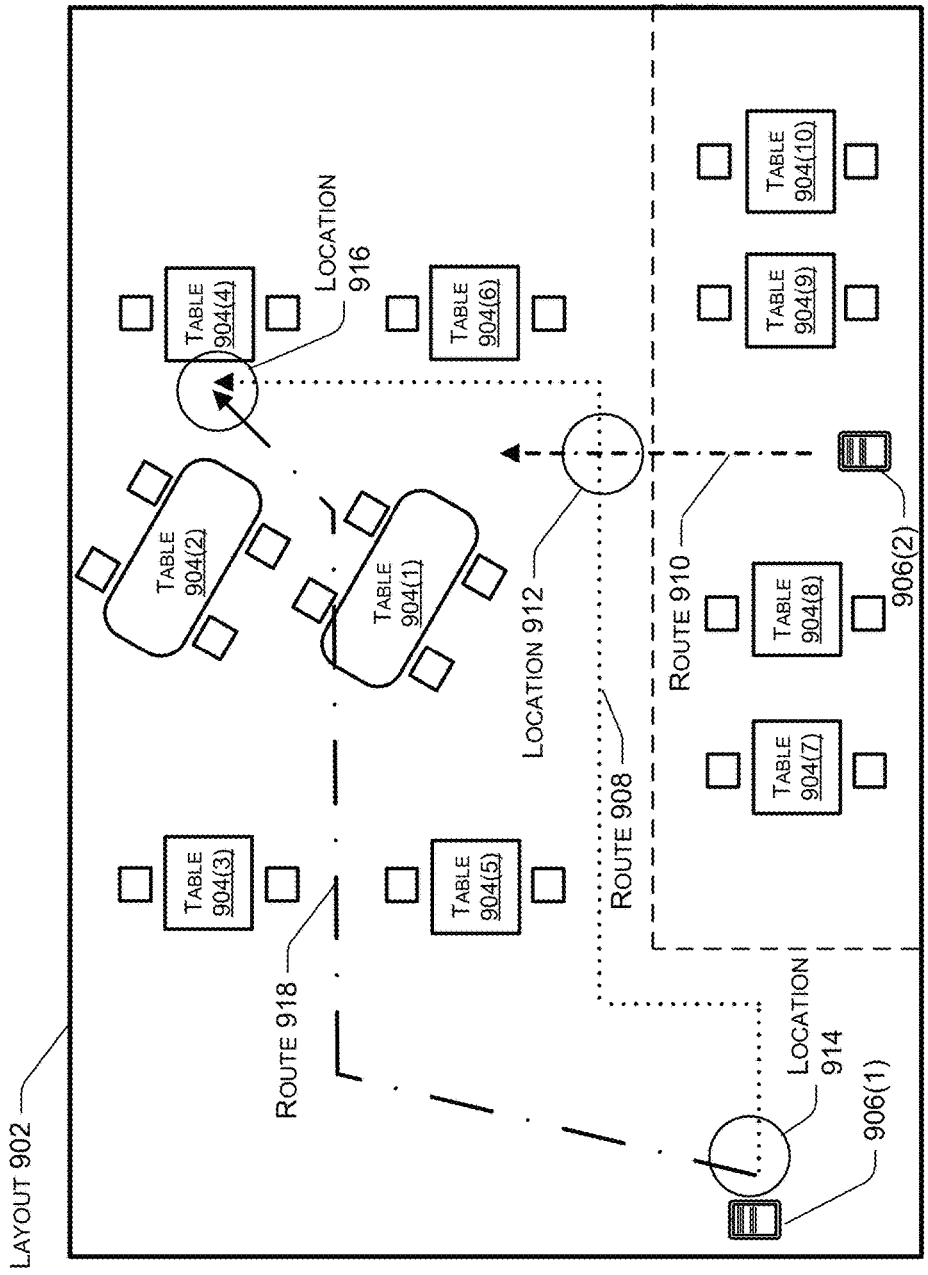

Based on identifying a bottleneck, the payment service can generate and provide the merchant with a recommendation for reducing or eliminating the bottleneck within the physical establishment. For instance, as illustrated in FIG. 9B, the payment service can identify a starting location 914 and an ending location 916 associated with at least one of the routes (e.g., the first route 908 in FIG. 9B). The payment service can then generate at least a new route 918 that starts at the starting location 914, ends at the ending location 916, and does not include the location 912. Based on the layout 902, the payment service can determine whether any objects within the physical establishment are located along the new route 918. For instance, and as illustrated in FIG. 9B, the payment service can determine that the table 904(1) is located along the path of the new route 918. The payment service can then generate a recommendation based on the determination.

For instance, the payment service may generate a recommendation that indicates that the merchant move the table 904(1) from its initial location to a new location such that the table 904(1) is no longer along the new route 918. To determine the new location, the payment service may analyze the layout 902 with respect to the new route 918 in order to identify one or more new locations for the table 904(1) such that the table 904(1) is no longer located along the new route 918. The payment service can then select one of the one or more new locations as the new location for the table 904(1). In some instances, the payment service may select the new location that is nearest to the initial location of the table 904(1). In some instances, the payment service may select the new location that provides users that use the new route 918 a threshold amount of space (e.g., one foot, two feet, five feet, etc.) from the table 904(1).

Figure 9D:
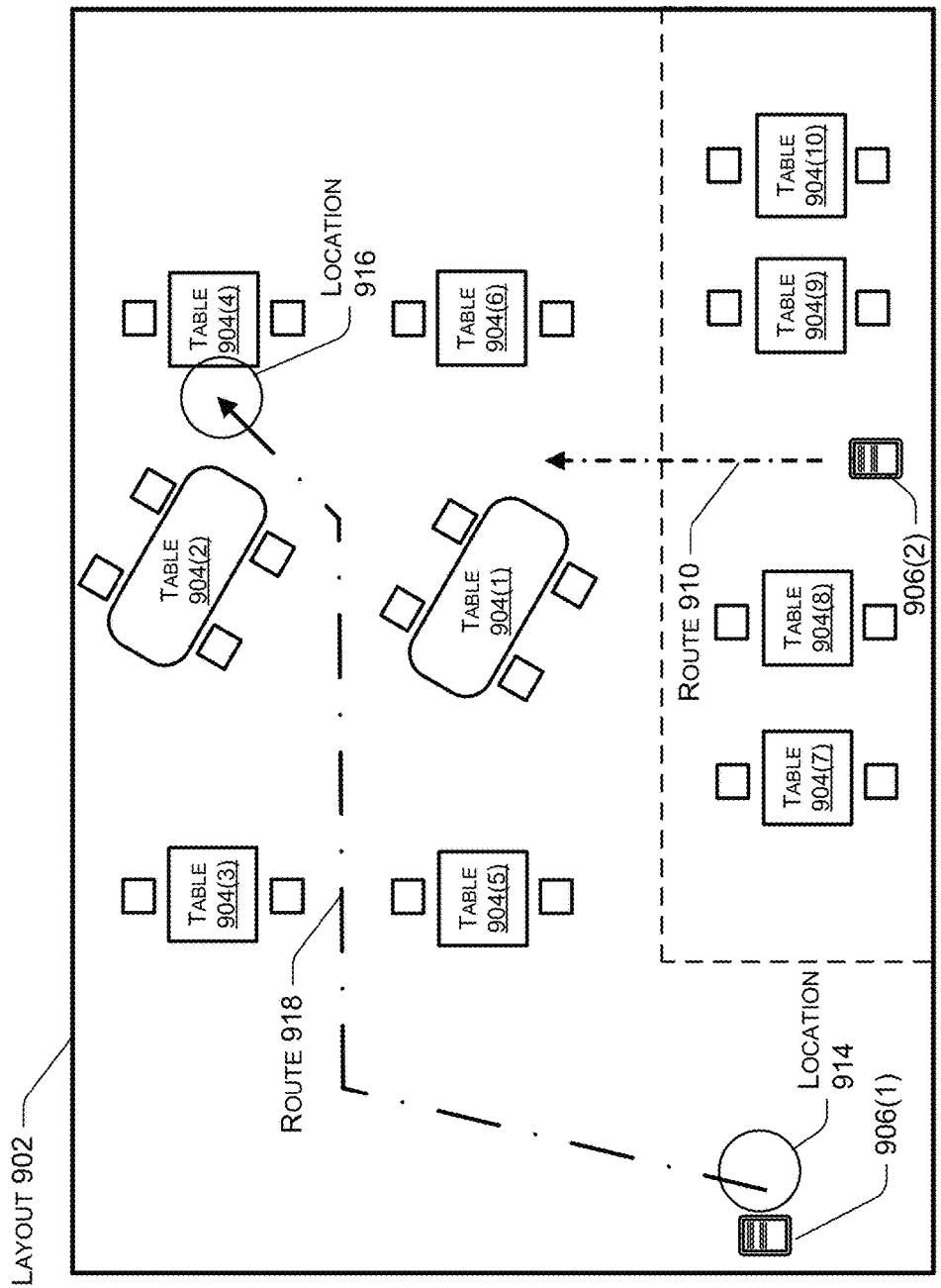

The payment service can then send a message that includes the recommendation to a merchant device associated with the merchant. Based on the recommendation, the payment service may receive data indicating that the table 904(1) was moved from the initial location to the new location within the physical establishment. For instance, as illustrated in FIG. 9C, the merchant may move the table 904(1) from its initial location (indicated by the dashed lines) to a new location (indicated by the solid lines), which is illustrated by the movement 918 of the table 904(1). The payment service can then update the layout 902 of the physical establishment based on the data. For instance, as illustrated in FIG. 9D, the layout 902 now indicates that the table 904(1) is no longer located along the new route 918. As such, the first user can use the new route 918, instead of the first route 908, thus reducing or eliminating the bottleneck within the physical establishment.

Figure 10A:
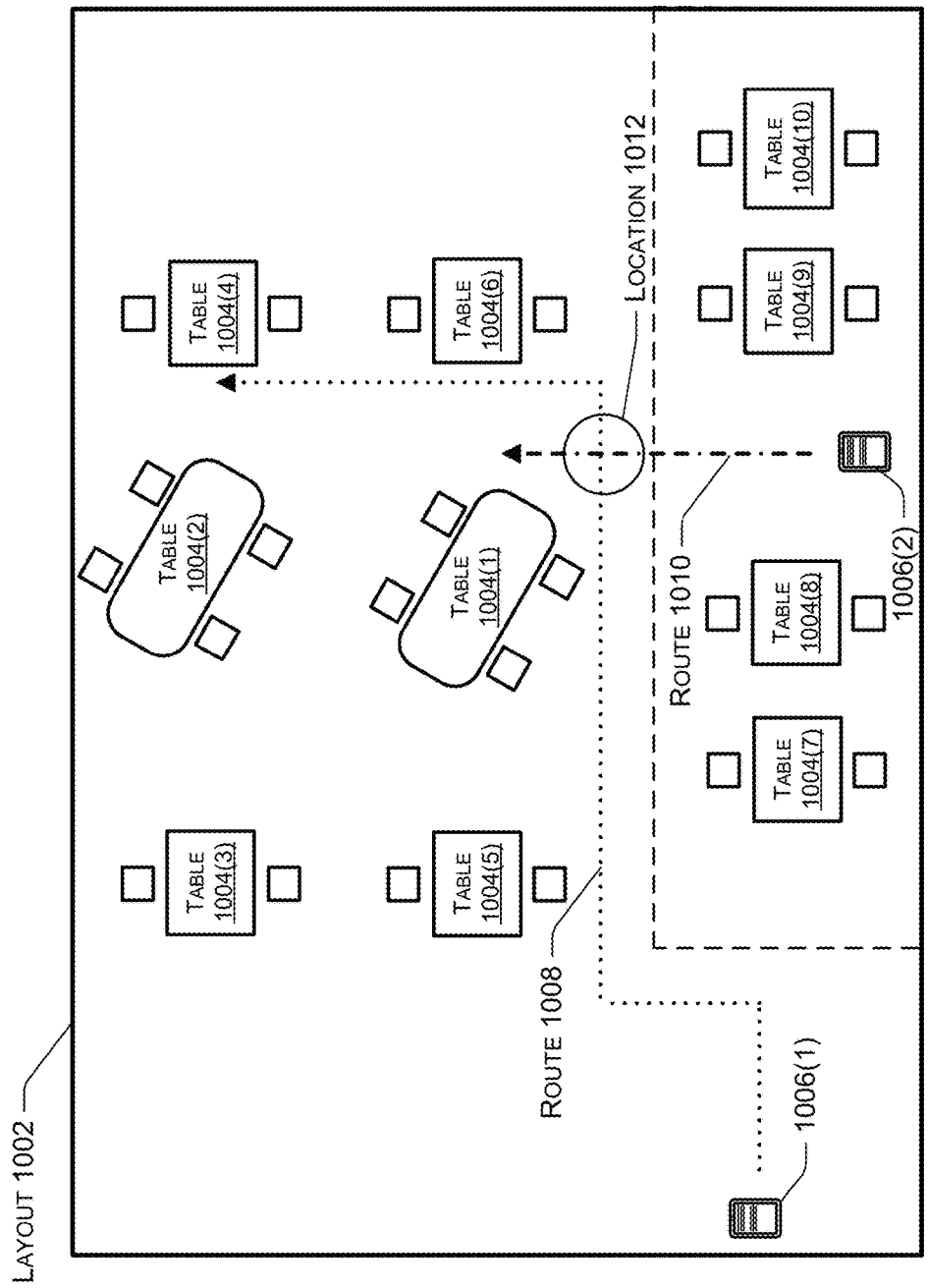
FIGS. 10A-10C illustrate a second example of analyzing sensor data to update a layout of a physical establishment.
Figure 10B:
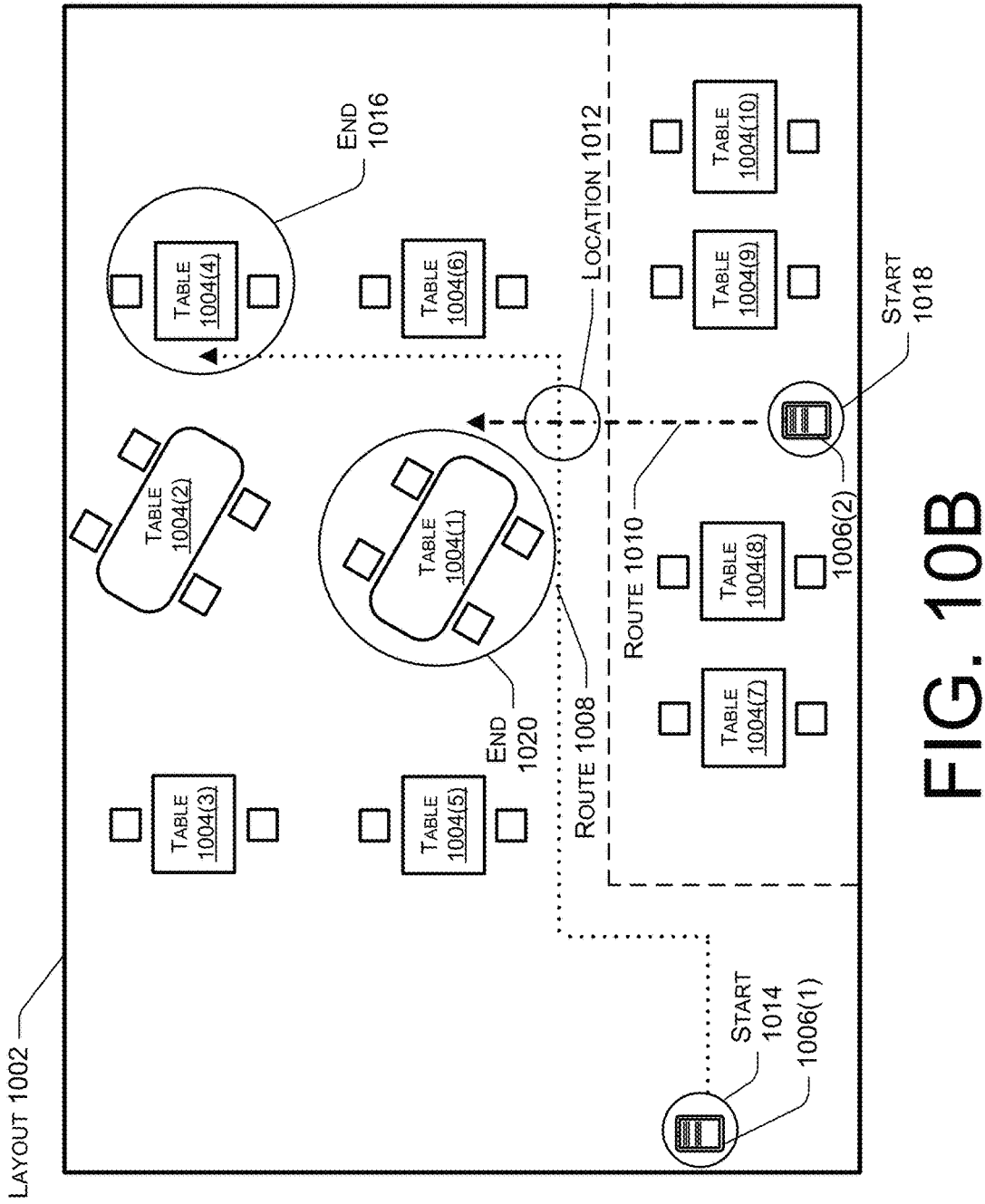
Figure 10C:
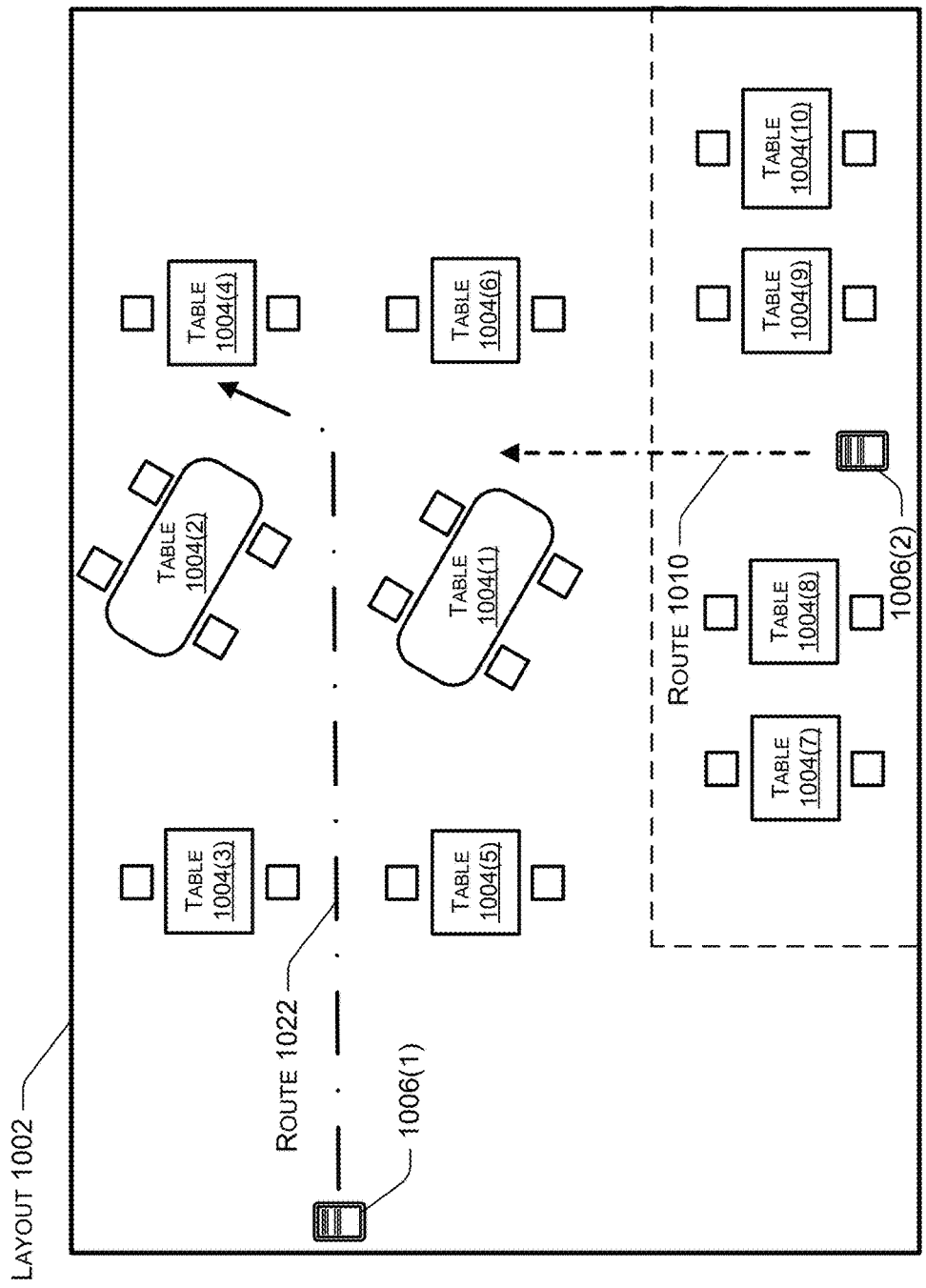

FIGS. 10A-10C illustrate a second example of analyzing sensor data to update a layout 1002 of a physical establishment. For instance, a payment service, such as the payment service 108, (and/or a merchant device) may receive a layout 1002 of a physical establishment that indicates at least locations of tables 1004(1)-(10), locations of chairs (represented by the smaller squares), and locations of merchant devices 1006(1)-(2) within the physical establishment. The payment service may further receive sensor data representing movements of users (e.g., merchants, such as the merchant's employees, customers, etc.) within the physical establishment. The payment service may then analyze the layout 1002 using similar techniques as described above with regard to FIGS. 9A-9C to identify a bottleneck within the physical establishment.

For instance, as illustrated in FIG. 10A, the payment service may analyze at least a first route 1008 and a second route 1010 to determine that a bottleneck occurs at location 1012 within the physical establishment. In some instances, the payment service makes the determination based on the first route 1008 and the second route 1010 intersecting at the location 1012 within the physical establishment. In some instances, the payment service makes the determination based on the first user associated with the first route 1008 and the second user associated with the second route 1010 being located at the location 1012 (and/or within a threshold distance of the location 1012) at approximately the same time (e.g., same second, within two seconds, within five seconds, etc.). Still, in some instances, the payment service makes the determination based on a threshold number of routes being located at the location 1012 (and/or within a threshold distance of the location 1012) at approximately the same time.

Based on identifying a bottleneck, the payment service can generate and provide the merchant a recommendation for reducing or eliminating the bottleneck within the physical establishment. For instance, as illustrated in FIG. 10B, the payment service can identify objects within the physical establishment that cause the users to move within the physical establishment according to paths corresponding to at least one of the first route 1008 or the second route 1010. For instance, the payment service can identify that the first route 1008 starts 1014 at the first merchant device 1006(1) and ends 1016 at the fourth table 1004(4). The payment service can further identify that the second route 1010 starts 1018 at the second merchant device 1006(2) and ends 1020 at the first table 1004(1).

Using the identified objects, the payment service can then generate a recommendation that indicates moving at least one of the identified objects within the physical establishment such that at least one of the first route 1008 or second route 1010 is no longer utilized by users. For instance, as illustrated in FIG. 10C, the payment service can generate and provide recommendation that indicates moving the first merchant device 1006(1) from an initial location within the physical establishment to a new location within the physical establishment. As shown, by moving the first merchant device 1006(1), employees can start using a new route 1022 through the physical establishment that avoids the bottleneck location 1012.

Figure 11A:
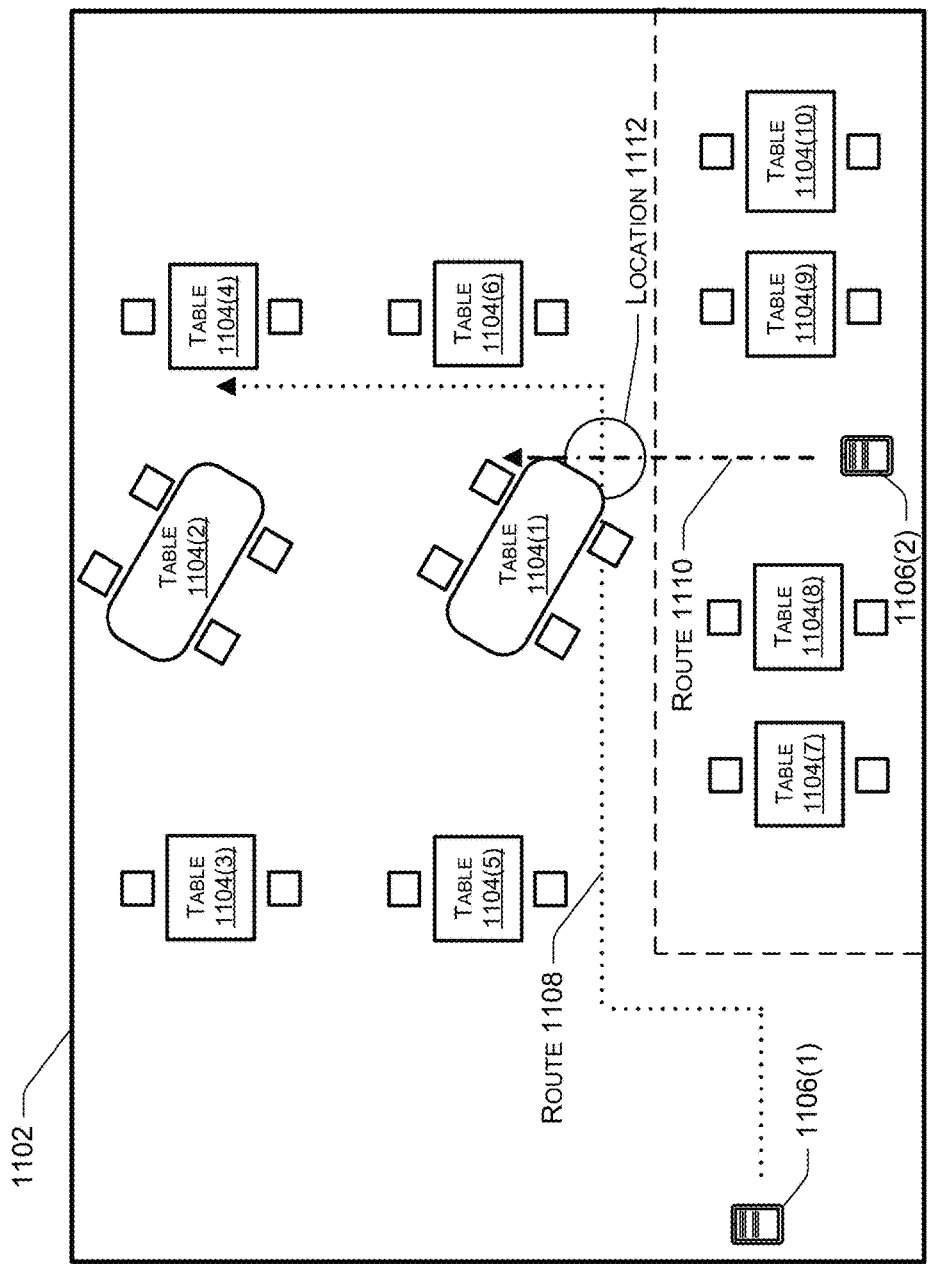
FIGS. 11A-11C illustrate a third example of analyzing sensor data to update a layout of a physical establishment.

It should be noted that, in some instances, in addition to, or alternatively from, identifying a new route within a physical establishment, the payment service can merely send a recommendation to move an object located around the bottleneck location 1012. For instance, as illustrated in FIG. 11A, a payment service, such as the payment service 108, (and/or a merchant device) may receive a layout 1102 of a physical establishment that indicates at least locations of tables 1104(1)-(10), locations of chairs (represented by the smaller squares), and locations of merchant devices 1106(1)-(2) within the physical establishment. The payment service may further receive sensor data representing movements of users (e.g., merchants, such as the merchant's employees, customers, etc.) within the physical establishment. The payment service may then analyze the layout 1102 using similar techniques as described above with regard to FIGS. 9A-9C to identify a bottleneck within the physical establishment.

the payment service may analyze at least a first route 1108 and a second route 1110 to determine that a bottleneck occurs at location 1112 within the physical establishment. In some instances, the payment service makes the determination based on the first route 1108 and the second route 1110 intersecting at the location 1112 within the physical establishment. In some instances, the payment service makes the determination based on the first user associated with the first route 1108 and the second user associated with the second route 1110 being located at the location 1112 (and/or within a threshold distance of the location 1112) at approximately the same time (e.g., same second, within two seconds, within five seconds, etc.). Still, in some instances, the payment service makes the determination based on a threshold number of routes being located at the location 1112 (and/or within a threshold distance of the location 1112) at approximately the same time.

The payment service can then identify an object located near the bottleneck location 1112. For instance, as illustrated in FIG. 11A, the payment service can identify that the first table 1104(1) is located proximate to the bottleneck location 1112. In some instances, the payment service makes the identification based on an initial location of the first table 1104(1) being within a threshold distance to the bottleneck location 1112, such as one foot, five feet, or the like. The payment service can then determine a new location (e.g., optimal location) for placing the first table 1104(1) such that the users will have more room around the bottleneck location 1112 when moving throughout the physical establishment.

Figure 11B:
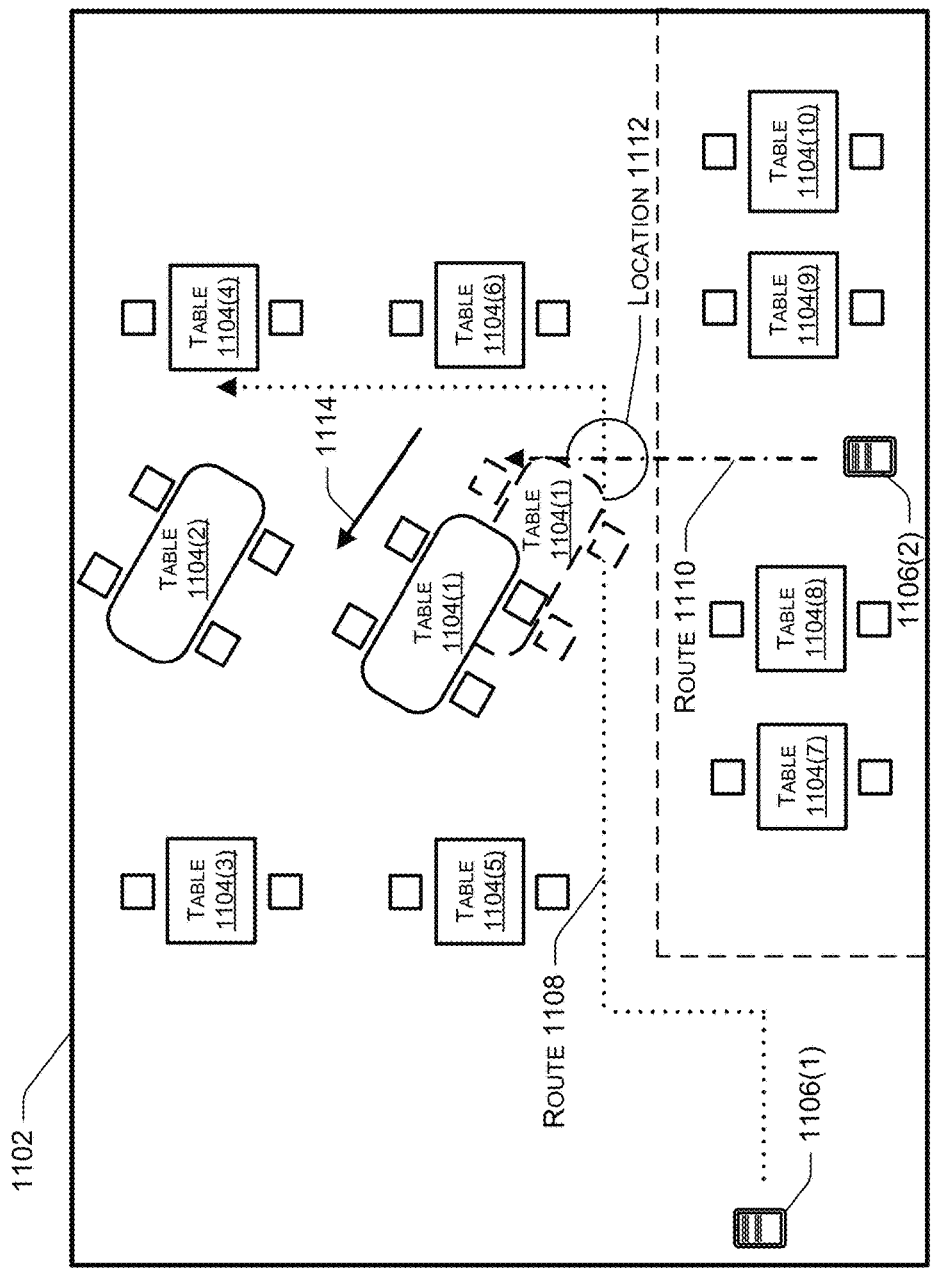
Figure 11C:
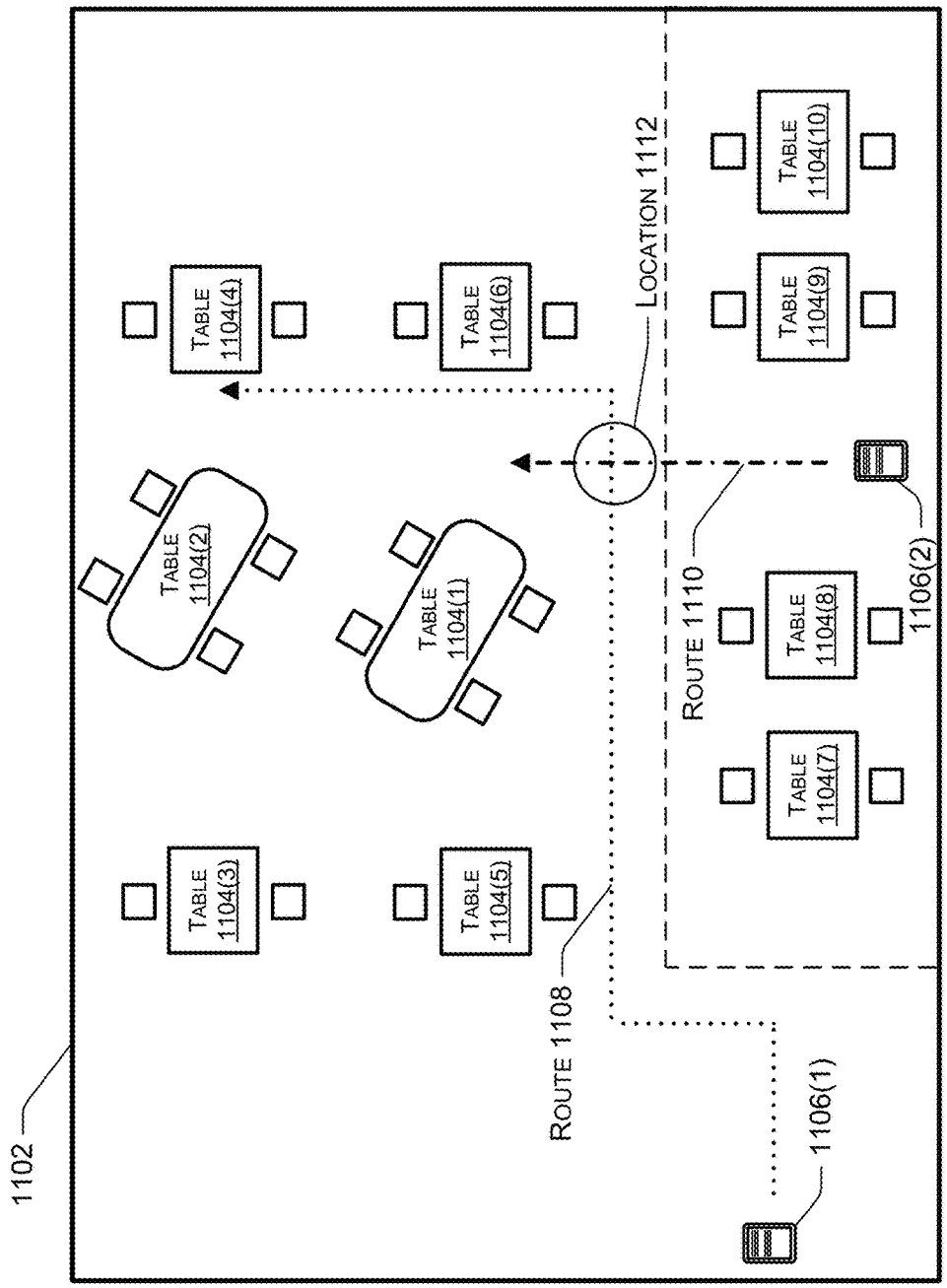

For instance, as illustrated in FIG. 11B, the payment service can recommend that the first table 1104(1) be moved in a north and/or east direction 1114 within the physical establishment such that the first table 1004(1) is further away from the bottleneck location 1112. As shown in FIG. 11B, the dotted lines indicate the initial location of the first table 1104(1) and the solid lines indicate the recommended location for placing the first table 1104(1). By moving the first table 1104(1), and as illustrated in FIG. 11C, users that are moving within the physical establishment, and specifically moving in an area around the bottleneck location 1112, will have more room to move. As such, the users will not be bumping into one another and/or be forced to slow their respective movements when moving around the bottleneck location 1112.

Figure 12A:
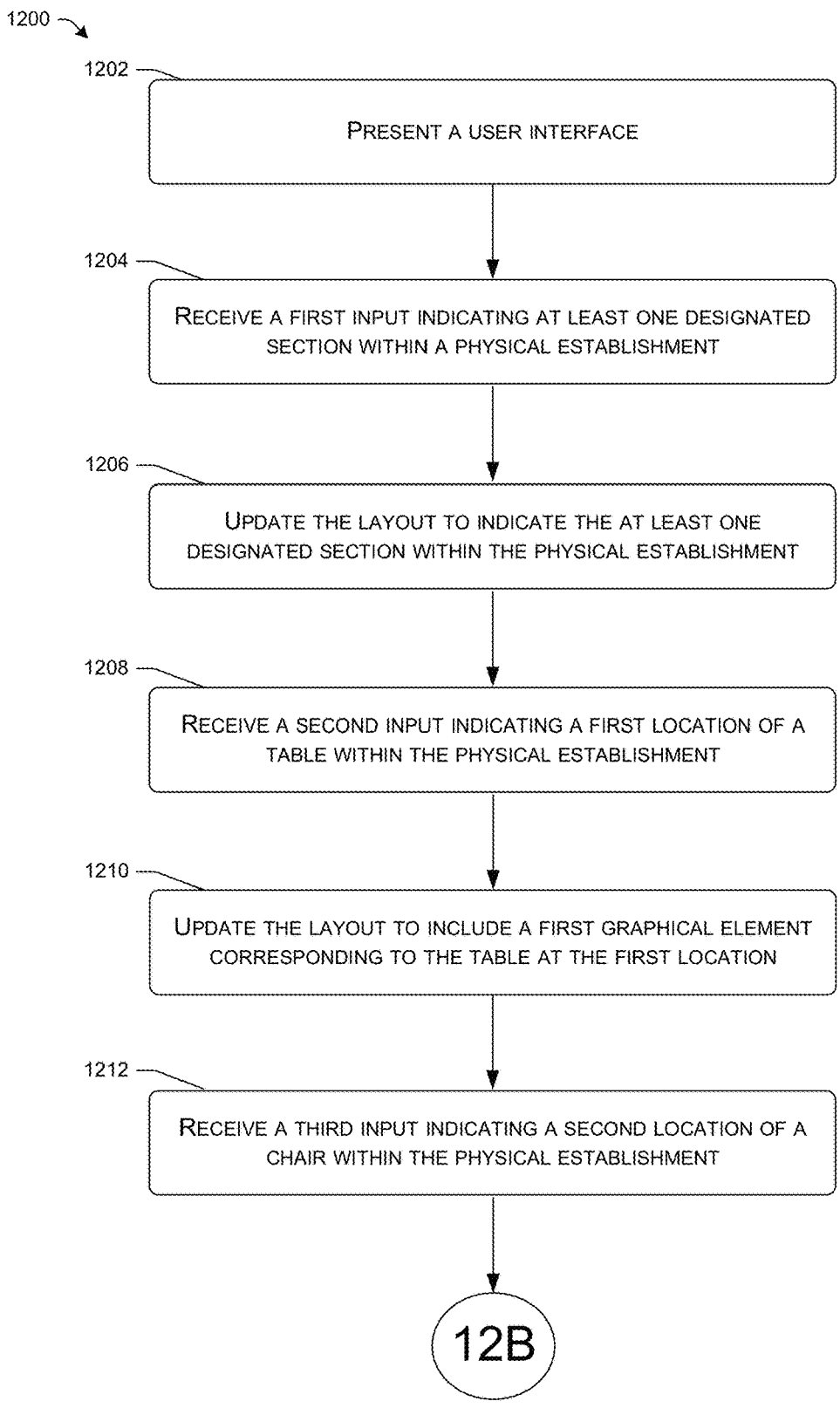
FIGS. 12A-12B illustrate a flow diagram of a first example process for creating a layout of a physical establishment via a user interface.
Figure 12B:
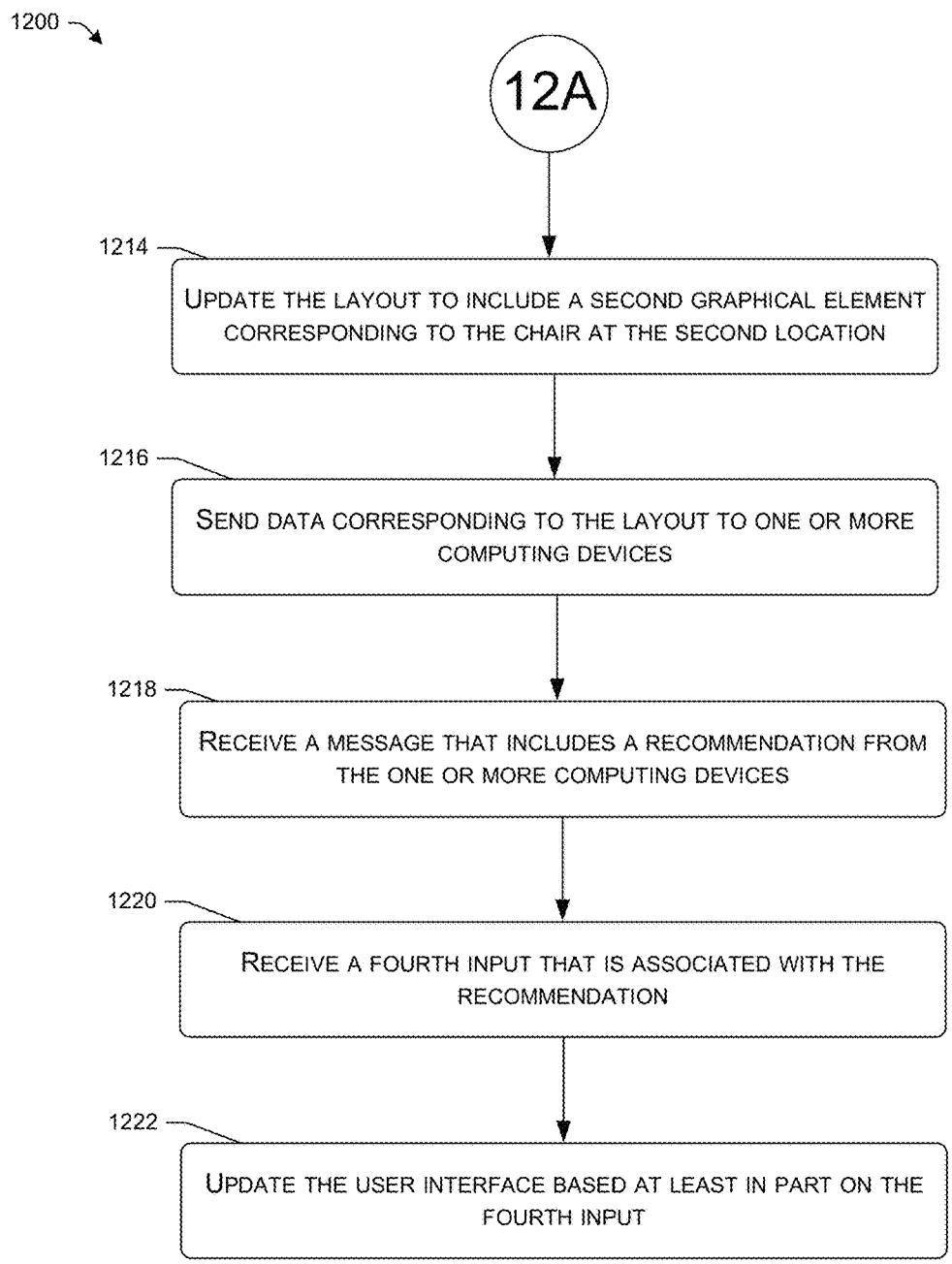

FIGS. 12A-12B illustrate a flow diagram of a first example process 1200 for creating a layout of a physical establishment via a user interface. The process 1200, and other processes described herein, are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 1200, and other processes described herein, may be performed by a payment service (e.g., payment service 108), a merchant device (e.g., merchant device 116 and/or a merchant device 200), a customer device, an additional electronic device, or by a combination thereof.

At 1202, a merchant device 116 presents a user interface. For instance, the merchant device 116 may present a user interface for creating a layout of a floor plan of a physical establishment of a merchant. The user interface may include a "blank canvas" that the merchant can use to input locations of designated sections and objects within the physical establishment. The user interface may further include an editing tool for editing at least the shape, layout, size, and number of chairs associated with one or more of the objects.

At 1204, the merchant device 116 receives a first input indicating at least one designated section within the physical establishment. For instance, the merchant device 116 can receive, via the user interface, the first input indicating a designated section within the physical establishment. If the merchant is a restaurant, the first input can indicate one or more of an area designated to a waiting area, an area designated to a dining room, an area designated to a bathroom, an area designated to a kitchen, an area designated to a retail area, an area designated to a patio, or the like.

At 1206, the merchant device 116 updates the layout to indicate the at least one designated section within the physical establishment. For instance, the merchant device 116 may update the layout of the user interface to include graphical elements that indicate the at least one designated area within the physical establishment. In some instances, the graphical elements can include border lines, highlighted areas over the layout, or the like that indicate that least one designated area.

At 1208, the merchant device 116 receives a second input indicating a first location of a table within the physical establishment. For instance, the merchant device 116 may receive, via the user interface, the second input indicating the first location of the table. In some instances, the second input can correspond to a drag-and-drop input where the merchant selects the table and then drags the table to a location on the layout that corresponds to the first location within the physical establishment. In some instances, the second input can correspond to a sketch that the merchant draws on a display device associated with the merchant device 116. For instance, the display device may include a touchscreen that receives input from the merchant in the form of a sketch.

At 1210, the merchant device 116 updates the layout to include a first graphical element corresponding to the table at the first location. For instance, the merchant device 116 can present the first graphical element at a location on the layout that corresponds to the first location within the physical establishment. In some instances, the first graphical element can include an image representing the table. In some instances, the merchant device 116 can further receive input updating characteristics of the table. For instance, the merchant device 116 can receive, via the user interface, input indicating the size, shape, and/or orientation of the table. The merchant device 116 can then update the first graphical element based on the updated characteristics.

At 1212, the merchant device 116 receives a third input indicating a second location of a chair within the physical establishment. For instance, the merchant device 116 can receive, via the user interface, the third input that indicates the third location of the chair. In some instances, the third input can correspond to the merchant indicating a number of chairs associated with the table, as well as the layout of the chairs around the table. In some instances, the third input can correspond to a sketch that the merchant draws on the display device.

At 1214, the merchant device 116 updates the layout to include a second graphical element corresponding to the chair at the second location. For instance, the merchant device 116 can present the second graphical element at a location on the layout that corresponds to the second location within the physical establishment. In some instances, the second graphical element can include an image representing the chair.

At 1216, the merchant device 116 sends data corresponding to the layout to one or more computing devices. For instance, the merchant device 116 can receive, via the user interface, input indicating that the layout is complete. The merchant device 116 can then generate data corresponding to the layout, and save the data locally. Additionally, the merchant device 116 can send the data corresponding to the layout to the one or more computing devise. In some instances, the one or more computing devices include a payment service.

At 1218, the merchant device 116 receives a message that includes a recommendation from the one or more computing devices. For instance, based on sending the data to the one or more computing devices, the merchant device 116 can receive the message. The recommendation can indicate a location within the physical establishment for placing a designated section and/or a location within the physical establishment for placing an object. For instance, the recommendation can indicate a third location for placing the table, the chair, an additional table, an additional chair, a television, a merchant device, or the like. The merchant device 116 can receive the message from the one or more computing devices and present the recommendation in response. In some instances, the merchant device 116 can further present, via the user interface, an indication that indicates the recommendation. For instance, if the recommendation indicates a third location for placing table or chair, the merchant device 116 can present, via the user interface, an indication of the third location.

At 1220, the merchant device 116 receives a fourth input that is associated with the recommendation. For instance, the merchant device 116 can receive, via the user interface, the fourth input that indicates that the table, the chair, an additional table, an additional chair, a television, or a merchant device was placed at the third location within the physical establishment. In some instances, the fourth input can correspond to a drag-and-drop input. For instance, the merchant may select a graphical element representing an object and then drag the graphical element to a location on the layout that corresponds to the third location within the physical establishment. In some instances, the fourth input can correspond to a sketch that the merchant draws on the display device.

At 1222, the merchant device 116 updates the user interface based at least in part on the fourth input. For instance, if the fourth input indicates that the table was moved to the third location, the merchant device 116 can present the first graphical element corresponding to the table at a location on the layout that corresponds to the third location. If the fourth input indicates that the chair was moved to the third location, the merchant device 116 can present the second graphical element corresponding to the chair at the location on the layout that corresponds to the third location. Additionally, if the fourth input indicates that a new object is located at the third location, then the merchant device 116 can present a third graphical element corresponding to the new object at the third location within the physical establishment.

In some instances, the merchant device 116 can then save data corresponding to the updated layout. Additionally, the merchant device 116 can send the data corresponding to the updated layout to the one or more computing devices, or send data indicating the change to the layout to the one or more computing devices.

Figure 13:
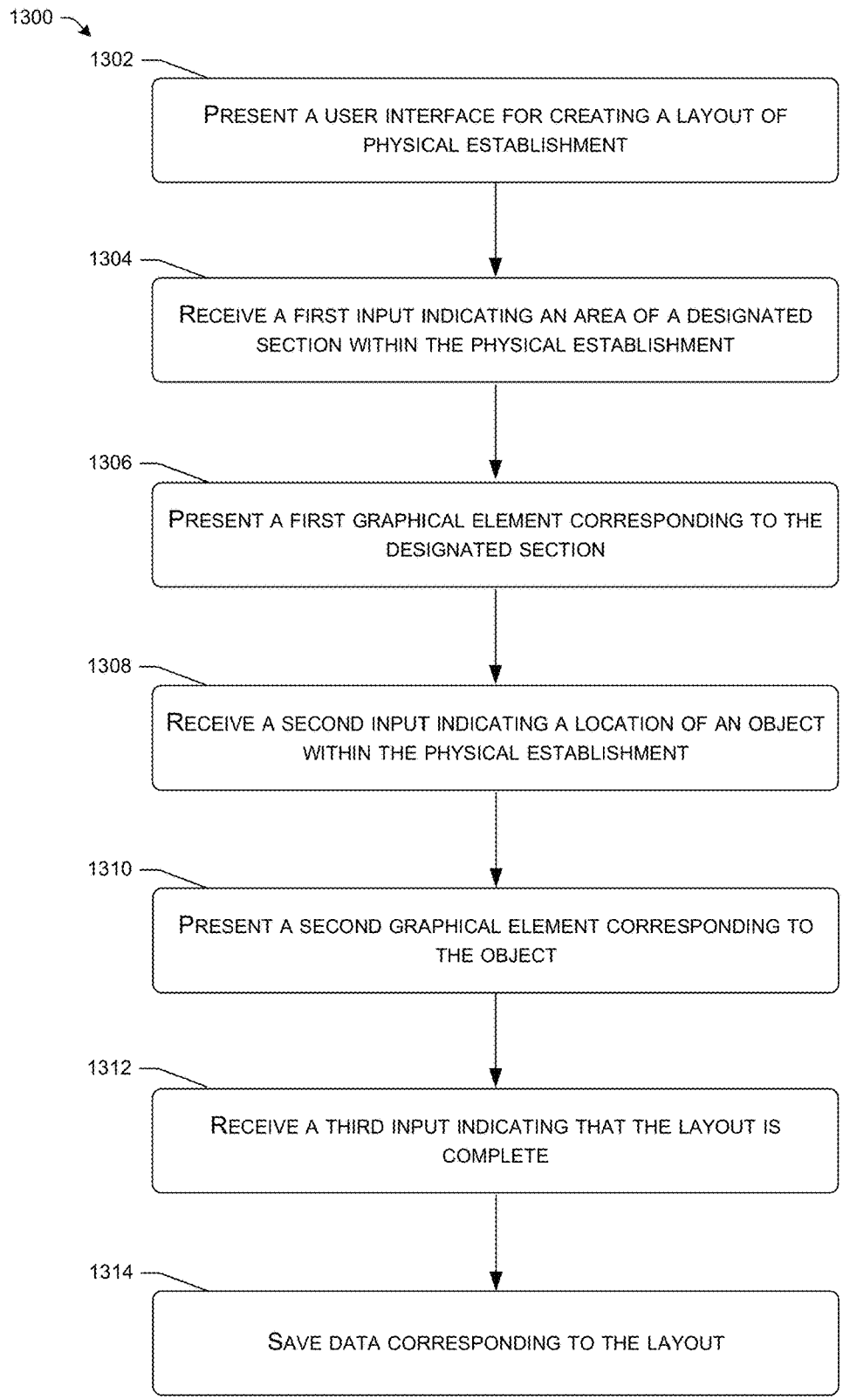
FIG. 13 illustrates a flow diagram of a second example process for creating a layout of a physical establishment via a user interface.

FIG. 13 illustrates a flow diagram of a second example process 1300 for creating a layout of a physical establishment via a user interface. At 1302, a merchant device 116 presents a user interface for creating a layout of a physical establishment. In some instances, the user interface may include a "blank canvas" that the merchant can use to input locations of designated sections and objects within the physical establishment. The user interface may further include an editing tool for editing at least the shape, layout, and/or size of one or more objects.

At 1304, the merchant device 116 receives a first input indicating an area of a designated section within the physical establishment. For instance, the merchant device 116 can receive, via the user interface, the first input indicating an area of a designated section within the physical establishment. If the merchant is a restaurant, the first input can indicate one or more of an area designated to a waiting area, an area designated to a dining room, an area designated to a bathroom, an area designated to a kitchen, an area designated to a retail area, an area designated to a patio, or the like.

At 1306, the merchant device 116 presents a first graphical element corresponding to the designated section. For instance, the merchant device 116 can update the layout such that the layout presents the first graphical element corresponding to the designated section at the area within the physical establishment. In some instances, the first graphical element can include border lines, highlighted areas over the layout, or the like that indicate the designated area.

At 1308, the merchant device 116 receives a second input indicating a location of an object within the physical establishment. For instance, the merchant device 116 may receive, via the user interface, the second input indicating the location of the object. The object can include a table, a chair, a television, a merchant device, an item, a rug, a window, or any other physical object. In some instances, the second input can correspond to a drag-and-drop input where the merchant selects the object and then drags the object to a location on the layout that corresponds to the location within the physical establishment. In some instances, the second input can correspond to a sketch that the merchant draws on a display device associated with the merchant device 116.

At 1310, the merchant device 116 presents a second graphical element corresponding to the object. For instance, the merchant device 116 can update the layout such that the layout presents the second graphical element corresponding to the object at the location in the physical establishment. In some instances, the second graphical element can correspond to an image that represents the object. For instance, the image can include a digital image taken of the object, or the image can include a specific object that is similar to the object within the physical establishment.

At 1312, the merchant device 116 receives a third input indicating that the layout is complete. For instance, the merchant device 116 can receive, via the user interface, the third input indicating that the layout is complete. In some instances, the third input can correspond to a selection of a button on the user interface that indicates that the merchant is finished creating the layout.

At 1314, the merchant device 116 saves data corresponding to the layout. For instance, based on receiving the third input, the merchant device 116 can generate and save data corresponding to the layout. In some instances, the merchant device 116 can further send the data to one or more computing devices, such as a payment service.

Figure 14:
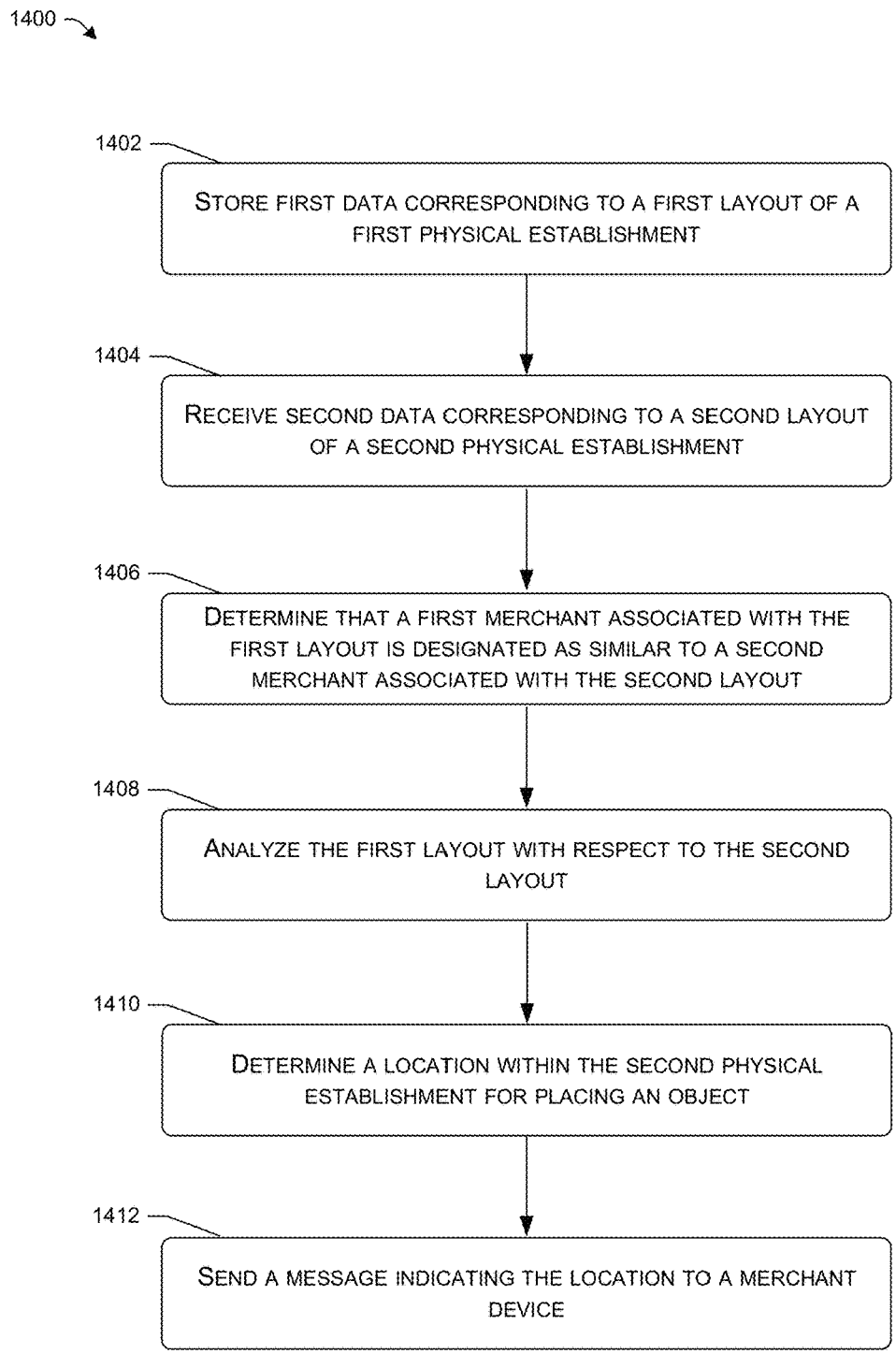
FIG. 14 illustrates a flow diagram of an example process for analyzing respective layouts of physical establishments.

FIG. 14 illustrates a flow diagram of an example process 1400 for analyzing respective layouts of physical establishments. At 1402, a payment service 108 stores first data corresponding to a first layout of a first physical establishment. For instance, the payment service 108 may store, in one or more databases, data corresponding to respective layouts of physical establishments associated with merchants. The first layout may indicate locations of designated sections and/or objects within the first physical establishment. For instance, if the first merchant is a restaurant merchant, the first layout may indicate the locations of at least tables, chairs, televisions, and merchant devices within the first physical establishment.

At 1404, the payment service 108 receives second data corresponding to a second layout of a second physical establishment. For instance, the payment service 108 can receive, from a merchant device associated with a second merchant, the second data corresponding to the second layout. The second layout can indicate locations of designated sections and/or objects within the second physical establishment. For instance, if the second merchant is also a restaurant merchant, the second layout may indicate the locations of at least tables, chairs, televisions, and merchant devices within the second physical establishment.

It should be noted that, in some instance, the second data can include image data representing the second physical establishment. For instance, the payment service 108 can receive image data representing the second physical establishment from the merchant device associated with the second merchant. The payment service 108 can then analyze the image data to generate the layout. For instance, the payment service 108 can analyze the image data using one or more image processing techniques to identify locations of designated sections and/or objects within the second physical establishment. The payment service 108 can then generate the layout based on the locations.

At 1406, the payment service 108 determines that a first merchant associated with the first layout is designated as similar to a second merchant associated with the second layout. For instance, the payment service 108 can determine a type of business associated with the second merchant. In some instances, the payment service 108 determines the type of business using a profile associated with the second merchant. The payment service 108 can then determine that the first merchant is also associated with the type of business using a profile associated with the first merchant.

At 1408, the payment service 108 analyzes the first layout with respect to the second layout. For instance, the payment service 108 can compare first locations of designated sections and/or objects as indicated by the first layout to second locations of designated sections and/or objects as indicated by the second layout. Based on the comparing, the payment service 108 can identify differences between the first locations and the second locations, and/or the payment service 108 can identify designated sections and/or objects indicated by the first layout that are not indicated by the second layout.

At 1410, the payment service 108 determines a location within the second physical establishment for placing an object. For instance, the payment service 108 can determine the location based on the analyzing of the first layout with respect to the second layout. In some instances, determining the location can include determining a new location for an object that is already located within the second physical establishment based on the comparing. In some instances, determining the location can include determining a location for a new object that is not already located in the second physical establishment.

At 1412, the payment service 108 sends a message indicating the location to a merchant device. For instance, the payment service 108 can generate a message that includes a recommendation that the second merchant place the object at the location within the second physical establishment. The payment service 108 can then send the message to a merchant device associated with the second merchant. In some instances, based on sending the message, the payment service 108 can then receive a message from the merchant device that indicates that the object is located at the location in the second physical establishment. The payment service 108 can then update the second data such that the second layout indicates that the object is at the location.

It should be noted that, in some instances, the payment service 108 may utilize other factors when determining the location in addition to analyzing the first layout with respect to the second layout. For instance, the payment service 108 may determine the location for the object based on a specific event, transaction data associated with the first merchant, transaction data associated with the second merchant, sensor data representing movements of the first merchant or customers within the second physical establishment, or the like.

Figure 15B:
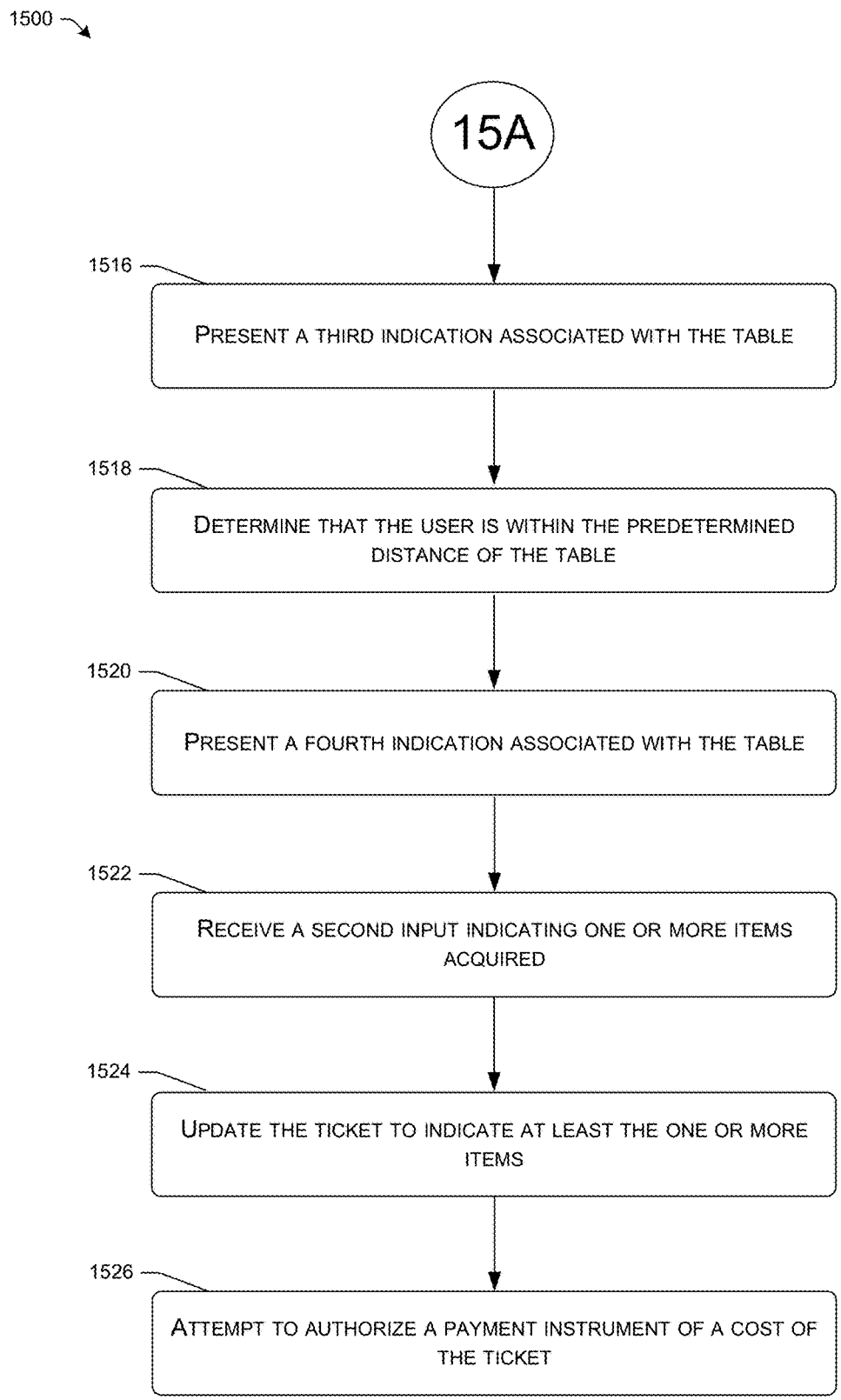

FIGS. 15A-15B illustrate a flow diagram of a first example process 1500 for utilizing a user interface. At 1502, a merchant device 116 presents a user interface indicating a location of a table within a physical establishment. For instance, the merchant device 116 may present, via the user interface, a layout of the physical establishment. The layout may indicate locations of designated sections and objects within the physical establishment. For instance, if the merchant is a restaurant type merchant, the layout may indicate the location of at least one table within the physical establishment.

At 1504, the merchant device 116 presents a first indication associated with the table. For instance, the merchant device 116 can determine that the table is in a first state. In some instances, the first state can correspond to an open state, in which no customers are seated at the table. Based on the table being in the first state, the merchant device 116 can present the first indication, which indicates that the table is in the first state. In some instances, the first indication can include a first color and/or first pattern associated with the first state.

At 1506, the merchant device 116 receives a first input for creating a ticket for the table. For instance, the merchant device 116 can receive, via the user interface, the first input for creating the ticket for the table. Based on the first input, the merchant device 116 can generate the ticket and then associate the ticket with the table. In some instances, the ticket includes a data structure that represents one or more items ordered by customers seated at the table during a transaction between the merchant and the customers.

At 1508, the merchant device 116 presents a second indication associated with the table. For instance, the merchant device 116 can determine that the table is in a second state. In some instances, the merchant device 116 can determine that the table is in the second state based on receiving the first input. For instance, the second state can correspond to an occupied state, in which customers are seated at the table. Based on the table being in the second state, the merchant device 116 can present the second indication, which indicates that the table is in the second state. In some instances, the second indication can include a second color and/or second pattern associated with the second state.

At 1510, the merchant device 116 receives data representing a movement of a user within the physical establishment. For instance, the merchant device 116 can receive, from an electronic device, sensor data representing the movement of the user (e.g., employee of the merchant) within the physical establishment. In some instances, the electronic device is associated with the table, and the sensor data indicates whether the electronic device detected the user. In some instances, the electronic device is associated with user, and the sensor data indicates a geographical location of the electronic device within the physical establishment. Still, in some instances, the electronic device includes an image capturing device, and the sensor data includes image data representing the physical establishment.

At 1512, the merchant device 116 determines that the user has been outside of a predetermined distance from the table for a threshold period of time. For instance, if the electronic device is associated with the table, the merchant device 116 can analyze the sensor data to determine that the electronic device has not detected the user for the threshold period of time. Additionally, if the electronic device is associated with the user, the merchant device 116 can analyze the sensor data to determine that the geographical location of the electronic device has been outside of the predetermined distance for the threshold period of time. Furthermore, if the electronic device is an image capturing device, the merchant device 116 can analyze the image data to determine that a geographical location of the user has been outside of the predetermined distance for the threshold period of time.

At 1516, the merchant device 116 presents a third indication associated with the table. For instance, the merchant device 116 can determine that the table is in a third state. In some instances, the merchant device 116 can determine that the table is in the third state based on determining that the user has been outside of the predetermined distance for the threshold period of time. For instance, the third state can correspond to an assistance state, in which customers seated at the table are in need of assistance from the merchant. Based on the table being in the third state, the merchant device 116 can present the third indication, which indicates that the table is in the third state. In some instances, the third indication can include a third color and/or third pattern associated with the third state.

At 1518, the merchant device 116 determines that the user is within the predetermined distance of the table. For instance, if the electronic device is associated with the table, the merchant device 116 can receive additional sensor data from the electronic device. The merchant device 116 can then then analyze the additional sensor data to determine that the electronic device detected the user. Additionally, if the electronic device is associated with the user, the merchant device 116 can receive additional sensor data from the electronic device. The merchant device 116 can then analyze the additional sensor data to determine that the geographical location of the electronic device is within the predetermined distance. Furthermore, if the electronic device is an image capturing device, the merchant device 116 can receive additional image data from the image capturing device. The merchant device 116 can then analyze the image data to determine that a geographical location of the user is within the predetermined distance.

At 1520, the merchant device 116 presents a fourth indication associated with the table. For instance, the merchant device 116 can determine that the table is in a fourth state. In some instances, the merchant device 116 can determine that the table is in the fourth state based on determining that the user is within the predetermined distance. For instance, the fourth state can correspond to a non-assistance state, in which customers seated at the table are not in need of assistance from the merchant. Based on the table being in the fourth state, the merchant device 116 can present the fourth indication, which indicates that the table is in the fourth state. In some instances, the fourth indication can include a fourth color and/or fourth pattern associated with the fourth state.

At 1522, the merchant device 116 receives a second input indicating one or more items acquired and at 1424, the merchant device 116 updates the ticket to indicate the one or more items. For instance, the merchant device 116 may receive, via the user interface, the second input indicating the one or more items acquired by the customers seated at the table. Based on the second input, the merchant device 116 can update the ticket to indicate at least the one or more items and a cost associated with the one or more items.

At 1526, the merchant device 116 attempts to authorize a payment instrument for a cost of the ticket. For instance, the merchant device 116 may receive input indicating payment information associated with the payment instrument. In some instances, the merchant device 116 receives the input via a card reader. The merchant device 116 can then communicate with a payment service to attempt to authorize the payment instrument for the cost of the ticket. Additionally, the merchant device 116 can receive, from the payment service, a message indicating whether the payment instrument was authorized.

In some instances, after authorizing the payment instrument, the merchant device 116 presents the first indication associated with the table. For instance, the merchant device 116 can determine that the table is once again in the first state. In some instances, the merchant device 116 can determine that the table is once again in the first state based on authorizing the payment instrument. Based on the table once again being in the first state, the merchant device 116 can present the first indication, which indicates that the table is in the first state.

Figure 16:
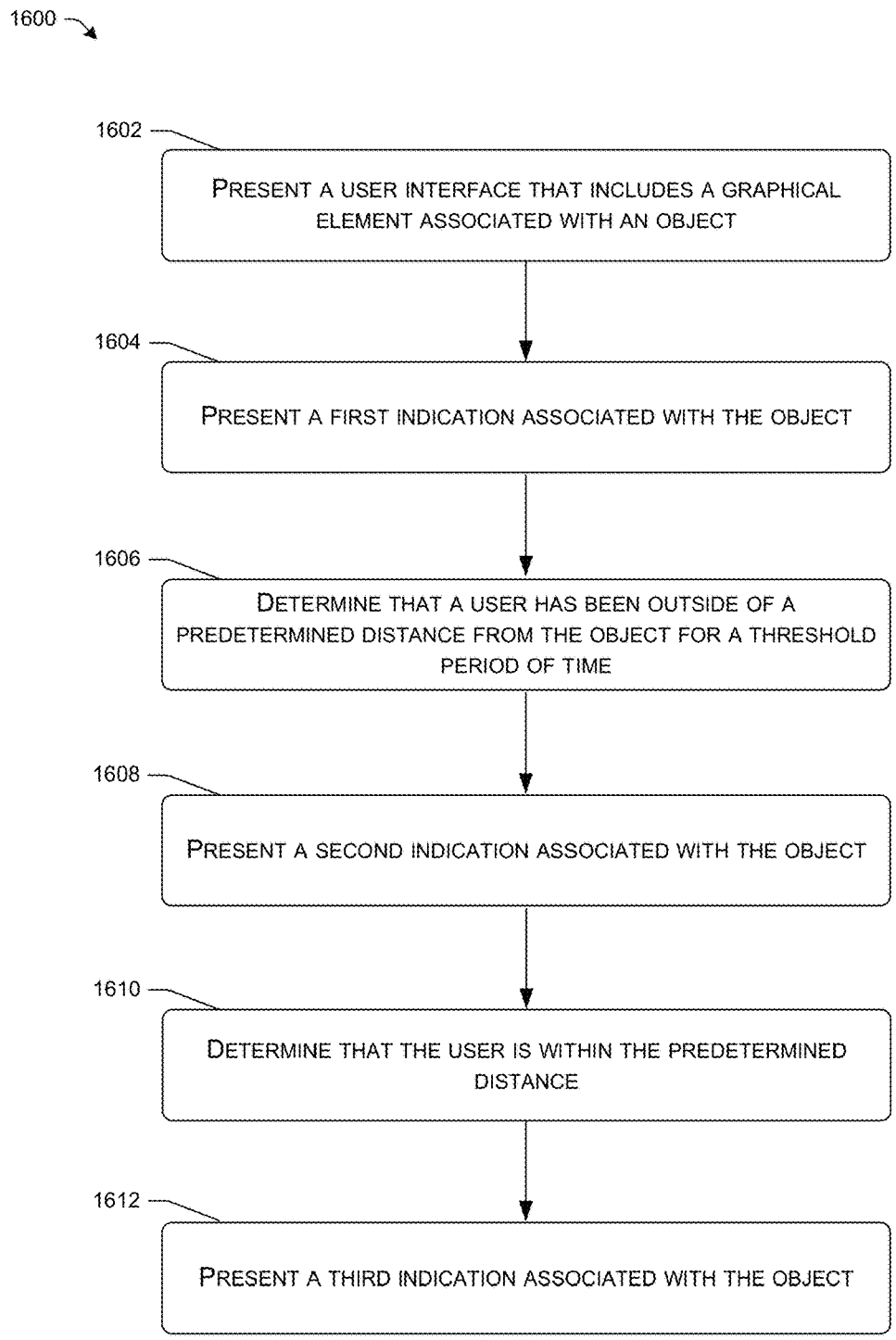
FIG. 16 illustrates a flow diagram of a second example process of utilizing a user interface.

FIG. 16 illustrates a flow diagram of a second example process 1500 of utilizing a user interface. At 1602, a merchant device 116 presents a user interface that includes a graphical element associated with an object. For instance, the merchant device 116 may present, via a user interface, a layout of the physical establishment of a merchant. The layout may indicate locations of designated sections and objects within the physical establishment. For instance, the graphical element may correspond to the object located at a given location with the physical establishment.

At 1604, the merchant device 116 presents a first indication associated with the object. For instance, the merchant device 116 can determine that the object is in a first state. Based on the object being in the first state, the merchant device 116 can present the first indication, which indicates that the object is in the first state. In some instances, the first indication can include a first color and/or first pattern associated with the first state. In some instances, when the object includes a table or a chair, the first state can indicate that the table or chair is open, is occupied by one or more customers, requires assistance from the merchant, does not require assistance from the merchant, received a check, or the like.

At 1606, the merchant device 116 determines that a user has been outside of a predetermined distance from the object for a threshold period of time. For instance, the merchant device 116 can receive sensor data representing a movement of the user (e.g., an employee of the merchant) within the physical establishment. The merchant device 116 can receive the sensor data from at least one of an electronic device associated with the object, an electronic device associated with the user, or an image capturing device located within the physical establishment. The merchant device 116 can then analyze the sensor data to determine that the user has been outside of the predetermined distance for threshold period of time.

At 1608, the merchant device 116 presents a second indication associated with the object. For instance, the merchant device 116 can determine that the object is in a second state. Based on the object being in the second state, the merchant device 116 can present the second indication, which indicates that the object is in the second state. In some instances, the second indication can include a second color and/or second pattern associated with the second state. In some instances, when the object includes a table or a chair, the second state can indicate that one or more customers located at the table or chair are in need of assistance.

At 1610, the merchant device 116 determines that the user is within the predetermined distance. For instance, the merchant device 116 can receive additional sensor data representing the movement of the user within the physical establishment. The merchant device 116 can receive the additional sensor data from at least one of the electronic device associated with the object, the electronic device associated with the user, or the image capturing device located within the physical establishment. The merchant device 116 can then analyze the additional sensor data to determine that the user is within the predetermined distance.

At 1612, the merchant device 116 presents a third indication associated with the object. For instance, the merchant device 116 can determine that the object is in a third state. Based on the object being in the third state, the merchant device 116 can present the third indication, which indicates that the object is in the third state. In some instances, the third indication can include a third color and/or third pattern associated with the third state. In some instances, when the object includes a table or a chair, the third state can indicate that one or more customers located at the table or chair are not in need of assistance.

Figure 17A:
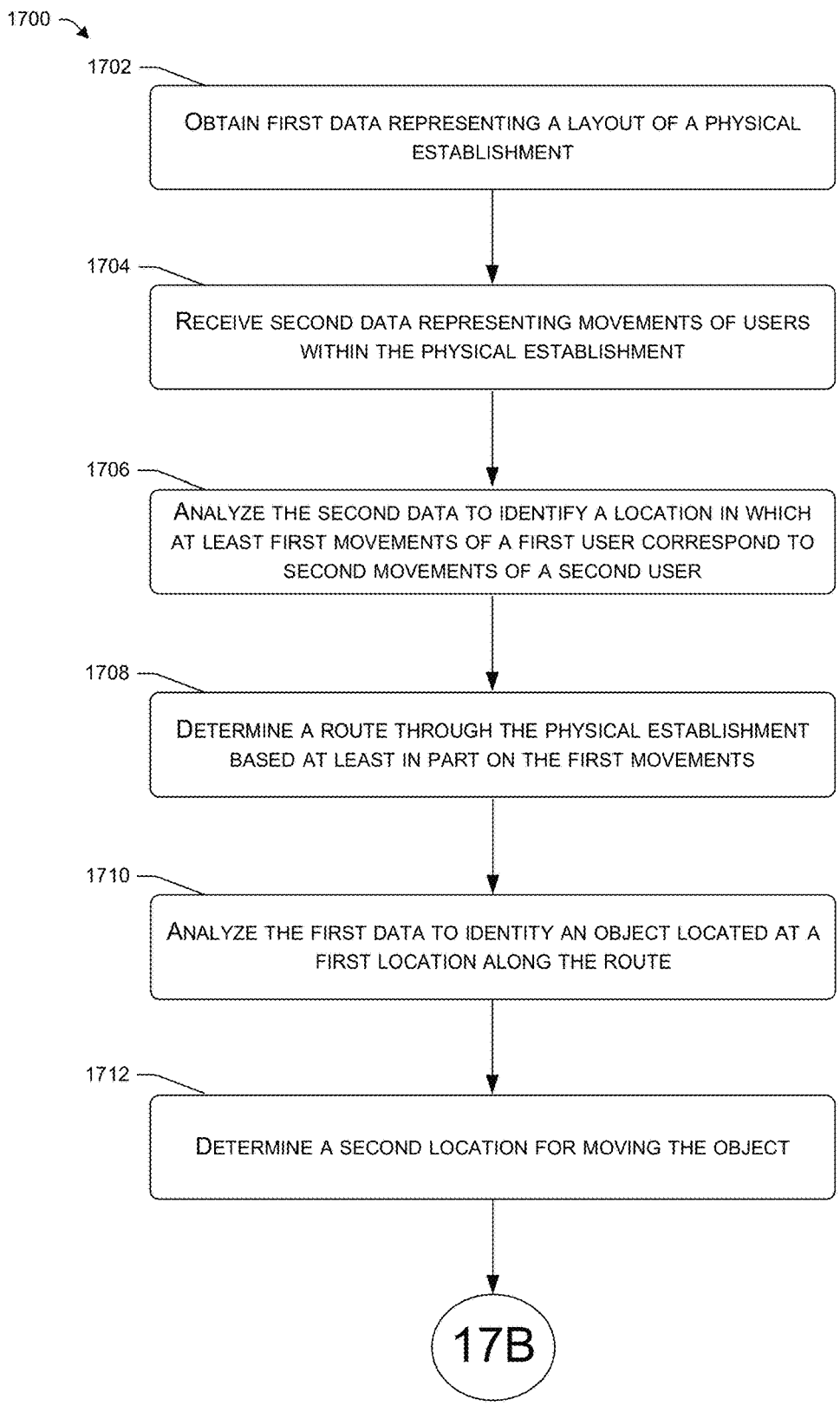
FIGS. 17A-17B illustrate a flow diagram of a first example process for analyzing a layout of a physical establishment using sensor data.
Figure 17B:
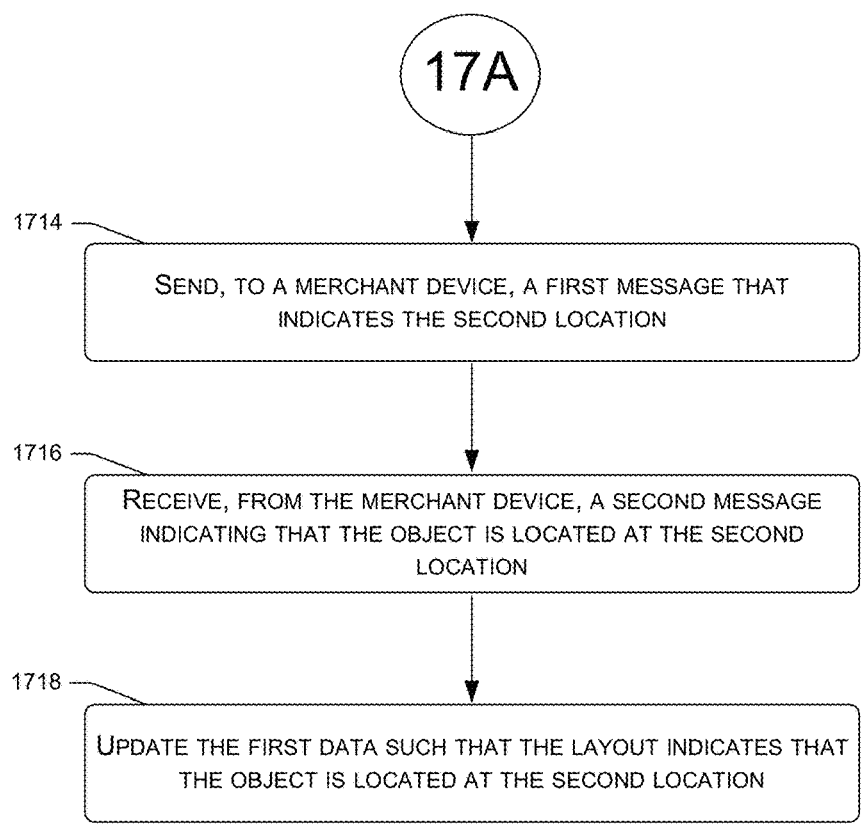

FIGS. 17A-17B illustrate a flow diagram of a first example process 1700 for analyzing a layout of a physical establishment using sensor data. At 1702, a payment service 108 obtains first data representing a layout of a physical establishment. For instance, the payment service 108 may receive, from a merchant device associated with a merchant, the first data representing the layout of the physical establishment. The layout can indicate locations of designated sections and/or objects within the physical establishment. For instance, if the merchant is a restaurant merchant, the layout may indicate the locations of at least tables, chairs, televisions, and merchant devices within the physical establishment.

At 1704, the payment service 108 receives second data representing movements of users within the physical establishment. For instance, the payment service 108 may receive, from the merchant device, sensor data representing the movements of the users (e.g., employees of the merchant, customers, etc.). In some instances, the sensor data may be obtained by electronic devices associated with objects in the physical establishment, and indicate whether the electronic devices detected the users. In some instances, the sensor data may be obtained by respective electronic devices associated with the users, and indicate respective geographical locations of the electronic devices. Still, in some instances, the sensor data includes image data representing the physical establishment, which is captured by one or more image capturing devices.

At 1706, the payment service 108 analyzes the second data to identify a location in which at least first movements of a first user correspond to second movements of a second user. For instance, the payment service 108 can analyze the second data to identify a bottleneck (e.g., a clustering location) within the physical establishment. To identify the bottleneck, the payment service 108 can analyze the second data to track at least first movements (e.g., a first route) of a first user and second movements (e.g., a second route) of a second user within the physical establishment. The payment service 108 can then identify the bottleneck based on respective locations along the first route and the second route corresponding to one another (e.g., being similar, being within a threshold distance, etc.) at a specific time period (e.g., same time period, within two seconds, within five seconds, etc.).

At 1708, the payment service 108 determines a route through the physical establishment based at least in part on the first movements. For instance, the payment service 108 can identify a starting location and an ending location associated with the first route. The payment service 108 can then identify a new route through the physical establishment that starts at the starting location, ends at the ending location, and does not include the location of the bottleneck.

At 1710, the payment service 108 analyzes the first data to identify an object located at a first location along the route. For instance, the payment service 108 can map the new route to the layout of the physical establishment. The payment service 108 can then analyze the route to identify at least an object that is located along the new route. In some instances, identifying the object can include identifying that at least a portion of the object blocks the route through the physical establishment. In some instances, identifying the object can include identifying that at least a portion of the object is located within a threshold distance (e.g., one foot, two feet, five feet, or any other distance) from the route.

At 1712, the payment service 108 determines a second location for moving the object. For instance, the payment service 108 can analyze the layout with respect to the route in order to identify one or more new locations within the physical establishment such that the object is no longer located along the route. The payment service 108 can then select one of the one or more new locations as the second location for the object. In some instances, the payment service 108 may select a location that is nearest to the first location of the object. In some instances, the payment service 108 may select a location that provides users that use the route a threshold amount of space (e.g., one foot, two feet, five feet, etc.) from the object.

At 1714, the payment service 108 sends, to a merchant device, a first message that indicates the second location. For instance, the payment service 108 can generate a message that includes a recommendation that the merchant place the object at the second location within the physical establishment. The payment service 108 can then send the message to a merchant device associated with the merchant.

At 1716, the payment service 108 receives, from the merchant device, a second message indicating that the object is located at the second location and at 1618, the payment service 108 updates the first data such that the layout indicates that the object is located at the second location. For instance, the payment service 108 can receive, from the merchant device, the second message that indicates that the object was moved from the first location to the second location. Based on receiving the message, the payment service 108 can update the layout such that the layout indicates that the object is located at the second location rather than the first location.

Figure 18:
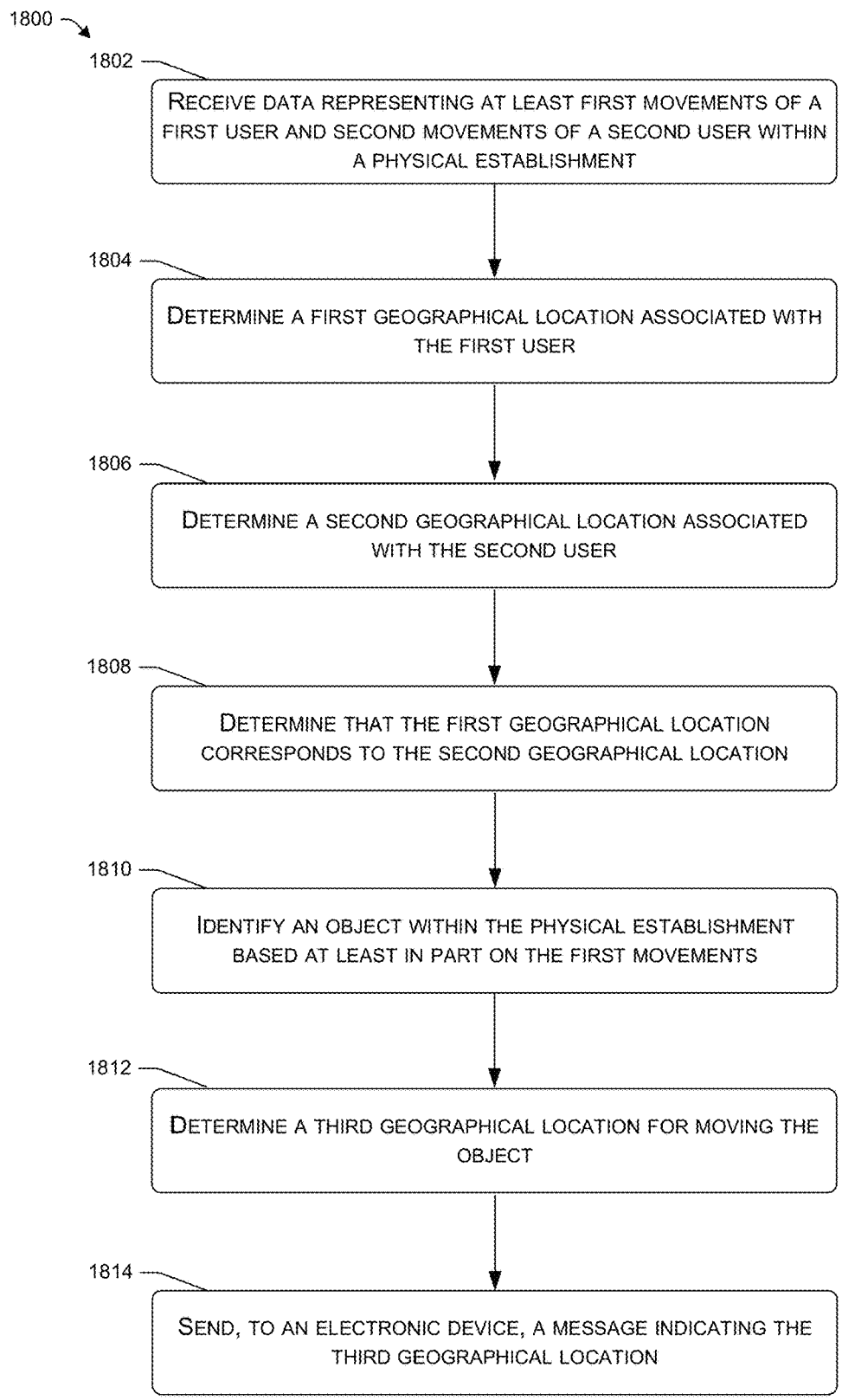
FIG. 18 illustrates a flow diagram of a second example process for analyzing a layout of a physical establishment using sensor data.

FIG. 18 illustrates a flow diagram of a second example process 1800 for analyzing a layout of a physical establishment using sensor data. At 1802, a payment service 108 receives data representing at least first movements of a first user and second movements of a second user within a physical establishment. For instance, the payment service 108 may receive, from a merchant device, sensor data representing the movements of the users (e.g., employees of the merchant, customers, etc.). In some instances, the sensor data may be obtained by electronic devices associated with objects in the physical establishment, and indicate whether the electronic devices detected the users. In some instances, the sensor data may be obtained by respective electronic devices associated with the users, and indicate respective geographical locations of the electronic devices. Still, in some instances, the sensor data includes image data representing the physical establishment, which is captured by one or more image capturing devices.

At 1804, the payment service 108 determines a first geographical location associated with the first user. For instance, the payment service 108 can analyze the data representing the first movements to determine a first geographical location of the first user within the physical establishment. In some instances, analyzing the data includes tracking a first route of the first user within the physical establishment. The payment service 108 can then determine the first geographical location based on identifying a location that is along the first route.

At 1806, the payment service 108 determines a second geographical location associated with the second user. For instance, the payment service 108 can analyze the data representing the second movements to determine a second geographical location of the second user within the physical establishment. In some instances, analyzing the data includes tracking a second route of the second user within the physical establishment. The payment service 108 can then determine the second geographical location based on identifying a location that is along the first route.

At 1808, the payment service 108 determines that the first geographical location corresponds to the second geographical location. In some instances, the payment service 108 determines that the first geographical location corresponds to the second geographical location by determining that both the first geographical location and the second geographical location include a same geographical location within the physical establishment at a specific time period (e.g., same time period, within two seconds, within five seconds, etc.). In some instances, the payment service 108 determines that the first geographical location corresponds to the second geographical location by determining that the first geographical location is within a threshold distance (e.g., one foot, two feet, five feet, etc.) to the second geographical location at the specific time period.

At 1810, the payment service 108 identifies an object within the physical establishment based at least in part on the first movements. For instance, the payment service 108 can analyze a layout of the physical establishment using the first movements to identify the object. In some instances, the payment service 108 identifies the object based on determining that the first route associated with the first movements started at the object. In some instances, the payment service 108 identifies the object based on determining that the first route associated with the first movements ended at the object. Still in some instances, the payment service 108 identifies the object based on determining that the first route associated with the first movements was caused by the object.

Additionally, in some instances, the payment service 108 identifies the object based on the second movements. For instance, the payment service 108 can identify the object based on the object being proximate to a location in which the first geographical location corresponds to the second geographical location. In some instances, the object is proximate based on an initial location of the object being within a threshold distance, such as foot, two feet, ten feet, or the like of the location.

At 1812, the payment service 108 determines a third geographical location for moving the object. For instance, the payment service 108 can determine a location (e.g., optimal location) within the physical establishment such that the first user is no longer required to move along the first route that includes the first geographical location. For example, the payment service 108 can determine the third geographical location such that the first user can utilize a new route through the physical establishment that does include the first geographical location. For another example, the payment service can determine the third geographical location such that the first movements of the first user and second movements of the second user are no longer within a threshold distance to one another.

At 1814, the payment service 108 sends, to an electronic device, a message indicating the third geographical location. For instance, the payment service 108 can generate a message that includes a recommendation that the merchant place the object at the third geographical location within the physical establishment. The payment service 108 can then send the message to an electronic device associated with the merchant.

Figure 19:
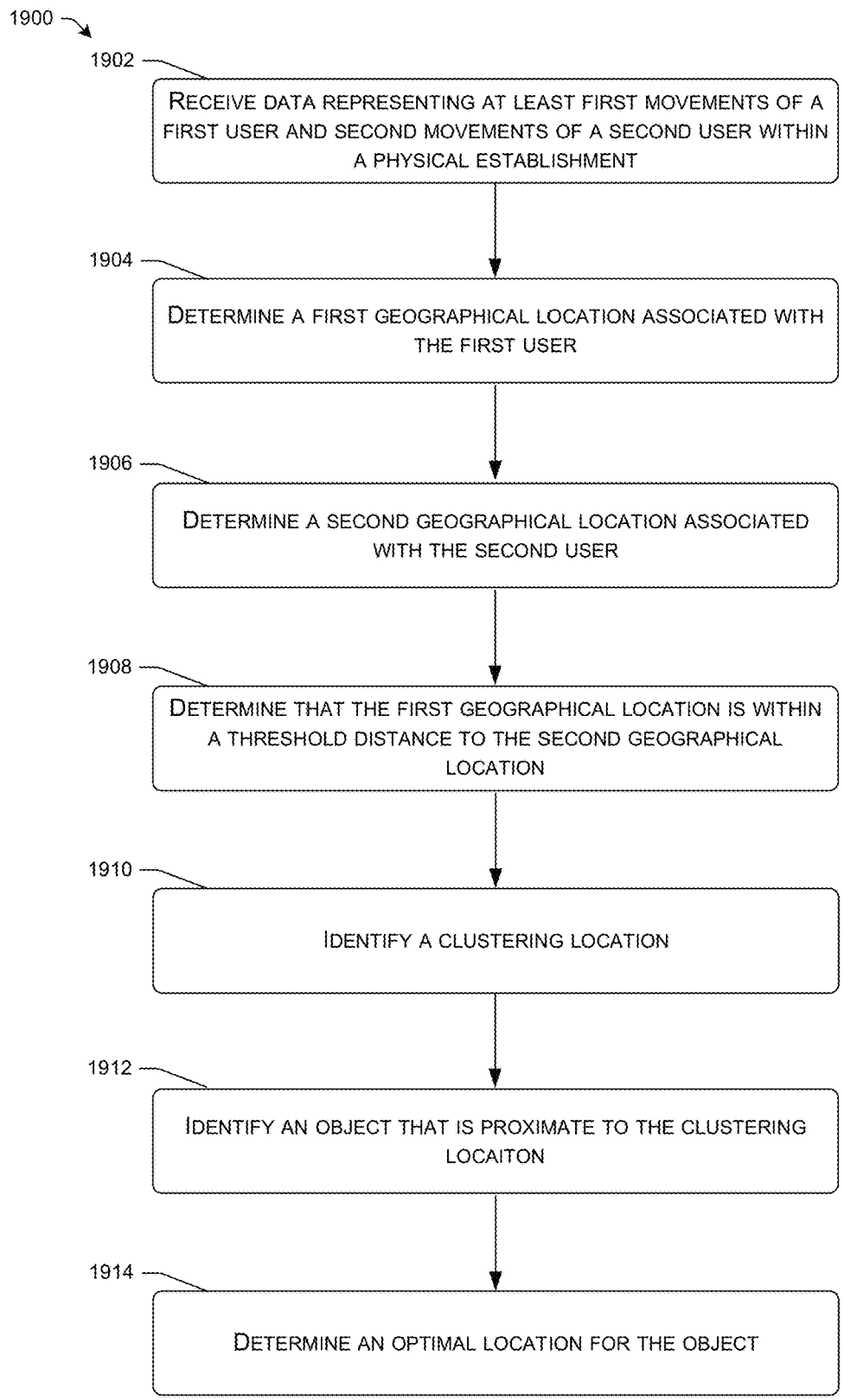
FIG. 19 illustrates a flow diagram of a third example process for analyzing a layout of a physical establishment using sensor data.

FIG. 19 illustrates a flow diagram of a third example process 1900 for analyzing a layout of a physical establishment using sensor data. At 1902, a payment service 108 receives data representing at least first movements of a first user and second movements of a second user within a physical establishment. For instance, the payment service 108 may receive, from a merchant device, sensor data representing the movements of the users (e.g., employees of the merchant, customers, etc.). In some instances, the sensor data may be obtained by electronic devices associated with objects in the physical establishment, and indicate whether the electronic devices detected the users. In some instances, the sensor data may be obtained by respective electronic devices associated with the users, and indicate respective geographical locations of the electronic devices. Still, in some instances, the sensor data includes image data representing the physical establishment, which is captured by one or more image capturing devices.

At 1904, the payment service 108 determines a first geographical location associated with the first user. For instance, the payment service 108 can analyze the data representing the first movements to determine a first geographical location of the first user within the physical establishment. In some instances, analyzing the data includes tracking a first route of the first user within the physical establishment. The payment service 108 can then determine the first geographical location based on identifying a location that is along the first route.

At 1906, the payment service 108 determines a second geographical location associated with the second user. For instance, the payment service 108 can analyze the data representing the second movements to determine a second geographical location of the second user within the physical establishment. In some instances, analyzing the data includes tracking a second route of the second user within the physical establishment. The payment service 108 can then determine the second geographical location based on identifying a location that is along the first route.

At 1908, the payment service 108 determines that the first geographical location is within a threshold distance to the second geographical location. In some instances, the payment service 108 determines that the first geographical location is within the threshold distance to the second geographical location by determining that both the first geographical location and the second geographical location are within the threshold distance at a specific time period (e.g., same time period, within two seconds, within five seconds, etc.).

At 1910, the payment service 108 identifies a clustering location. For instance, based on the first geographical location being within the threshold distance of the second geographical location, the payment service 108 can identify the clustering location. The clustering location includes at least one of the first geographical location, the second geographical location, an location that is within a threshold distance to the first geographical location and/or the second geographical location, or an area that includes the first geographical location and the second geographical location.

At 1912, the payment service 108 identifies an object that is proximate to the clustering location. For instance, the payment service 108 can analyze a layout of the physical establishment to identify an object that includes an initial location that is proximate to the clustering location. In some instance, the payment service 108 identifies the object based on the initial location being within a threshold distance to the clustering location. In some instances, the payment service 108 identifies the location based on the initial location being along (e.g., within a threshold distance) at least one of the first route or the second route.

At 1914, the payment service 108 determines an optimal location for the object. For instance, the payment service 108 can determine a new location for the object such that the threshold distance between the first geographical location and the second geographical location is increased. In some instance, the payment service 108 identifies the new location such that the object is located further away from the first route and/or the second route.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:

receiving, by one or more computing devices and via one or more sensors of a first electronic device associated with and in possession of a first user, first location data representing at least first movements of the first user within a physical establishment of a merchant;

receiving, by the one or more computing devices and via one or more sensors of a second electronic device associated with and in possession of a second user, second location data representing at least second movements of the second user within the physical establishment;

determining, by the one or more computing devices and based at least in part on the first location data and the second location data, a clustering location within the physical establishment, wherein the clustering location relates to a point where a first geographical location associated with a first route of travel of the first user through the physical establishment is within a threshold distance of a second geographical location associated with a second route of travel of the second user through the physical establishment;

responsive to determining the clustering location and based at least in part on additional data representing a layout of the physical establishment, the layout including at least an initial geographical location of one or more objects within the physical establishment:

identifying, by the one or more computing devices, an object of the one or more objects that is proximate to the clustering location; and determining, by the one or more computing devices, an optimal geographical location within the physical establishment for placing the object that serves to increase the distance at the clustering location between the first route of travel and the second route of travel; and providing, by the one or more computing devices and to a device associated with the merchant, a message suggesting that the object be placed at or near the optimal geographical location.

2. The method of claim 1, wherein identifying the object comprises:

determining, based at least in part on the layout, that at least one of the first route or the second route is caused at least in part by the initial geographical location of the object.

3. The method of claim 2, wherein:

the first route includes at least a first starting point and a first ending point;

the second route includes at least a second starting point and a second ending point; and determining that at least one of the first route or the second route is caused at least in part by the initial geographical location of the object comprises determining that the initial geographical location is between a line that connects the first starting point to the first ending point or between a line that connects the second starting point to the second ending point.

4. The method of claim 1, wherein the first route includes at least a starting point and an ending point; and further comprising determining another route within the physical establishment between the starting point and the ending point, wherein identifying the object is further based on determining that the initial geographical location of the object is located along the other route.

5. The method of claim 4, wherein determining the optimal geographical location for placing the object comprises determining at least one geographical location that is not located along the other route.

6. The method of claim 1, further comprising:

receiving, from individual electronic devices of a plurality of users, third location data representing respective movements of the plurality of users within the physical establishment;

determining, based at least in part on the third location data, a number of times that respective geographical locations associated with routes of travel of the plurality of users are within the threshold distance of the clustering location; and determining that the number of times exceeds a threshold, wherein identifying the object is further based on determining that the number of times exceeds the threshold.

7. The method of claim 1, wherein the object includes at least one of:

a chair within the physical establishment;

a table within the physical establishment;

a television within the physical establishment; or an electronic device within the physical establishment.

8. The method of claim 1, wherein at least one of the first user or the second user comprises at least one of an employee of the merchant or a customer of the merchant.

9. The method of claim 1, wherein the one or more computing devices are associated with a payment service.

10. The method of claim 1, wherein the one or more objects comprise one or more tables.

11. The method of claim 1, wherein the device associated with the merchant is a point-of-sale (POS) device.

12. The method of claim 11, further comprising:

receiving, by the one or more computing devices and from the POS device, an indication that the object is now located at or near the optimal geographical location within the physical establishment; and updating the additional data such that the layout indicates that the object is located at or near the optimal geographical location within the physical establishment.

13. The method of claim 1, further comprising:

receiving, from individual electronic devices of a plurality of users, third location data representing respective movements of the plurality of users within the physical establishment;

determining, based at least in part on the third location data, a number of times that respective geographical locations associated with routes of travel of the plurality of users are within the threshold distance of the clustering location;

determining that the number of times exceeds a threshold; and determining that the clustering location includes a bottleneck location within the physical establishment based at least in part on determining that the number of times exceeds the threshold.

14. The method of claim 1, further comprising:

determining, based at least in part on the second movements, a third route of travel of the second user within the physical establishment, wherein determining the clustering location comprises analyzing the first route with respect to the second route to identify that the first geographical location and the second geographical location are within the threshold distance of the clustering location.

15. The method of claim 1, wherein determining the optimal geographical location comprises determining at least one geographical location for placing the object that is not located along the second route.

16. The method of claim 1, wherein the first route includes a starting location and an ending location, and the method further comprising:
    determining a third route within the physical establishment that starts at the starting location, ends at the ending location, and does not include the first location,
    wherein the message further suggests the third route.

17. One or more computing devices comprising:
one or more processors; and
one or more computer-readable media storing instructions that, when executed by the one or more processors, cause the one or more processors to perform operations comprising:
    receiving, via one or more sensors of a first electronic device associated with and in possession of a first user, first location data representing at least first movements of the first user within a physical establishment of a merchant;
    receiving, via one or more sensors of a second electronic device associated with and in possession of a second user, second location data representing at least second movements of the second user within the physical establishment;
    determining, based at least in part on the first location data and the second location data, a clustering location within the physical establishment, wherein the clustering location relates to a point where a first geographical location associated with a first route of travel of the first user through the physical establishment is within a threshold distance of a second geographical location associated with a second route of travel of the second user through the physical establishment;
    responsive to determining the clustering location and based at least in part on additional data representing a layout of the physical establishment, the layout including at least an initial geographical location of one or more objects within the physical establishment:
        identifying an object of the one or more objects that is proximate to the clustering location; and
        determining an optimal geographical location within the physical establishment for placing the object that serves to increase the distance at the clustering location between the first route of travel and the second route of travel; and
    providing, to a device associated with the merchant, a message suggesting that the object be placed at or near the optimal geographical location.

18. The one or more computing devices of claim 17, wherein the one or more computing devices are associated with a payment service.

19. One or more non-transitory computer-readable media storing instructions that, when executed by one or more processors, program the one or more processors to:
    receive, via one or more sensors of a first electronic device associated with and in possession of a first user, first location data representing at least first movements of the first user within a physical establishment of a merchant;
    receive, via one or more sensors of a second electronic device associated with and in possession of a second user, second location data representing at least second movements of the second user within the physical establishment;
    determine, based at least in part on the first location data and the second location data, a clustering location within the physical establishment, wherein the clustering location relates to a point where a first geographical location associated with a first route of travel of the first user through the physical establishment is within a threshold distance of a second geographical location associated with a second route of travel of the second user through the physical establishment;
    responsive to determining the clustering location and based at least in part on additional data representing a layout of the physical establishment, the layout including at least an initial geographical location of one or more objects within the physical establishment:
        identify an object of the one or more objects that is proximate to the clustering location; and
        determine an optimal geographical location within the physical establishment for placing the object that serves to increase the distance at the clustering location between the first route of travel and the second route of travel; and
    provide, to a device associated with the merchant, a message suggesting that the object be placed at or near the optimal geographical location.

20. The one or more non-transitory computer-readable media of claim 19, wherein the instructions further program the one or more processors to:
    receive, from individual electronic devices of a plurality of users, third location data representing respective movements of the plurality of users within the physical establishment;
    determine, based at least in part on the third location data, a number of times that respective geographical locations associated with routes of travel of the plurality of users are within the threshold distance of the clustering location;
    determine that the number of times exceeds a threshold; and
    determine that the clustering location includes a bottleneck location within the physical establishment based at least in part on determining that the number of times exceeds the threshold.

* * * * *